(12) United States Patent
Cunningham et al.

(10) Patent No.: US 11,888,859 B2
(45) Date of Patent: *Jan. 30, 2024

(54) ASSOCIATING A SECURITY RISK PERSONA WITH A PHASE OF A CYBER KILL CHAIN

(71) Applicant: Forcepoint, LLC, Austin, TX (US)

(72) Inventors: Margaret Cunningham, Austin, TX (US); Clifford Charles Wright, Oxfordshire (GB)

(73) Assignee: Forcepoint LLC, Austin, TX (US)

( * ) Notice: Subject to any disclaimer, the term of this patent is extended or adjusted under 35 U.S.C. 154(b) by 623 days.

This patent is subject to a terminal disclaimer.

(21) Appl. No.: 17/119,803

(22) Filed: Dec. 11, 2020

(65) Prior Publication Data
US 2022/0006818 A1    Jan. 6, 2022

Related U.S. Application Data

(63) Continuation of application No. 16/557,560, filed on Aug. 30, 2019, now Pat. No. 10,999,296, which is a
(Continued)

(51) Int. Cl.
*H04L 9/40* (2022.01)
*H04L 9/00* (2022.01)

(52) U.S. Cl.
CPC .................................. *H04L 63/14* (2013.01)

(58) Field of Classification Search
CPC ....... H04L 63/14; H04L 9/50; H04L 63/1433; H04L 63/1408
See application file for complete search history.

(56) References Cited

U.S. PATENT DOCUMENTS 6,072,875 A    6/2000  Tsudik
6,678,693 B1   1/2004  Shiraishi
(Continued)

FOREIGN PATENT DOCUMENTS

WO    2019153581 A1    8/2019

OTHER PUBLICATIONS

Sean Barnum, Standardized Cyber Threat Intelligence Information with the Structured Threat Information eXpression (STIX) Whitepaper v1.1 (Feb. 20, 2014).
(Continued)

*Primary Examiner* — Darren B Schwartz
(74) *Attorney, Agent, or Firm* — Terrile, Cannatti & Chambers, LLP; Stephen A. Terrile

(57) ABSTRACT

A system, method, and computer-readable medium are disclosed for performing a security operation. The security operation includes: monitoring an entity, the monitoring observing an electronically-observable data source; deriving an observable based upon the monitoring of the electronically-observable data source; identifying a security related activity, the security related activity being based upon the observable from the electronic data source; analyzing the security related activity, the analyzing the security related activity using a security risk persona; associating the security risk persona with a phase of a cyber kill chain; and, performing a security operation on the security related activity via a security system, the security operation disrupting performance of the phase of the cyber kill chain.

20 Claims, 26 Drawing Sheets

Related U.S. Application Data continuation-in-part of application No. 16/415,726, filed on May 17, 2019, now Pat. No. 10,834,097, application No. 17/119,803 is a continuation-in-part of application No. 16/162,655, filed on Oct. 17, 2018, now Pat. No. 10,530,786, which is a continuation of application No. 15/963,729, filed on Apr. 26, 2018, now Pat. No. 10,129,269, which is a continuation-in-part of application No. 15/878,898, filed on Jan. 24, 2018, now Pat. No. 10,063,568, which is a continuation of application No. 15/720,788, filed on Sep. 29, 2017, now Pat. No. 9,882,918.

(60) Provisional application No. 63/017,400, filed on Apr. 29, 2020, provisional application No. 62/964,372, filed on Jan. 22, 2020, provisional application No. 62/839,060, filed on Apr. 26, 2019, provisional application No. 62/506,300, filed on May 15, 2017.

(56) References Cited

U.S. PATENT DOCUMENTS

| | | |
|---|---|---|
| 7,107,447 B2 | 9/2006 | Sanin et al. |
| 7,694,150 B1 | 4/2010 | Kirby |
| 7,725,565 B2 | 5/2010 | Li et al. |
| 7,813,944 B1 | 10/2010 | Luk et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Allen et al. |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,516,053 B1 * | 12/2016 | Muddu ................ G06F 3/0484 |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,713,934 B2 | 7/2020 | Sayavong et al. |
| 10,769,908 B1 | 9/2020 | Burris et al. |
| 10,917,319 B2 | 2/2021 | Scheib et al. |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |

(56) References Cited

U.S. PATENT DOCUMENTS

| | | |
|---|---|---|
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1* | 10/2015 | Coden ............... G06F 21/554 726/23 |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1 | 12/2015 | Eden et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0105334 A1 | 4/2016 | Boe et al. |
| 2016/0117937 A1 | 4/2016 | Penders et al. |
| 2016/0147380 A1 | 5/2016 | Coates et al. |
| 2016/0164922 A1 | 6/2016 | Boss et al. |
| 2016/0224803 A1 | 8/2016 | Frank et al. |
| 2016/0226893 A1* | 8/2016 | Warikoo ............ H04L 63/1433 |
| 2016/0226905 A1* | 8/2016 | Baikalov ........... H04L 63/1433 |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1 | 11/2016 | Mehrabanzad et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0171609 A1 | 6/2017 | Koh |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0032724 A1* | 2/2018 | Tang ................. H04L 63/1416 |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0150570 A1 | 5/2018 | Broyd et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0219894 A1* | 8/2018 | Crabtree .................. H04L 63/20 |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0276541 A1 | 9/2018 | Studnitzer et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0324207 A1* | 11/2018 | Reybok, Jr. ............ G06F 16/951 |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0034813 A1 | 1/2019 | Das et al. |
| 2019/0036969 A1 | 1/2019 | Swafford et al. |
| 2019/0052660 A1 | 2/2019 | Cassidy et al. |
| 2019/0095478 A1 | 3/2019 | Tankersley et al. |
| 2019/0141058 A1* | 5/2019 | Hassanzadeh ...... H04L 41/0631 |
| 2019/0158503 A1 | 5/2019 | Bansal et al. |
| 2019/0174319 A1 | 6/2019 | Backholm et al. |
| 2019/0222603 A1 | 7/2019 | Yang |
| 2019/0289021 A1 | 9/2019 | Ford |
| 2019/0294482 A1 | 9/2019 | Li et al. |
| 2019/0311105 A1 | 10/2019 | Beiter et al. |
| 2019/0347578 A1 | 11/2019 | Bolding et al. |
| 2019/0349391 A1 | 11/2019 | Eisner et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | Deluca et al. |
| 2020/0028862 A1 | 1/2020 | Lin et al. |
| 2020/0034462 A1 | 1/2020 | Narayanaswamy et al. |
| 2020/0036740 A1 | 1/2020 | Ford |
| 2020/0065728 A1 | 2/2020 | Wilson et al. |
| 2020/0077265 A1 | 3/2020 | Singh et al. |
| 2020/0089692 A1 | 3/2020 | Tripathi et al. |
| 2020/0117546 A1 | 4/2020 | Wong et al. |
| 2020/0135049 A1* | 4/2020 | Atencio .................. G09B 5/12 |
| 2020/0145446 A1* | 5/2020 | Deardorff .............. H04L 63/20 |
| 2020/0162484 A1* | 5/2020 | Solis Agea ......... H04L 63/1416 |
| 2020/0334025 A1 | 10/2020 | Wang et al. |
| 2020/0358803 A1 | 11/2020 | Roelofs et al. |
| 2021/0029156 A1* | 1/2021 | Sharifi Mehr ........ H04L 67/303 |
| 2021/0037035 A1 | 2/2021 | Graul |
| 2021/0342467 A1 | 11/2021 | Levy et al. |

OTHER PUBLICATIONS

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

(56) References Cited

OTHER PUBLICATIONS

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.
Github, The Z3 Theorem Prover, retrieved from internet May 19, 2020, https://github.com/Z3Prover/z3.
John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.
Sanjeev Goyal et al., Attack, Defence and Contagion in Networks, the Review of Economic Studies, vol. 81, Issue 4, Oct. 2014, pp. 1518-1542, https://doi.org/10.1093/restud/rdu013 (2014).
L. F. Lafuerza et al., Exact Solution of a Stochastic Protein Dynamics Model with Delayed Degradation, Phys. Rev. E 84, 051121, Nov. 18, 2011, pp. 1-8.
Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.
Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.
Varun Chandola et al., Anomaly Detection: A Survey, ACM Computing Surveys, vol. 41, No. 3, Article 15, Jul. 2009, pp. 15.1-58.1.
Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.
Yueh-Hsuan Chiang, Towards Large-Scale Temporal Entity Matching, Dissertation Abstract, University of Wisconsin-Madison, 2013.
Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.
Peter Christen et al., Adaptive Temporal Entity Resolution on Dynamic Databases, Apr. 2013, http://users.cecs.anu.edu.au/~Peter.Christen/publications/christen2013pakdd-slides.pdf.
Wikipedia, Categorical Distribution, edited Jul. 28, 2018, https://en.wikipedia.org/wiki/Categorical_distribution.
Wikipedia, ONE-HOT, edited May 22, 2018, https://en.wikipedia.org/wiki/One-hot.
S. Chambi et al., Better bitmap performance with Roaring bitmaps, arXiv:1402.6407v10 [cs.DB] (Mar. 15, 2016).
Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).
Barrere et al., Vulnerability Assessment in Autonomic Networks and Services: A Survey, IEEE, Aug. 30, 2013, vol. 16, issue. 2, pp. 988-1004.
Burns et al., Automatic Management of Network Security Policy, IEEE, Jun. 14, 2001, pp. 12-26.
Singh et al., Container-Based Microservice Architecture for Cloud Applications, International Conference on Computing, Communication and Automation (ICCCA2017), 2017.

\* cited by examiner

| Security Risk Persona 1908 | Median Risk Score 1910 | Vulnerability Scenario 1914 |
|---|---|---|
| Wanderer | 15 | Data Theft |
| Boundary Pusher | 20 | Data Theft |
| Hoarder / Collector | 35 | Data Theft |
| Stockpiler | 55 | Data Theft |
| Exfiltrator | 75 | Data Theft |

*FIGURE 25a*

| Calendar Interval 2520 | Security Risk Persona 1908 | Median Risk Score 1910 | Predisposition 1912 | Security Vulnerability Scenario 1914 | Concerning Behavior Risk Score 1918 | Contextual Modifiers 1920 | | | User Entity Risk Score 1930 |
|---|---|---|---|---|---|---|---|---|---|
| | | | | | | Stressor 1922 | Organizational 1924 | Motivation 1926 | |
| Jan/1 | Boundary Pusher | 0 | Undetermined | Data Theft | 22 | | | | 22 |
| Jan/2 | Boundary Pusher | 0 | Undetermined | Data Theft | 21 | | | | 21 |
| Feb/1 | Boundary Pusher | 0 | Undetermined | Data Theft | 22 | | | | 22 |
| Feb/2 | Boundary Pusher | 0 | Undetermined | Data Theft | 24 | 2 | | | 26 |
| Mar/1 | Boundary Pusher | 20 | Boundary Pusher | Data Theft | 15 | 2 | | | 22 |
| Mar/2 | Boundary Pusher | 20 | Boundary Pusher | Data Theft | 19 | 2 | | | 22 |
| Apr/1 | Boundary Pusher | 20 | Boundary Pusher | Data Theft | 22 | 2 | | | 24 |
| Apr/2 | Boundary Pusher | 20 | Boundary Pusher | Data Theft | 21 | 2 | | | 23 |
| May/1 | Boundary Pusher | 20 | Boundary Pusher | Data Theft | 23 | 2 | 5 | | 30 |
| May/2 | Boundary Pusher | 20 | Boundary Pusher | Data Theft | 22 | 2 | 5 | | 29 |
| Jun/1 | Undetermined | 20 | Undetermined | Undetermined | 0 | 2 | 5 | | 27 |
| Jun/2 | Wanderer | 20 | Wanderer | Data Theft | 17 | 2 | 5 | | 27 |
| Jul/1 | Boundary Pusher | 20 | Boundary Pusher | Data Theft | 20 | 2 | 5 | | 27 |
| Jul/2 | Hoarder/Collector | 20 | Hoarder/Collector | Data Theft | 32 | 2 | 5 | 10 | 49 |
| Aug/1 | Boundary Pusher | 20 | Boundary Pusher | Data Theft | 23 | 2 | 5 | | 30 |
| Aug/2 | Boundary Pusher | 20 | Boundary Pusher | Data Theft | 26 | 2 | 5 | | 33 |
| Sep/1 | Hoarder/Collector | 20 | Hoarder/Collector | Data Theft | 33 | 2 | 5 | 10 | 50 |
| Sep/2 | Stockpiler | 20 | Stockpiler | Data Theft | 56 | 2 | | 20 | 78 |

*FIGURE 25b*

ASSOCIATING A SECURITY RISK PERSONA WITH A PHASE OF A CYBER KILL CHAIN

BACKGROUND OF THE INVENTION

Field of the Invention

The present invention relates in general to the field of computers and similar technologies, and in particular to software utilized in this field. Still more particularly, it relates to a method, system and computer-usable medium for a human-centric, behavior-based security risk modeling framework.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult. In particular, ensuring that an entity is who they claim to be can be challenging.

As an example, a first user may attempt to pose as a second user to gain access to certain confidential information. In this example, the first user may be prevented from accessing the confidential information if it can be determined that they are illegitimately posing as the second user. More particularly, access to the confidential information may be prevented if the identity of the first user is resolved prior to the confidential information actually being accessed. Likewise, the first user's access to the confidential information may be prevented if their identity cannot be resolved to the identity of the second user.

SUMMARY OF THE INVENTION

In one embodiment the invention relates to a computer-implementable method for performing a security operation, comprising: monitoring an entity, the monitoring observing an electronically-observable data source; deriving an observable based upon the monitoring of the electronically-observable data source; identifying a security related activity, the security related activity being based upon the observable from the electronic data source; analyzing the security related activity, the analyzing the security related activity using a security risk persona; associating the security risk persona with a phase of a cyber kill chain; and, performing a security operation on the security related activity via a security system, the security operation disrupting performance of the phase of the cyber kill chain.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring an entity, the monitoring observing an electronically-observable data source; deriving an observable based upon the monitoring of the electronically-observable data source; identifying a security related activity, the security related activity being based upon the observable from the electronic data source; analyzing the security related activity, the analyzing the security related activity using a security risk persona; associating the security risk persona with a phase of a cyber kill chain; and, performing a security operation on the security related activity via a security system, the security operation disrupting performance of the phase of the cyber kill chain.

In another embodiment the invention relates to a computer-readable storage medium embodying computer program code, the computer program code comprising computer executable instructions configured for: monitoring an entity, the monitoring observing an electronically-observable data source; deriving an observable based upon the monitoring of the electronically-observable data source; identifying a security related activity, the security related activity being based upon the observable from the electronic data source; analyzing the security related activity, the analyzing the security related activity using a security risk persona; associating the security risk persona with a phase of a cyber kill chain; and, performing a security operation on the security related activity via a security system, the security operation disrupting performance of the phase of the cyber kill chain.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 25a and 25b show tables containing human-centric risk model data used to generate a user entity risk score associated with a security vulnerability scenario.

DETAILED DESCRIPTION

Figure 1:
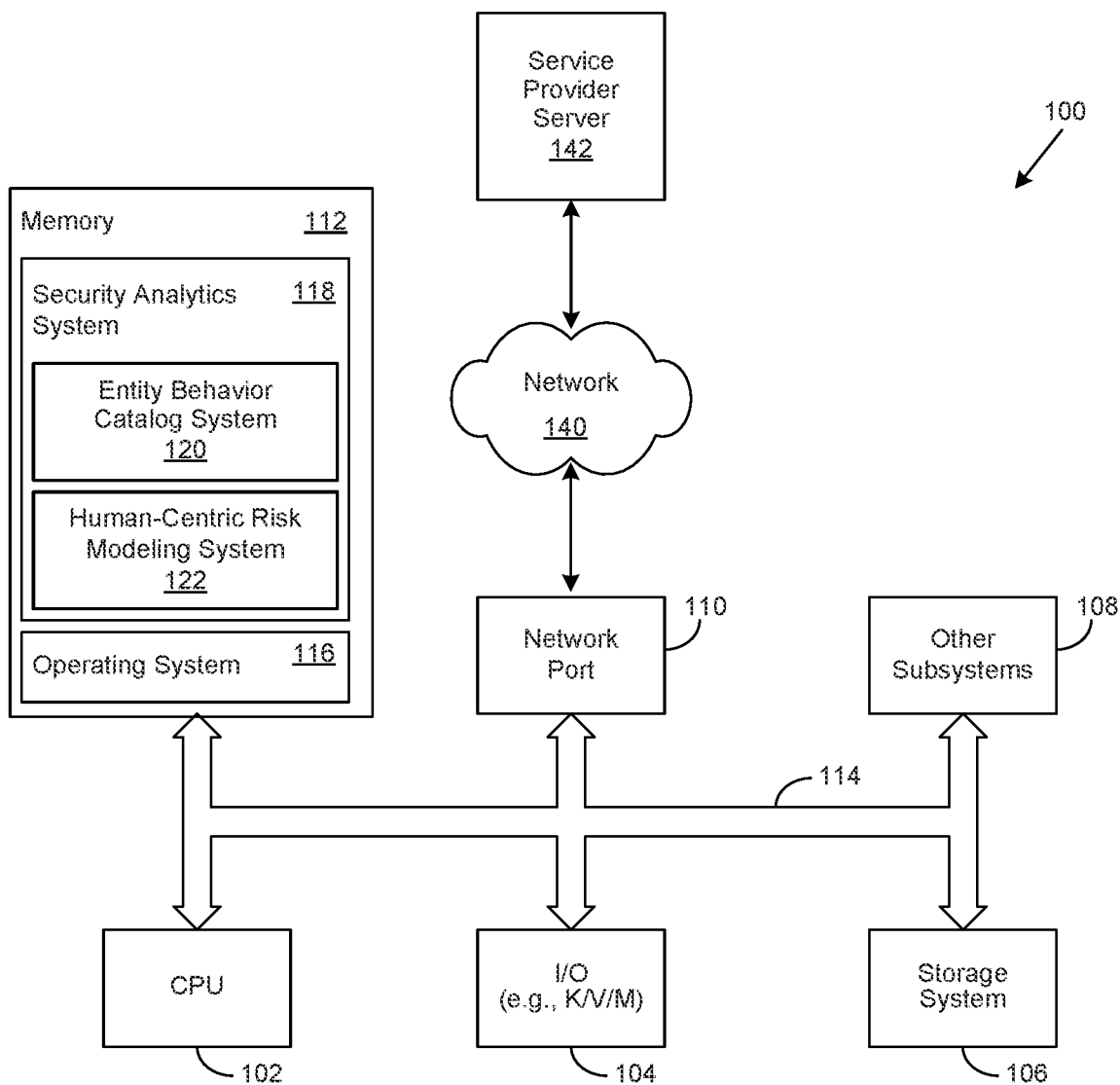
FIG. 1 depicts an exemplary client computer in which the present invention may be implemented.

A method, system and computer-usable medium are disclosed for a human-centric, behavior-based security risk modeling framework.

Certain aspects of the invention reflect an appreciation that the existence of any entity, whether it is an individual user, a group of users, an organization, a device, a system, a network, an account, a domain, an operation, a process, a software application, or a service, represents some degree of security risk. Certain aspects of the invention likewise reflect an appreciation that observation of human behavior can often provide an indication of possible anomalous, abnormal, unexpected, or malicious behavior, any or all of which may represent a security risk.

Likewise, various aspects of the invention reflect an appreciation that certain human behaviors can be characterized as concerning, and as such, their occurrence may likewise provide an indication of potential security risk. Various aspects of the invention likewise reflect an appreciation that certain human-centric factors, such as motivation, stressors, and organizational dynamics, often have an associated effect on human behavior. Certain aspects of the invention reflect an appreciation that the quantification of such factors can likewise be advantageously implemented as modifiers to a behavioral risk score value, resulting in a more accurate assessment of security risk.

Likewise, various aspects of the invention reflect an appreciation that known approaches to human-centric risk modeling have certain limitations that often pose challenges for security-related implementation. For example, the Critical Pathway Model (CPM), which has evolved over twenty years of research into insider threat, is based upon retrospective examination and qualitative scoring of case studies that highlight high-profile insider threat cases. As typically implemented, CPM is a framework comprising four loosely chronological categories that can be used to profile potential insider threat actors.

However, since CPM depends almost entirely on retrospective qualitative coding of case studies, there is an increased risk of hindsight and confirmation bias informing the outcomes and creation of its categories. Likewise, the specific categories used by CPM may not adequately address other types of insider threat or other types of negative workplace behaviors that increase organizational risks. In addition to these issues, the terms and constructs described in the CPM are loosely defined, and offer no measures or metrics for determining the presence of specific types of signals across each CPM category. For example, Concerning Behaviors noted by Shaw and Sellers (2015) range from "troublesome communications" to "security violations."

As another example, Sociotechnical and Organizational Factors for Insider Threat (SOFIT) was developed using scenario-based surveys distributed to subject matter experts. Constrained choices, and limited demographic and experience information associated with survey respondents, can impact the quality of the results, and by extension, the quality of the survey findings. Furthermore, the use of survey methods is not the equivalent of understanding specific types of insider risk through use of realistic datasets and structured testing. While SOFIT provides a well-researched and comprehensive baseline for understanding a wide range of potential insider threat risks, its effectiveness and accuracy in real-world scenarios is currently unproven.

Various aspects of the invention likewise reflect an appreciation that certain non-user entities, such as computing, communication, and surveillance devices can be a source for telemetry associated with certain events and entity behaviors. Likewise, various aspects of the invention reflect an appreciation that certain accounts may be global, spanning multiple devices, such as a domain-level account allowing an entity access to multiple systems. Certain aspects of the invention likewise reflect an appreciation that a particular account may be shared by multiple entities.

Accordingly, certain aspects of the invention reflect an appreciation that a particular entity can be assigned a measure of risk according to its respective attributes, behaviors, associated behavioral models, and resultant inferences contained in an associated profile. As an example, a first profile may have an attribute that its corresponding entity works in the human resource department, while a second profile may have an attribute that its corresponding entity is an email server. To continue the example, the first profile may have an associated behavior that indicates its corresponding entity is not acting as they did the day before, while the second profile may have an associated behavior that indicates its corresponding entity is connecting to a suspicious IP address. To further continue the example, the first profile may have a resultant inference that its corresponding entity is likely to be leaving the company, while the second profile may have a resultant inference that there is a high probability its corresponding entity is compromised. Accordingly, certain aspects of the invention reflect an appreciation that a catalog of such behaviors, and associated profiles, can assist in identifying entity behavior that may be of analytic utility. Likewise, certain aspects of the invention reflect an appreciation that such entity behavior of analytic utility may be determined to be anomalous, abnormal, unexpected, malicious, or some combination thereof, as described in greater detail herein.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk.

In certain embodiments, the security analytics system 118 may be implemented to include an entity behavior catalog (EBC) system 120, a human-centric risk modeling system 122, or both. In certain embodiments, the EBC system 120 may be implemented to catalog entity behavior, as described in greater detail herein. In certain embodiments, the human-centric risk modeling system 122 may be implemented to perform a security analytics operation, as likewise described in greater detail herein.

Figure 2:
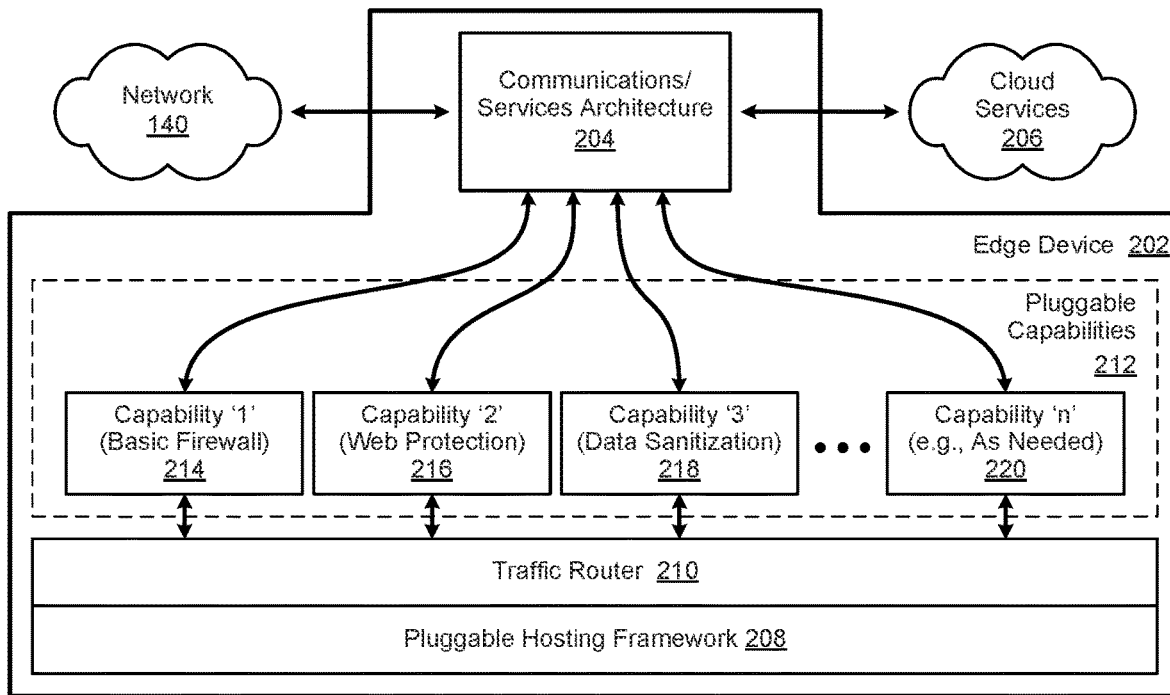
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with providing real-time resolution of the identity of an entity at a particular point in time. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
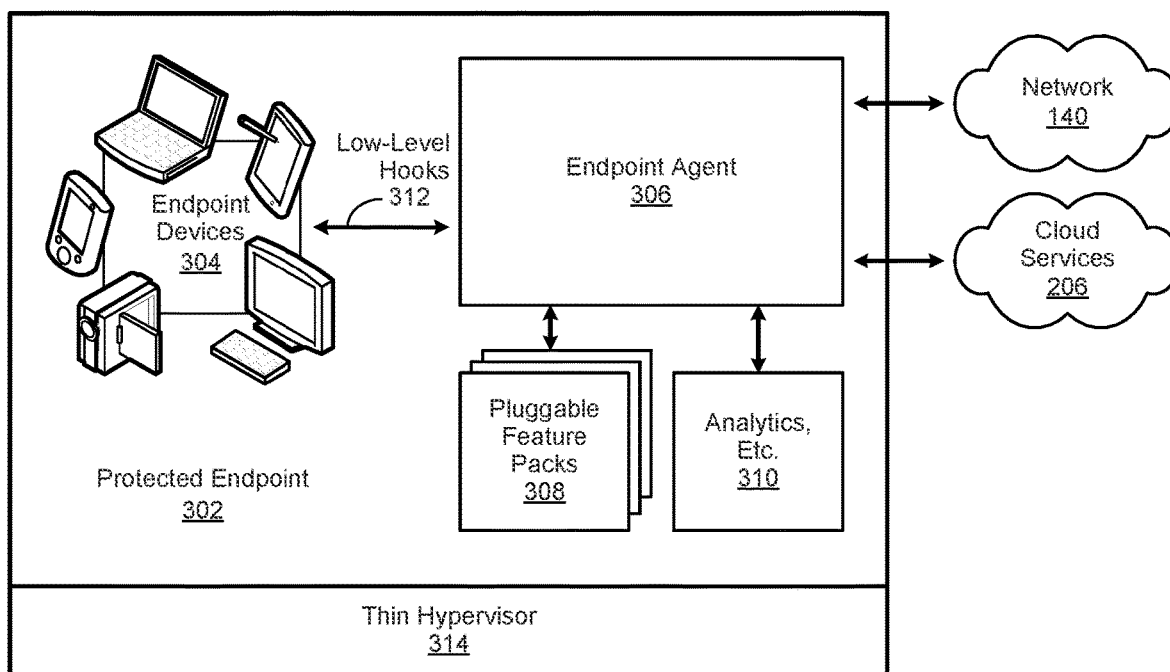
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed entity behavior, described in greater detail herein.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include an entity's authentication factors. Contextual information may likewise include various temporal identity resolution factors, such as identification factors associated with the entity, the date/time/frequency of various entity behaviors, the entity's location, the entity's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the operating system level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-needed basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
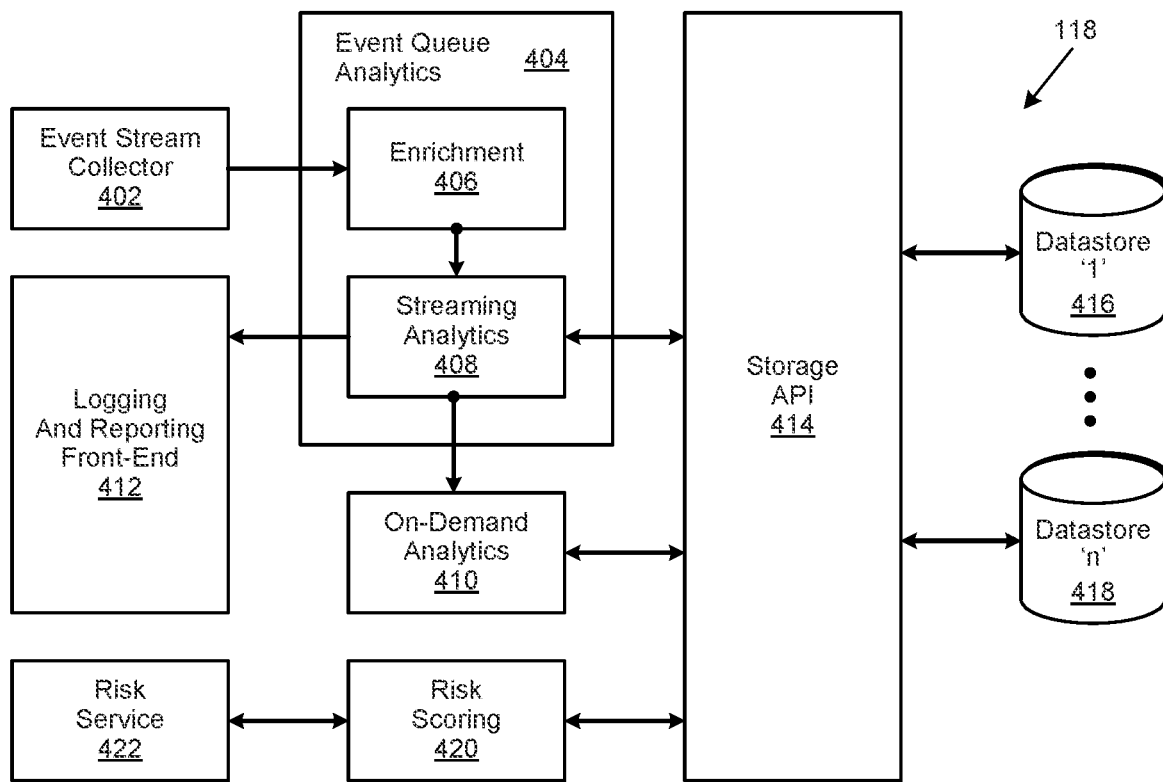
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing an entity behavior profile (EBP), described in greater detail herein. In certain embodiments, an EBP may be implemented as an adaptive trust profile (ATP). In certain embodiments, an EBP may be implemented to detect entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as likewise described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the entity behavior enacted by the entity is suspicious. As another example, certain entity identifier information (e.g., a user name) associated with an entity may change over time. In this example, a change in the entity's user name, during a particular time period or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an entity behavior profile (EBP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
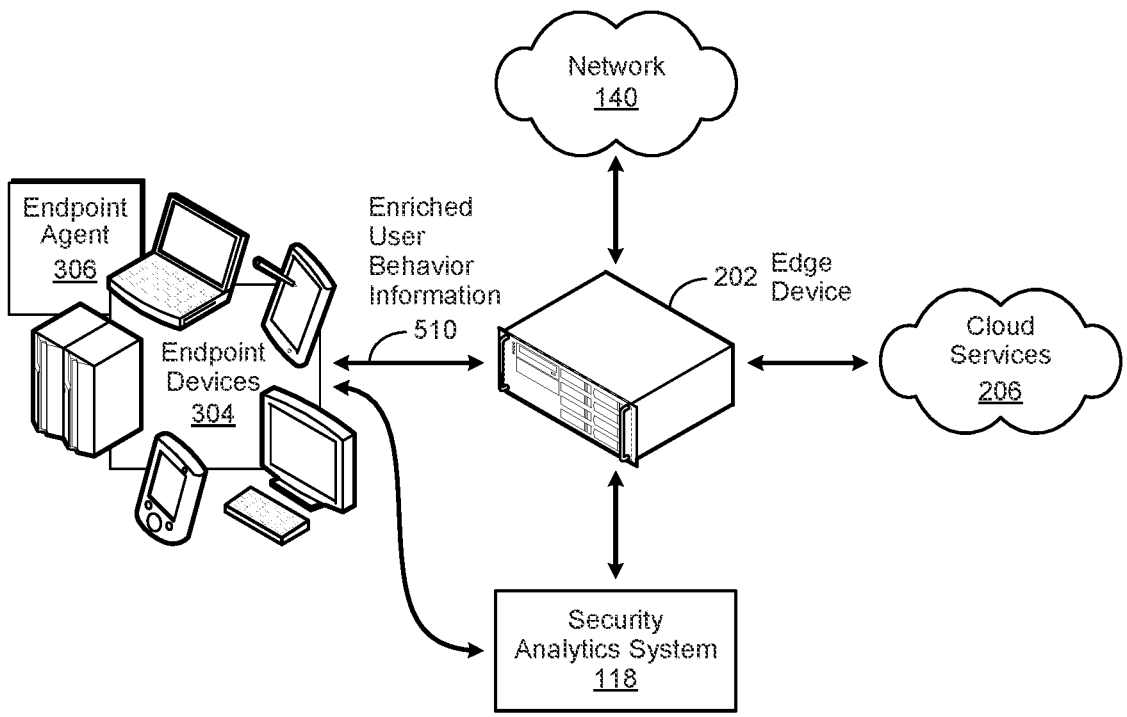
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 118 may be implemented to perform operations associated with providing real-time resolution of the identity of an entity at a particular point in time. In certain embodiments, the security analytics system 118 may be implemented in combination with one or more endpoint agents 306, one or more edge devices 202, cloud services 206, and a security analytics system 118, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 118 may be implemented as both a source and a sink of entity behavior information. In certain embodiments, the security analytics system 118 may be implemented to serve requests for user/resource risk data. In certain embodiments, the edge device 202 and the endpoint agent 306, individually or in combination, may provide certain entity behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality associated with operations associated with providing real-time resolution of the identity of an entity at a particular point in time.

In certain embodiments, a given user behavior may be enriched by an associated endpoint agent 306 attaching contextual information to a request. In one embodiment, the context is embedded within a network request, which is then provided as enriched user behavior information 510. In another embodiment, the contextual information is concatenated, or appended, to a request, which in turn is provided as enriched user behavior information 510. In these embodiments, the enriched user behavior information 510 is unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests are accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 118. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests. In certain embodiments, such requests may be associated with providing real-time resolution of the identity of an entity at a particular point in time.

In certain embodiments, the security analytics system 118 may be implemented in different operational configurations. In one embodiment, the security analytics system 118 may be implemented by using the endpoint agent 306. In another embodiment, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In one embodiment, this approach allows for longitudinal risk scoring, which assesses risk associated with certain user behavior during a particular interval of time. In another embodiment, the security analytics system 118 may be implemented to perform risk-adaptive operations to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, the approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 202 and security analytics system 118 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
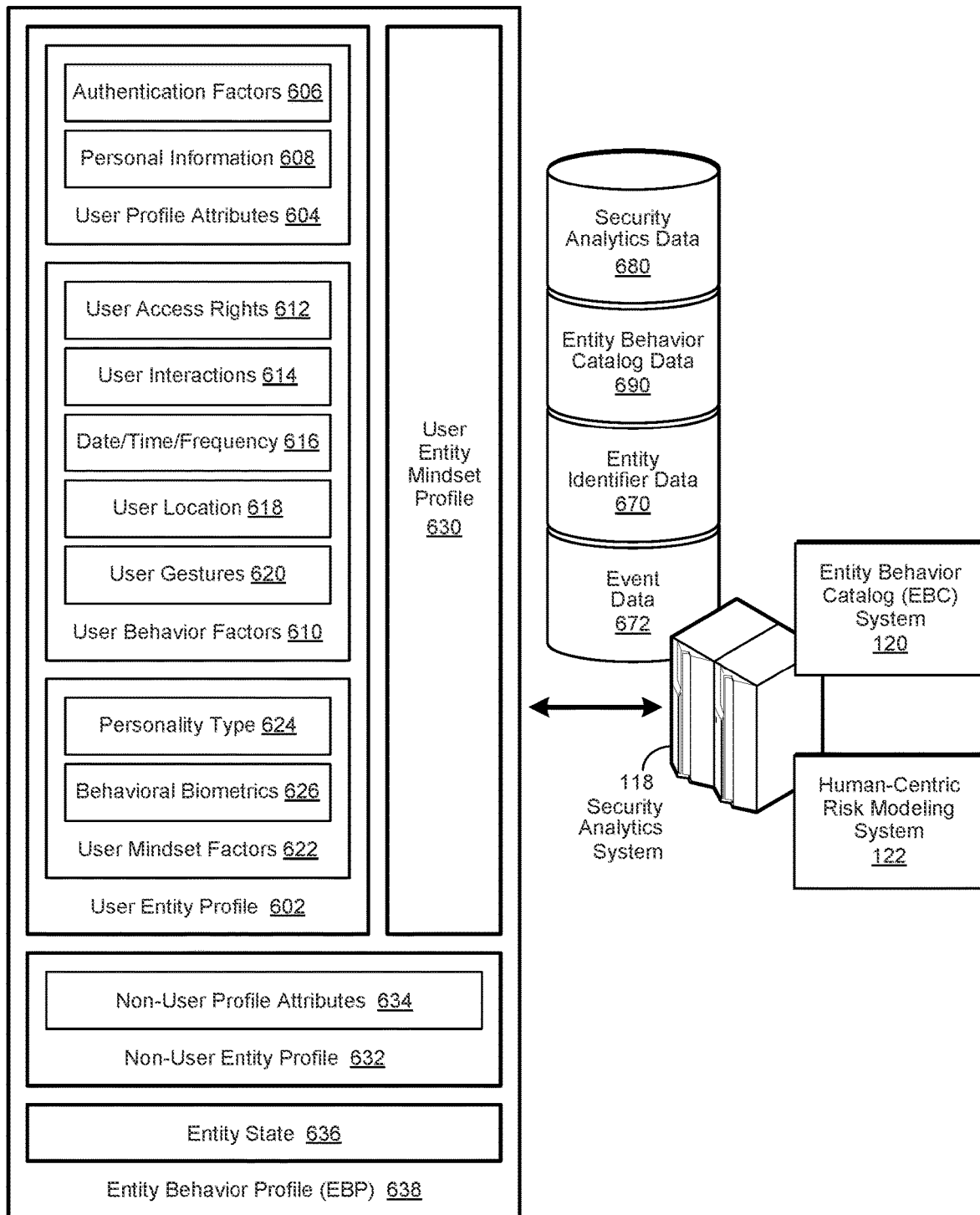
FIG. 6 shows a simplified block diagram of an entity behavior profile (EBP)

FIG. 6 shows a simplified block diagram of an entity behavior profile (EBP) implemented in accordance with an embodiment of the invention. As used herein, an entity behavior profile 638 broadly refers to a collection of information that uniquely describes a particular entity's identity and their associated behavior, whether the behavior occurs within a physical realm or cyberspace. In certain embodiments, an EBP 638 may be used to adaptively draw inferences regarding the trustworthiness of a particular entity. In certain embodiments, as described in greater detail herein, the drawing of the inferences may involve comparing a new entity behavior to known past behaviors enacted by the entity. In certain embodiments, new entity behavior of analytic utility may represent entity behavior that represents a security risk. As likewise used herein, an entity broadly refers to something that exists as itself, whether physically or abstractly. In certain embodiments, an entity may be a user entity, a non-user entity, or a combination thereof. In certain embodiments, the identity of an entity may be known or unknown.

As used herein, a user entity broadly refers to an entity capable of enacting a user entity behavior, as described in greater detail herein. Examples of a user entity include an individual person, a group of people, an organization, or a government. As likewise used herein, a non-user entity broadly refers to an entity whose identity can be described and may exhibit certain behavior, but is incapable of enacting a user entity behavior. Examples of a non-user entity include an item, a device, such as endpoint and edge devices, a network, an account, a domain, an operation, a process, and an event. Other examples of a non-user entity include a resource, such as a geographical location or formation, a physical facility, a venue, a system, a software application, a data store, and a service, such as a service operating in a cloud environment.

Certain embodiments of the invention reflect an appreciation that being able to uniquely identity a device may assist in establishing whether or not a particular login is legitimate. As an example, user impersonations may not occur at the user's endpoint, but instead, from another device or system. Certain embodiments of the invention likewise reflect an appreciation that profiling the entity behavior of a particular device or system may assist in determining whether or not it is acting suspiciously.

In certain embodiments, an account may be local account, which runs on a single machine. In certain embodiments, an account may be a global account, providing access to multiple resources. In certain embodiments, a process may be implemented to run in an unattended mode, such as when backing up files or checking for software updates. Certain embodiments of the invention reflect an appreciation that it is often advantageous to track events at the process level as a method of determining which events are associated with background processes and which are initiated by a user entity.

In certain embodiments, an EBP 638 may be implemented to include a user entity profile 602, an associated user entity mindset profile 630, a non-user entity profile 632, and an entity state 636. As used herein, a user entity profile 602 broadly refers to a collection of information that uniquely describes a user entity's identity and their associated behavior, whether the behavior occurs within a physical realm or cyberspace. In certain embodiments, as described in greater detail herein, the user entity profile 602 may include user profile attributes 604, user behavior factors 610, user mindset factors 622, or a combination thereof. In certain embodiments, the user profile attributes 604 may include certain user authentication factors 606, described in greater detail herein, and personal information 608.

As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity. In certain embodiments, the personal information 608 may include non-sensitive personal information associated with a user entity, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 606, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 610 broadly refers to information associated with a user entity's behavior, whether the behavior occurs within a physical realm or cyberspace. In certain embodiments, user behavior factors 610 may include the user entity's access rights 612, the user entity's interactions 614, and the date/time/frequency 616 of when the interactions 614 are enacted. In certain embodiments, the user behavior factors 610 may likewise include the user entity's location 618, and the gestures 620 used by the user entity to enact the interactions 614.

In certain embodiments, the user entity gestures 620 may include key strokes on a keypad, a cursor movement, a mouse movement or click, a finger swipe, tap, or other hand gesture, an eye movement, or some combination thereof. In certain embodiments, the user entity gestures 620 may likewise include the cadence of the user's keystrokes, the motion, force and duration of a hand or finger gesture, the rapidity and direction of various eye movements, or some combination thereof. In certain embodiments, the user entity gestures 620 may include various audio or verbal commands performed by the user.

As used herein, user mindset factors 622 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. Likewise, as used herein, an event broadly refers to the occurrence of an action performed by an entity. In certain embodiments, the user entity mindset factors 622 may include a personality type 624. Examples of known approaches for determining a personality type 624 include Jungian types, Myers-Briggs type indicators, Keirsey Temperament Sorter, Socionics, Enneagram of Personality, and Eyseneck's three-factor model.

In certain embodiments, the user mindset factors 622 may include various behavioral biometrics 626. As used herein, a behavioral biometric 628 broadly refers to a physiological indication of a user entity's mental state. Examples of behavioral biometrics 626 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user behavior factors 610, such as user entity gestures 620, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 620 may provide certain indications of the mental state of a particular user entity, they may not provide the reason for the user entity to be in a particular mental state. Likewise, certain embodiments of the invention include an appreciation that certain user entity gestures 620 and behavioral biometrics 626 are reflective of an individual user's personality type 624. As an example, aggressive, forceful keystrokes combined with an increased heart rate may indicate normal behavior for a particular user when composing end-of-month performance reviews. In various embodiments, certain user entity behavior factors 610, such as user gestures 620, may be correlated with certain contextual information, as described in greater detail herein.

In certain embodiments, a security analytics system 118, described in greater detail herein, may be implemented to include an entity behavior catalog (EBC) system 120. In certain embodiments, the EBC system 120 may be implemented to generate, manage, store, or some combination thereof, information related to the behavior of an associated entity. In various embodiments, the EBC system 120 may be implemented as a cyber behavior catalog. In certain of these embodiments, the cyber behavior catalog may be implemented to generate, manage, store, or some combination thereof, information related to cyber behavior, described in greater detail herein, enacted by an associated entity. In various embodiments, as likewise described in greater detail herein, the information generated, managed, stored, or some combination thereof, by such a cyber behavior catalog, may be related to cyber behavior enacted by a user entity, a non-user entity, or a combination thereof.

In certain embodiments, the EBC system 120 may be implemented to use a user entity profile 602 in combination with an entity state 636 to generate a user entity mindset profile 630. As used herein, entity state 636 broadly refers to the context of a particular event or entity behavior. In certain embodiments, the entity state 636 may be a long-term entity state or a short-term entity state. As used herein, a long-term entity state 636 broadly relates to an entity state 636 that persists for an extended interval of time, such as six months or a year. As likewise used herein, a short-term entity state 636 broadly relates to an entity state 636 that occurs for a brief interval of time, such as a few minutes or a day. In various embodiments, the method by which an entity state's 636 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location 618, whereas the presence of the user at either office corresponds to an entity state 636. To continue the example, the user may consistently work at their primary office Monday through Thursday, but at their company's corporate office on Fridays. To further continue the example, the user's presence at their primary work location may be a long-term entity state 636, while their presence at their secondary work location may be a short-term entity state 636. Accordingly, a date/time/frequency 616 user entity behavior factor 610 can likewise be associated with user behavior respectively enacted on those days, regardless of their corresponding locations. Consequently, the long-term user entity state 636 on Monday through Thursday will typically be "working at the branch office" and the short-term entity state 636 on Friday will likely be "working at the corporate office."

As likewise used herein, a user entity mindset profile 630 broadly refers to a collection of information that reflects an inferred mental state of a user entity at a particular time during the occurrence of an event or an enactment of a user behavior. As an example, certain information may be known about a user entity, such as their name, their title and position, and so forth, all of which are user profile attributes 604. Likewise, it may be possible to observe a user entity's associated user behavior factors 610, such as their interactions with various systems, when they log-in and log-out, when they are active at the keyboard, the rhythm of their keystrokes, and which files they typically use.

Certain embodiments of the invention reflect an appreciation these behavior factors 610 can be considered to be a behavioral fingerprint. In certain embodiments, the user behavior factors 610 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 610 may be implemented to ascertain the identity of a user entity. In certain embodiments, the user behavior factors 610 may be uniquely associated with a particular entity.

In certain embodiments, observed user behaviors may be used to build a user entity profile 602 for a particular user or other entity. In addition to creating a model of a user's various attributes and observed behaviors, these observations can likewise be used to infer things that are not necessarily explicit. Accordingly, in certain embodiments, a behavioral fingerprint may be used in combination with an EBP 638 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry.

As likewise used herein, a non-user entity profile 632 broadly refers to a collection of information that uniquely describes a non-user entity's identity and their associated behavior, whether the behavior occurs within a physical realm or cyberspace. In various embodiments, the non-user entity profile 632 may be implemented to include certain non-user profile attributes 634. As used herein, a non-user profile attribute 634 broadly refers to data or metadata that can be used, individually or in combination with other non-user profile attributes 634, to ascertain the identity of a non-user entity. In various embodiments, certain non-user profile attributes 634 may be uniquely associated with a particular non-user entity.

In certain embodiments, the non-user profile attributes 634 may be implemented to include certain identity information, such as a non-user entity's network, Media Access Control (MAC), or physical address, its serial number, associated configuration information, and so forth. In various embodiments, the non-user profile attributes 634 may be implemented to include non-user behavior information associated with interactions between certain user and non-user entities, the type of those interactions, the data exchanged during the interactions, the date/time/frequency of such interactions, and certain services accessed or provided.

In various embodiments, the EBC system 120 may be implemented to use certain data associated with an EBP 638 to provide a probabilistic measure of whether a particular electronically-observable event is of analytic utility. In certain embodiments, an electronically-observable event that is of analytic utility may be determined to be anomalous, abnormal, unexpected, or malicious. To continue the prior example, a user may typically work out of their company's corporate office on Fridays. Furthermore, various user mindset factors 622 within their associated user entity profile 602 may indicate that the user is typically relaxed and methodical when working with customer data. Moreover, the user's user entity profile 602 indicates that such user interactions 614 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 630 may reflect a nervous, fearful, or guilty mindset, which is inconsistent with the entity state 634 of dealing with customer data in general. More particularly, downloading customer data late at night on a day the user is generally not in their primary office results in an entity state 634 that is likewise inconsistent with the user's typical user behavior. As a result, the EBC system 120 may infer that the user's behavior may represent a security threat. Those of skill in the art will recognize that many such embodiments and examples are possible. Accordingly, the foregoing is not intended to limit the spirit, scope or intent of the invention.

Certain embodiments of the invention reflect an appreciation that the quantity, and relevancy, of information contained in a particular EBP 638 may have a direct bearing on its analytic utility when attempting to determine the trustworthiness of an associated entity and whether or not they represent a security risk. As used herein, the quantity of information contained in a particular EBP 638 broadly refers to the variety and volume of EBP elements it may contain, and the frequency of their respective instances, or occurrences, related to certain aspects of an associated entity's identity and behavior. As used herein, an EBP element broadly refers to any data element stored in an EBP 638, as described in greater detail herein. In various embodiments, an EBP element may be used to describe a particular aspect of an EBP, such as certain user profile attributes 604, user behavior factors 610, user mindset factors 622, user entity mindset profile 630, non-user profile attributes 634, and entity state 636.

In certain embodiments, statistical analysis may be performed on the information contained in a particular EBP 638 to determine the trustworthiness of its associated entity and whether or not they represent a security risk. For example, a particular authentication factor 606, such as a biometric, may be consistently used by a user entity for authenticating their identity to their endpoint device. To continue the example, a user ID and password may be used by the same, or a different user entity, in an attempt to access the endpoint device. As a result, the use of a user ID and password may indicate a security risk due to its statistical infrequency. As another example, a user entity may consistently access three different systems on a daily basis in their role as a procurement agent. In this example, the three systems may include a financial accounting system, a procurement system, and an inventory control system. To continue the example, an attempt by the procurement agent to access a sales forecast system may appear suspicious if never attempted before, even if the purpose for accessing the system is legitimate.

As likewise used herein, the relevancy of information contained in a particular EBP 638 broadly refers to the pertinence of the EBP elements it may contain to certain aspects of an associated entity's identity and behavior. To continue the prior example, an EBP 638 associated with the procurement agent may contain certain user profile attributes 604 related to their title, position, role, and responsibilities, all or which may be pertinent to whether or not they have a legitimate need to access the sales forecast system. In certain embodiments, the user profile attributes 604 may be implemented to include certain job description information. To further continue the example, such job description information may have relevance when attempting to determine whether or not the associated entity's behavior is suspicious. In further continuance of the example, job description information related to the procurement agent may include their responsibility to check sales forecast data, as needed, to ascertain whether or not to procure certain items. In these embodiments, the method by which it is determined whether the information contained in a particular EBP 638 is of sufficient quantity and relevancy is a matter of design choice.

Various embodiments of the invention likewise reflect an appreciation that accumulating sufficient information in an EBP 638 to make such a determination may take a certain amount of time. Likewise, various embodiments of the invention reflect an appreciation that the effectiveness or accuracy of such a determination may rely upon certain entity behaviors occurring with sufficient frequency, or in identifiable patterns, or a combination thereof, during a particular period of time. As an example, there may not be sufficient occurrences of a particular type of entity behavior to determine if a new entity behavior is inconsistent with known past occurrences of the same type of entity behavior. Accordingly, various embodiments of the invention reflect an appreciation that a sparsely-populated EBP 638 may likewise result in exposure to certain security vulnerabilities. Furthermore, the relevance of such sparsely-populated information initially contained in an EBP 638 first implemented may not prove very useful when using an EBP 638 to determine the trustworthiness of an associated entity and whether or not they represent a security risk.

Figure 7A:
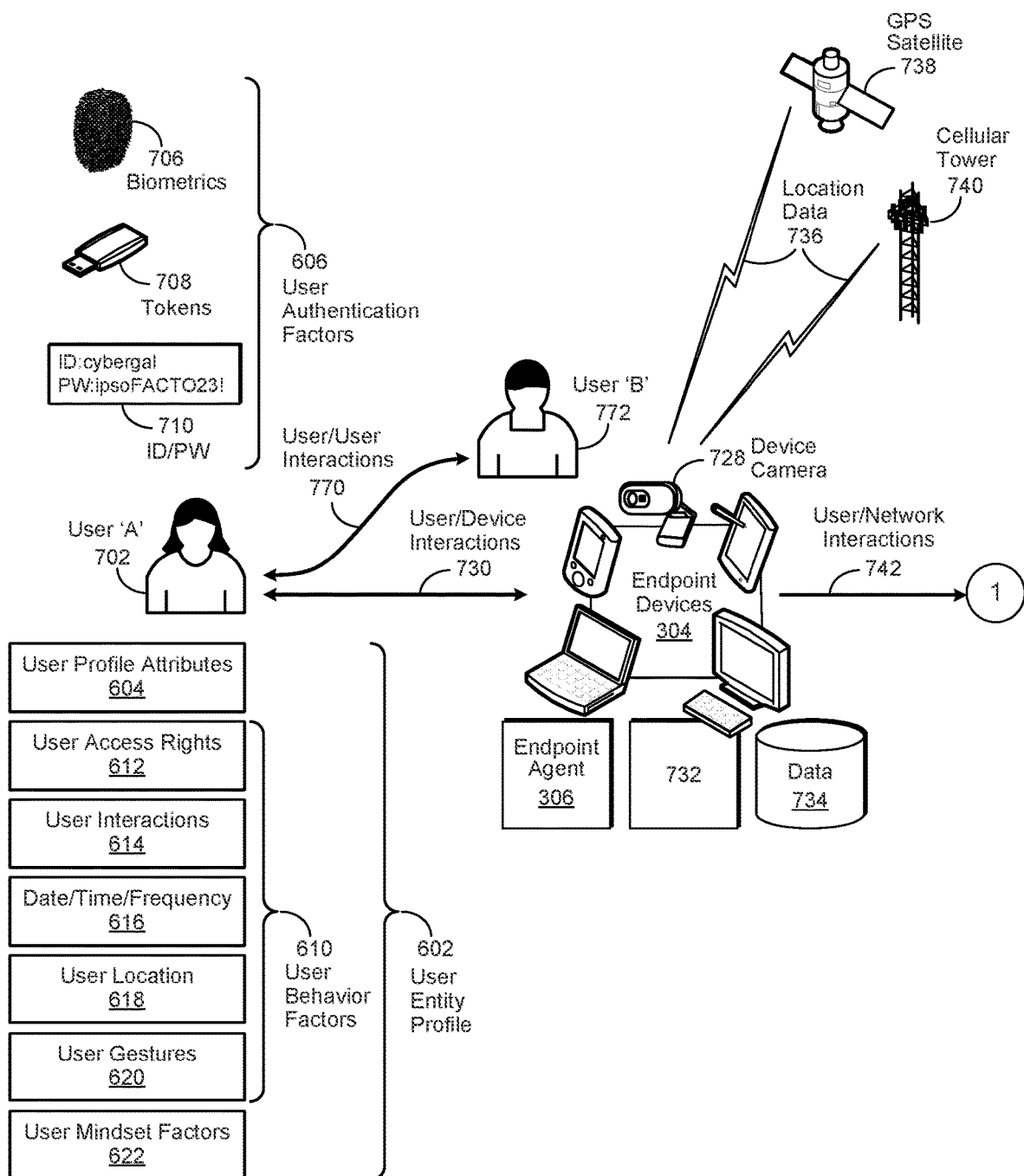
FIGS. 7a and 7b are a simplified block diagram of the operation of a security analytics system.
Figure 7B:
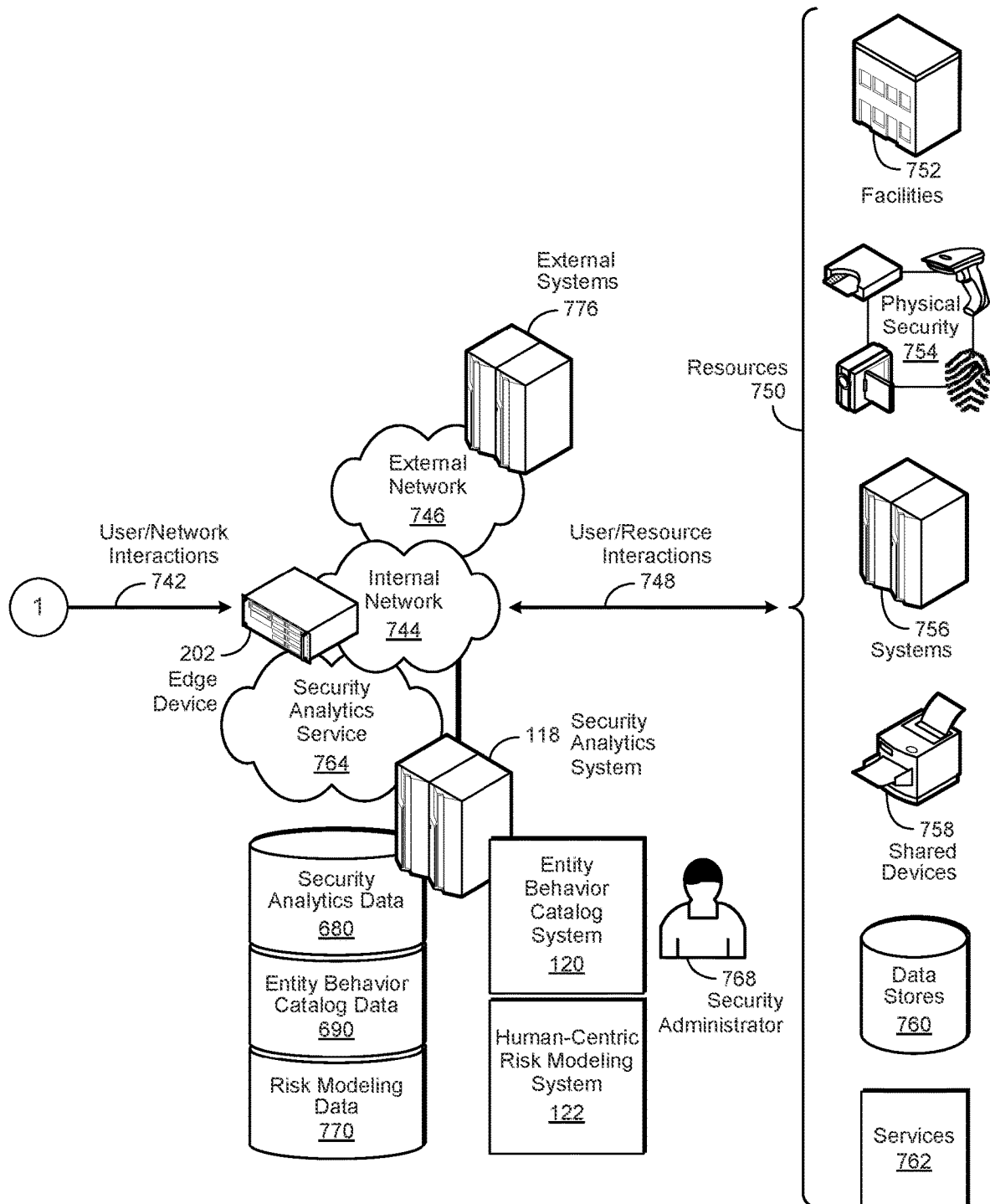

FIGS. 7a and 7b show a block diagram of a security analytics environment implemented in accordance with an embodiment of the invention. In certain embodiments, a security analytics system 118 may be implemented with an entity behavior catalog (EBC) system 120, a human-centric risk modeling system 122, or both. In certain embodiments, analyses performed by the security analytics system 118 may be used to identify behavior associated with a particular entity that may be of analytic utility.

In certain embodiments, as likewise described in greater detail herein, the EBC system 120, or the human-centric risk modeling system 122, or both, may be used in combination with the security analytics system 118 to perform such analyses. In various embodiments, certain data stored in a repository of security analytics data 680, or a repository of EBC data 690, or both, may be used by the security analytics system 118, the EBC system 120, the human-centric risk modeling system 122, or some combination thereof, to perform the analyses. Likewise, certain data stored in a repository of risk modeling data 770 may be used by the security analytics system 118, the EBC system 120, or the human-centric risk modeling system 122, or a combination thereof, to perform the analyses.

In certain embodiments, the entity behavior of analytic utility may be identified at a particular point in time, during the occurrence of an event, the enactment of a user or non-user entity behavior, or a combination thereof. As used herein, an entity broadly refers to something that exists as itself, whether physically or abstractly. In certain embodiments, an entity may be a user entity, a non-user entity, or a combination thereof. In certain embodiments, a user entity may be an individual user, such as user 'A' 702 or 'B' 772, a group, an organization, or a government. In certain embodiments, a non-user entity may likewise be an item, a device, such as endpoint 304 and edge 202 devices, a network, such as an internal 744 and external 746 networks, a domain, an operation, or a process. In certain embodiments, a non-user entity may be a resource 750, such as a geographical location or formation, a physical facility 752, such as a venue, various physical security devices 754, a system 756, shared devices 758, such as printer, scanner, or copier, a data store 760, or a service 762, such as a service 762 operating in a cloud environment.

As likewise used herein, an event broadly refers to the occurrence of an action performed by an entity. In certain embodiments, the action may be directly associated with an entity behavior, described in greater detail herein. As an example, a first user may attach a binary file infected with a virus to an email that is subsequently sent to a second user. In this example, the act of attaching the binary file to the email is directly associated with an entity behavior enacted by the first user. In certain embodiments, the action may be indirectly associated with an entity behavior. To continue the example, the recipient of the email may open the infected binary file, and as a result, infect their computer with malware. To further continue the example, the act of opening the infected binary file is directly associated with an entity behavior enacted by the second user. However, the infection of the email recipient's computer by the infected binary file is indirectly associated with the described entity behavior enacted by the second user.

In various embodiments, certain user authentication factors 606 may be used to authenticate the identity of a user entity. In certain embodiments, the user authentication factors 606 may be used to ensure that a particular user entity, such as user 'A' 702 or 'B' 772, is associated with their corresponding user entity profile 602, rather than a user entity profile 602 associated with another user. In certain embodiments, the user authentication factors 606 may include a user's biometrics 706 (e.g., a fingerprint or retinal scan), tokens 708 (e.g., a dongle containing cryptographic keys), user identifiers and passwords (ID/PW) 710, and personal identification numbers (PINs).

In certain embodiments, information associated with such user entity behavior may be stored in a user entity profile 602, described in greater detail herein. In certain embodiments, the user entity profile 602 may be stored in a repository of entity behavior catalog (EBC) data 690. In certain embodiments, as likewise described in greater detail herein, the user entity profile 602 may include user profile attributes 604, user behavior factors 610, user mindset factors 622, or a combination thereof. As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity.

As likewise used herein, a user behavior factor 610 broadly refers to information associated with a user's behavior, whether the behavior occurs within a physical realm or cyberspace. In certain embodiments, the user behavior factors 610 may include the user's access rights 612, the user's interactions 614, and the date/time/frequency 616 of those interactions 614. In certain embodiments, the user behavior factors 610 may likewise include the user's location 618 when the interactions 614 are enacted, and the user gestures 620 used to enact the interactions 614.

In various embodiments, certain date/time/frequency 616 user behavior factors 610 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 604, user behavior factors 610, user mindset factors 622, or a combination thereof, to one or more instants in time. As an example, user 'A' 702 may access a particular system 756 to download a customer list at 3:47 PM on Nov. 3, 2017. Analysis of their user behavior profile indicates that it is not unusual for user 'A' 702 to download the customer list on a weekly basis. However, examination of their user behavior profile also indicates that user 'A' 702 forwarded the downloaded customer list in an email message to user 'B' 772 at 3:49 PM that same day. Furthermore, there is no record in their user behavior profile that user 'A' 702 has ever communicated with user 'B' 772 in the past. Moreover, it may be determined that user 'B' 872 is employed by a competitor. Accordingly, the correlation of user 'A' 702 downloading the customer list at one point in time, and then forwarding the customer list to user 'B' 772 at a second point in time shortly thereafter, is an example of societal time.

In a variation of the prior example, user 'A' 702 may download the customer list at 3:47 PM on Nov. 3, 2017. However, instead of immediately forwarding the customer list to user 'B' 772, user 'A' 702 leaves for a two week vacation. Upon their return, they forward the previously-downloaded customer list to user 'B' 772 at 9:14 AM on Nov. 20, 2017. From an ontological time perspective, it has been two weeks since user 'A' 702 accessed the system 756 to download the customer list. However, from a societal time perspective, they have still forwarded the customer list to user 'B' 772, despite two weeks having elapsed since the customer list was originally downloaded.

Accordingly, the correlation of user 'A' 702 downloading the customer list at one point in time, and then forwarding the customer list to user 'B' 772 at a much later point in time, is another example of societal time. More particularly, it may be inferred that the intent of user 'A' 702 did not change during the two weeks they were on vacation. Furthermore, user 'A' 702 may have attempted to mask an intended malicious act by letting some period of time elapse between the time they originally downloaded the customer list and when they eventually forwarded it to user 'B' 772. From the foregoing, those of skill in the art will recognize that the use of societal time may be advantageous in determining whether a particular entity behavior is of analytic utility. As used herein, mindset factors 622 broadly refer to information used to infer the mental state of a user at a particular point in time, during the occurrence of an event, an enactment of a user behavior, or combination thereof.

In certain embodiments, the security analytics system 118 may be implemented to process certain entity attribute information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain entity behavior elements to resolve the identity of an entity at a particular point in time. An entity behavior element, as used herein, broadly refers to a discrete element of an entity's behavior during the performance of a particular operation in a physical realm, cyberspace, or a combination thereof. In certain embodiments, such entity behavior elements may be associated with a user/device 730, a user/network 742, a user/resource 748, a user/user 770 interaction, or a combination thereof.

As an example, user 'A' 702 may use an endpoint device 304 to browse a particular web page on a news site on an external system 776. In this example, the individual actions performed by user 'A' 702 to access the web page are entity behavior elements that constitute an entity behavior, described in greater detail herein. As another example, user 'A' 702 may use an endpoint device 304 to download a data file from a particular system 756. In this example, the individual actions performed by user 'A' 702 to download the data file, including the use of one or more user authentication factors 606 for user authentication, are entity behavior elements that constitute an entity behavior. In certain embodiments, the user/device 730 interactions may include an interaction between a user, such as user 'A' 702 or 'B' 772, and an endpoint device 304.

In certain embodiments, the user/device 730 interaction may include interaction with an endpoint device 304 that is not connected to a network at the time the interaction occurs. As an example, user 'A' 702 or 'B' 772 may interact with an endpoint device 304 that is offline, using applications 732, accessing data 734, or a combination thereof, it may contain. Those user/device 730 interactions, or their result, may be stored on the endpoint device 304 and then be accessed or retrieved at a later time once the endpoint device 304 is connected to the internal 744 or external 746 networks. In certain embodiments, an endpoint agent 306 may be implemented to store the user/device 730 interactions when the user device 304 is offline.

In certain embodiments, an endpoint device 304 may be implemented with a device camera 728. In certain embodiments, the device camera 728 may be integrated into the endpoint device 304. In certain embodiments, the device camera 728 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 728 may be implemented to capture and provide user/device 730 interaction information to an endpoint agent 306. In various embodiments, the device camera 728 may be implemented to provide surveillance information related to certain user/device 730 or user/user 770 interactions. In certain embodiments, the surveillance information may be used by the security analytics system 118 to detect entity behavior associated with a user entity, such as user 'A' 702 or user 'B' 772 that may be of analytic utility.

In certain embodiments, the endpoint device 304 may be used to communicate data through the use of an internal network 744, an external network 746, or a combination thereof. In certain embodiments, the internal 744 and the external 746 networks may include a public network, such as the Internet, a physical private network, a virtual private network (VPN), or any combination thereof. In certain embodiments, the internal 744 and external 746 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 770 interactions may include interactions between two or more user entities, such as user 'A' 702 and 13' 772. In certain embodiments, the user/user interactions 770 may be physical, such as a face-to-face meeting, via a user/device 730 interaction, a user/network 742 interaction, a user/resource 748 interaction, or some combination thereof. In certain embodiments, the user/user 770 interaction may include a face-to-face verbal exchange. In certain embodiments, the user/user 770 interaction may include a written exchange, such as text written on a sheet of paper. In certain embodiments, the user/user 770 interaction may include a face-to-face exchange of gestures, such as a sign language exchange.

In certain embodiments, temporal event information associated with various user/device 730, user/network 742, user/resource 748, or user/user 770 interactions may be collected and used to provide real-time resolution of the identity of an entity at a particular point in time. Those of skill in the art will recognize that many such examples of user/device 730, user/network 742, user/resource 748, and user/user 770 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 304 or edge 202 device, a physical security device 754, a system 756, a shared device 758, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or other entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 756 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 736. In certain embodiments, the endpoint device 304 may be configured to receive such location data 736, which is used as a data source for determining the user's location 618. In certain embodiments, the location data 736 may include Global Positioning System (GPS) data provided by a GPS satellite 738. In certain embodiments, the location data 736 may include location data 736 provided by a wireless network, such as from a cellular network tower 740. In certain embodiments (not shown), the location data 736 may include various Internet Protocol (IP) or other network address information assigned to the endpoint 304 or edge 202 device. In certain embodiments (also not shown), the location data 736 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 752, physical security device 754, system 756, or shared device 758. As an example, the endpoint device 304 may be directly connected to an ingress/egress system, such as an electronic lock on a door or an access gate of a parking garage. As another example, the endpoint device 304 may be indirectly connected to a physical security device 754 through a dedicated security network.

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring certain entity behaviors, assess the corresponding risk they may represent, individually or in combination, and respond with an associated response. In certain embodiments, such responses may be based upon contextual information, described in greater detail herein, associated with a given entity behavior.

In certain embodiments, various information associated with a user entity profile 602, likewise described in greater detail herein, may be used to perform the risk-adaptive protection operations. In certain embodiments, the user entity profile 602 may include user profile attributes 604, user behavior factors 610, user mindset factors 622, or a combination thereof. In these embodiments, the information associated with a user entity profile 602 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 764. In certain embodiments, the security analytics service 764 may be implemented in a cloud environment familiar to those of skill in the art. In various embodiments, the security analytics system 118 may use data stored in a repository of security analytics data 680, entity behavior catalog data 690, entity identifier data 670, and event data 672, or a combination thereof, in the performance of certain security analytics operations, described in greater detail herein. Those of skill in the art will recognize that many such embodiments are possible. Accordingly, the foregoing is not intended to limit the spirit, scope or intent of the invention.

Figure 8:
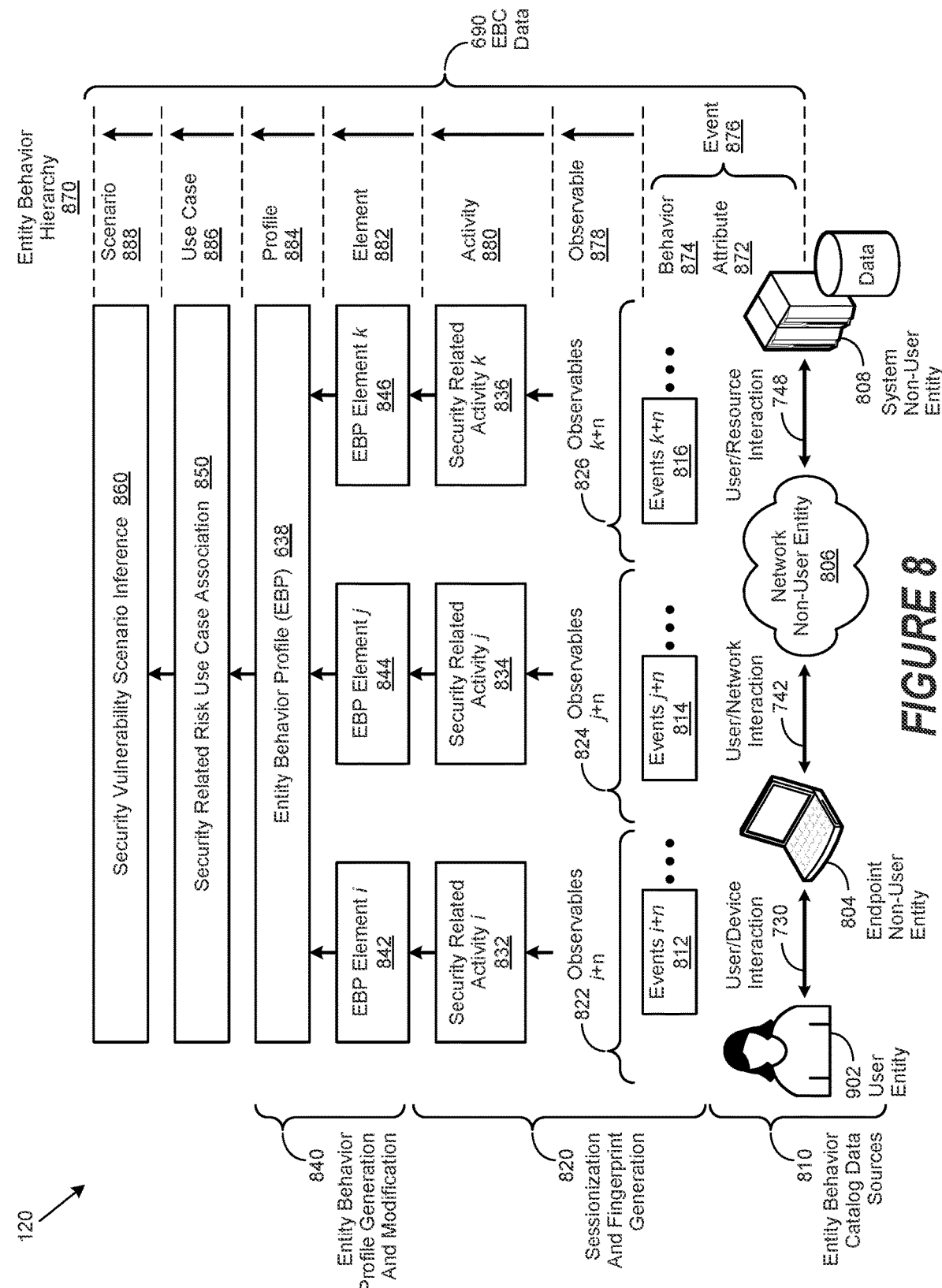
FIG. 8 is a simplified block diagram showing the mapping of an event to a security vulnerability scenario.

FIG. 8 is a simplified block diagram showing the mapping of an event to a security vulnerability scenario implemented in accordance with an embodiment of the invention. In certain embodiments, an entity behavior catalog (EBC) system 120 may be implemented to identify a security related activity, described in greater detail herein. In certain embodiments, the security related activity may be based upon an observable, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the EBC data sources 810 shown in FIGS. 8, 15, 16*b*, and 17.

In certain embodiments, as likewise described in greater detail herein, the EBC system 120 may be implemented to identify a particular event of analytic utility by analyzing an associated security related activity. In certain embodiments, the EBC system 120 may be implemented to generate entity behavior catalog data based upon an identified event of analytic utility associated with a particular security related activity. In various embodiments, the EBC system 120 may be implemented to associate certain entity behavior data it may generate with a predetermined abstraction level, described in greater detail herein.

In various embodiments, the EBC system 120 may be implemented to use certain EBC data 690 and an associated abstraction level to generate a hierarchical set of entity behaviors 870, described in greater detail herein. In certain embodiments, the hierarchical set of entity behaviors 870 generated by the EBC system 120 may represent an associated security risk, likewise described in greater detail herein. Likewise, as described in greater detail herein, the EBC system 120 may be implemented in certain embodiments to store the hierarchical set of entity behaviors 870 and associated abstraction level information within a repository of EBC data 690. In certain embodiments, the repository of EBC data 690 may be implemented to provide an inventory of entity behaviors for use when performing a security operation, likewise described in greater detail herein.

Referring now to FIG. 8, the EBC system 120 may be implemented in various embodiments to receive certain event information, described in greater detail herein, corresponding to an event associated with an entity interaction. As used herein, event information broadly refers to any information directly or indirectly related to an event. As likewise used herein, an event broadly refers to the occurrence of at least one action performed by an entity. In certain embodiments, the at least one action performed by an entity may include the enactment of an entity behavior, described in greater detail herein. In certain embodiments, the entity behavior may include an entity's physical behavior, cyber behavior, or a combination thereof, as likewise described in greater detail herein.

Likewise, as used herein, an entity interaction broadly refers to an action influenced by another action enacted by an entity. As an example, a first user entity may perform an action, such as sending a text message to a second user entity, who in turn replies with a response. In this example, the second user entity's action of responding is influenced by the first user entity's action of sending the text message. In certain embodiments, an entity interaction may include the occurrence of at least one event enacted by one entity when interacting with another, as described in greater detail herein. In certain embodiments, an event associated with an entity interaction may include at least one entity attribute, described in greater detail herein, and at least one entity behavior, likewise described in greater detail herein.

In certain embodiments, an entity attribute and an entity behavior may be respectively abstracted to an entity attribute 872 and an entity behavior 874 abstraction level. In certain embodiments, an entity attribute 872 and an entity behavior 874 abstraction level may then be associated with an event 876 abstraction level. In certain embodiments, the entity attribute 872, entity behavior 874, and event 876 abstraction levels may in turn be associated with a corresponding entity behavior hierarchy 870, as described in greater detail herein.

In various embodiments, the event information may be received from certain EBC data sources 810, such as a user 802 entity, an endpoint 804 non-user entity, a network 806 non-user entity, or a system 808 non-user entity. In certain embodiments, one or more events may be associated with a particular entity interaction. As an example, as shown in FIG. 8, one or more events i+n 812 may be associated with a user/device 730 interaction between a user 802 entity and an endpoint 904 non-user entity. Likewise, one or more events j+n 814 may be associated with a user/network 742 interaction between a user 802 entity and a network 806 non-user entity. As likewise shown in FIG. 8, one or more events k+n 916 816 may be associated with a user/resource 748 interaction between a user 802 entity and a system 808 non-user entity.

In certain embodiments, details of an event, such as events i+n 812, j+n 814, and k+n 816, may be included in their associated event information. In various embodiments, as described in greater detail herein, analytic utility detection operations may be performed on such event information to identify events of analytic utility. In various embodiments, certain event information associated with an event determined to be of analytic utility may be used to derive a corresponding observable. As used herein, an observable broadly refers to an event of analytic utility whose associated event information may include entity behavior that may be anomalous, abnormal, unexpected, malicious, or some combination thereof, as described in greater detail herein.

As an example, the details contained in the event information respectively corresponding to events i+n 812, j+n 814, and k+n 816 may be used to derive observables i+n 822, j+n 824, and k+n 826. In certain embodiments, the resulting observables i+n 822, j+n 824, and k+n 826 may then be respectively associated with a corresponding observable 878 abstraction level. In certain embodiments, the observable 878 abstraction level may in turn be associated with a corresponding entity behavior hierarchy 870, as described in greater detail herein.

In certain embodiments, the resulting observables may in turn be processed to generate an associated security related activity. As used herein, a security related activity broadly refers to an abstracted description of an interaction between two entities, described in greater detail herein, which may represent anomalous, abnormal, unexpected, or malicious entity behavior. For example, observables i+n 822, j+n 824, and k+n 826 may in turn be processed to generate corresponding security related activities i 832, j 834, and k 836. In certain embodiments, the resulting security related activities, i 832, j 834, and k 836 may then be respectively associated with a corresponding security related activity 880 abstraction level. In certain embodiments, the security related activity 880 abstraction level may in turn be associated with a corresponding entity behavior hierarchy 870, as described in greater detail herein.

In various embodiments, sessionization and fingerprint generation operations 820, described in greater detail herein, may be performed to associate certain events, observables, and security related activities, or a combination thereof, with a corresponding session, likewise described in greater detail herein. As an example, events i+n 812, j+n 814, k+n 816, observables i+n 822, j+n 824, k+n 826, and security related activities i 832, j 834, k 836 may be associated with corresponding sessions. In certain embodiments, a security related activity may be processed with associated contextual information, described in greater detail herein, to generate a corresponding EBP element.

For example, security related activities i 832, j 834, and k 836 may be processed with associated contextual information to generate corresponding EBP elements i 842, j 844, and k 846. In various embodiments, the resulting EBP elements i 842, j 844, and k 846 may then be associated with a corresponding EBP element 882 abstraction level. In certain embodiments, the EBP element 882 abstraction level may in turn be associated with a corresponding entity behavior hierarchy 870, as described in greater detail herein.

In certain embodiments, EBP generation and modification 840 operations may be performed to associate one or more EBP elements with a particular EBP 638. As an example, EBP elements i 842, j 844, and k 946 may be associated with a particular EBP 638, which may likewise be respectively associated with the various entities involved in the user/device 730, user/network 742, or user/resource 748 interactions. In these embodiments, the method by which the resulting EBP elements i 842, j 844, and k 846 are associated with a particular EBP 638 is a matter of design choice. In certain embodiments, the EBP 638 may likewise associated with an EBP 884 abstraction level. In certain embodiments, the EBP 884 abstraction level may in turn be associated with a corresponding entity behavior hierarchy 870, as described in greater detail herein.

In various embodiments, the resulting EBP 638 may be used in the performance of security risk use case association 850 operations to identify one or more security risk use cases that match certain entity behavior information stored in the EBP 638. As used herein, a security risk use case broadly refers to a set of security related activities that create a security risk narrative that can be used to adaptively draw inferences, described in greater detail herein, from entity behavior enacted by a particular entity. In certain of these embodiments, the entity behavior information may be stored within the EBP 638 in the form of an EBP element, a security related activity, an observable, or an event, or a combination thereof. In certain embodiments, identified security risk use cases may then be associated with a security risk use case 886 abstraction level. In certain embodiments, the security risk use case 886 abstraction level may in turn be associated with a corresponding entity behavior hierarchy 870, as described in greater detail herein.

In certain embodiments, the results of the security risk use case association 850 operations may in turn be used to perform security vulnerability scenario inference 860 operations to associate one or more security risk use cases with one or more security vulnerability scenarios. As used herein, a security vulnerability scenario broadly refers to a grouping of one or more security risk use cases that represent a particular class of security vulnerability. In certain embodiments, the associated security vulnerability scenarios may then be associated with a security vulnerability scenario 888 abstraction level. In certain embodiments, the security vulnerability scenario 888 abstraction level may in turn be associated with a corresponding entity behavior hierarchy 870, as described in greater detail herein.

In various embodiments, certain event information associated with events i+n 812, j+n 814, and k+n 816 and certain observable information associated with observables i+n 822, j+n 824, and k+n 826 may be stored in a repository of EBC data 690. In various embodiments, certain security related activity information associated with security related activities i 832, j 834, and k 836 and EBP elements i 842, j 844, and k 846 may likewise be stored in the repository of EBC data 690. Likewise, in various embodiments, certain security risk use case association and security vulnerability scenario association information respectively associated with the performance of security risk use case association 850 and security vulnerability scenario inference 860 operations may be stored in the repository of EBC data 690.

Figure 9:
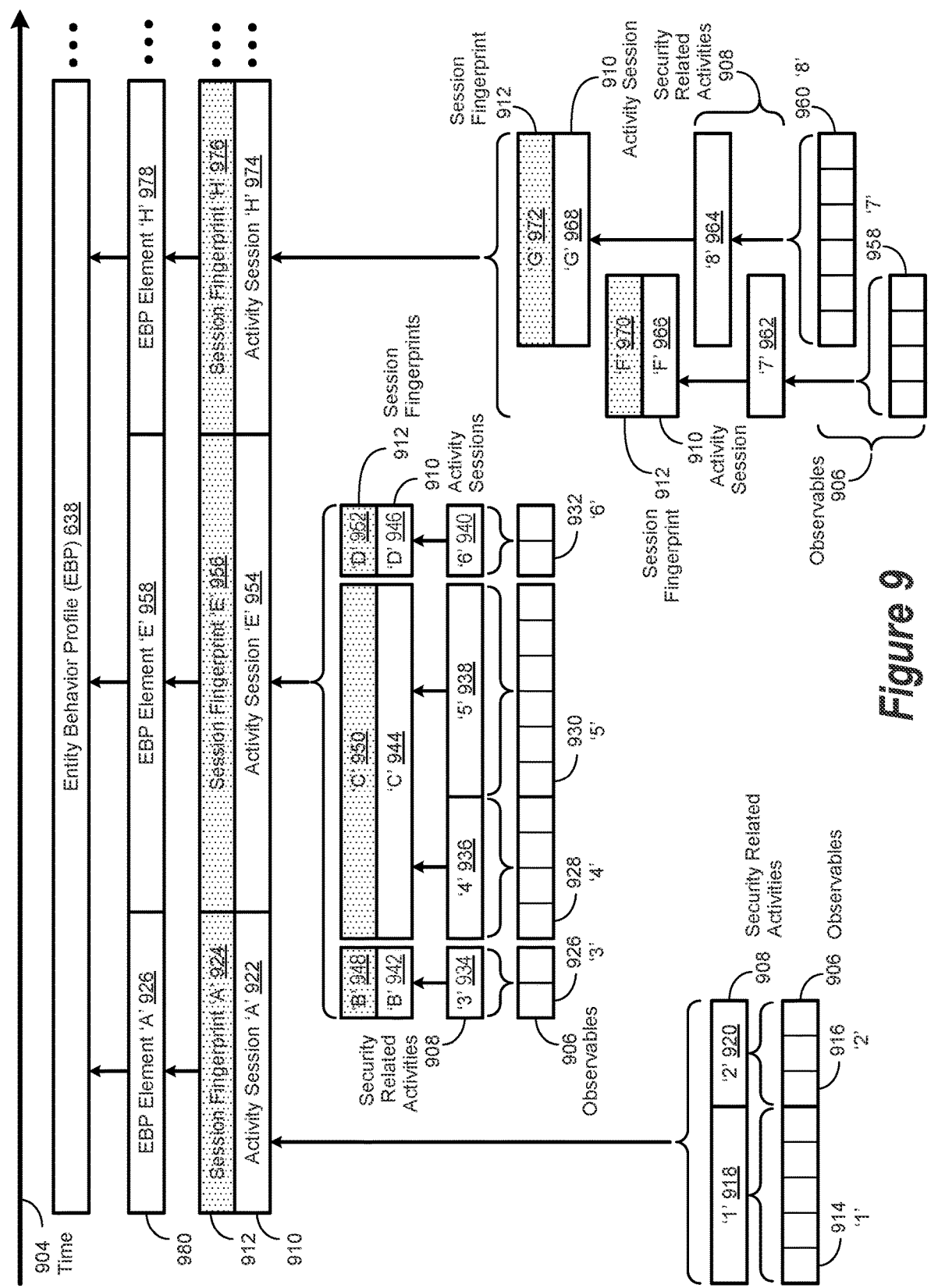
FIG. 9 is a simplified block diagram of the generation of a session and a corresponding session-based fingerprint.

FIG. 9 is a simplified block diagram of the generation of a session and a corresponding session-based fingerprint implemented in accordance with an embodiment of the invention. In certain embodiments, an observable 906 may be derived from an associated event, as described in greater detail herein. In certain embodiments, one or more observables 906 may be processed to generate a corresponding security related activity 908. In certain embodiments, one or more security related activities 908 may then be respectively processed to generate a corresponding activity session 910. In turn, the session 910 may be processed in certain embodiments to generate a corresponding session fingerprint 912. In certain embodiments, the resulting activity session 910 and its corresponding session fingerprint 912, individually or in combination, may then be associated with a particular entity behavior profile (EBP) element 980. In certain embodiments the EBP element 980 may in turn be associated with an EBP 638.

In certain embodiments, intervals in time 904 respectively associated with various security related activities 908 may be contiguous. For example, as shown in FIG. 9, the intervals in time 904 associated with observables 906 '1' 914 and '2' 916 may be contiguous. Accordingly, the intervals in time 904 associated with the security related activities 908 '1' 918 and '2' 920 respectively generated from observables 906 '1' 914 and '2' 916 would likewise be contiguous.

As likewise shown in FIG. 9, the resulting security related activities 908 '1' 918 and '2' 920 may be processed to generate an associated activity session 'A' 922, which then may be processed to generate a corresponding session fingerprint 'A' 924. In certain embodiments, activity session 'A' 922 and its corresponding session fingerprint 'A' 924 may be used to generate a new entity behavior profile (EBP) element 980 'A' 926. In certain embodiments, EBP element 980 'A' 926 generated from activity session 910 'A' 922 and its corresponding session fingerprint 912 'A' 924 may be associated with an existing EBP 638.

To provide an example, a user may enact various observables 906 '1' 914 to update sales forecast files, followed by the enactment of various observables 906 '2' 1016 to attach the updated sales forecast files to an email, which is then sent to various co-workers. In this example, the enactment of observables 906 '1' 914 and '2' 916 result in the generation of security related activities 908 '1' 918 and '2' 920, which in turn are used to generate activity session 910 'A' 922. In turn, the resulting activity session 910 'A' 922 is then used to generate its corresponding session-based fingerprint 912 'A' 924. To continue the example, activity session 910 'A' 922 is associated with security related activities 908 '1' 918 and '2' 920, whose associated intervals in time 904 are contiguous, as they are oriented to the updating and distribution of sales forecast files via email.

Various aspects of the invention reflect an appreciation that a user may enact certain entity behaviors on a recurring basis. To continue the preceding example, a user may typically update sales forecast files and distribute them to various co-workers every morning between 8:00 AM and 10:00 AM. Accordingly, the activity session 910 associated with such a recurring activity may result in a substantively similar session fingerprint 912 week-by-week. However, a session fingerprint 912 for the same session 910 may be substantively different should the user happen to send an email with an attached sales forecast file to a recipient outside of their organization. Consequently, a session fingerprint 912 that is inconsistent with session fingerprints 912 associated with past activity sessions 910 may indicate anomalous, abnormal, unexpected or malicious behavior.

In certain embodiments, two or more activity sessions 910 may be noncontiguous, but associated. In certain embodiments, an activity session 910 may be associated with two or more sessions 910. In certain embodiments, an activity session 910 may be a subset of another activity session 910. As an example, as shown in FIG. 9, the intervals in time 904 respectively associated with observables 906 '3' 914 and '6' 932 may be contiguous. Likewise, the intervals in time 904 associated with observables 906 '4' 936 and '5' 938 may be contiguous.

Accordingly, the intervals in time 904 associated with the security related activities 908 '4' 936 and '5' 938 respectively generated from observables 906 '4' 928 and '5' 930 would likewise be contiguous. However, the intervals in time 904 associated with security related activities 908 '4' 936 and '5' 938 would not be contiguous with the intervals in time respectively associated with security related activities 908 '3' 934 and '6' 940.

As likewise shown in FIG. 9, the resulting security related activities 908 '3' 934 and '6' 940 may be respectively processed to generate corresponding sessions 'B' 942 and 'D' 946, while security related activities 908 '4' 936 and '5' 938 may be processed to generate activity session 910 'C.' 944. In turn, activity sessions 910 'B' 942, 'C' 944, and 'D' 946 are then respectively processed to generate corresponding session-based fingerprints 912 'B' 948, 'C' 950 and 'D' 952.

Accordingly, the intervals of time 904 respectively associated with activity sessions 910 'B' 942, 'C' 944, and 'D' 946, and their corresponding session fingerprints 912 'B' 948, 'C' 950 and 'D' 952, are not contiguous. Furthermore, in this example activity sessions 910 'B' 942, 'C' 944, and 'D' 946, and their corresponding session fingerprints 912 'B' 948, 'C' 950 and 'D' 952, are not associated with the EBP 638. Instead, as shown in FIG. 9, activity sessions 910 'B' 942, 'C' 944, and 'D' 946 are processed to generate activity session 910 'E' 954 and session fingerprints 912 'B' 948, 'C' 950 and 'D' 952 are processed to generate session fingerprint 912 'E' 956. In certain embodiments, activity session 'E' 954 and its corresponding session fingerprint 'E' 956 may be used to generate a new EBP element 980 'E' 958. In certain embodiments, EBP element 980 'E' 958 generated from activity session 910 'E' 954 and its corresponding session fingerprint 912 'E' 956 may be associated with an existing EBP 638.

Accordingly, session 910 'E' 1054 is associated with activity sessions 910 'B' 942, 'C' 944, and 'D' 946. Likewise, sessions 910 'B' 942, 'C' 944, and 'D' 946 are subsets of session 910 'E' 954. Consequently, while the intervals of time respectively associated with activity sessions 910 'B' 942, 'C' 944, and 'D' 946, and their corresponding session fingerprints 912 'B' 948, 'C' 950 and 'D' 952 may not be contiguous, they are associated as they are respectively used to generate session 910 'E' 954 and its corresponding session fingerprint 912 'E' 1056.

To provide an example, a user plans to attend a meeting scheduled for 10:00 AM at a secure facility owned by their organization to review a project plan with associates. However, the user wishes to arrive early to prepare for the meeting. Accordingly, they arrive at 9:00 AM and use their security badge to authenticate themselves and enter the facility. In this example, the enactment of observables 906 '3' 926 may correspond to authenticating themselves with their security badge and gaining access to the facility. As before, observables 906 '3' 926 may be used to generate a corresponding security related activity 908 '3' 934. In turn, the security related activity 908 '3' 934 may then be used to generate session 910 'B' 942, which is likewise used in turn to generate a corresponding session fingerprint 912 'B' 948.

The user then proceeds to a conference room reserved for the meeting scheduled for 10:00 AM and uses their time alone to prepare for the upcoming meeting. Then, at 10:00 AM, the scheduled meeting begins, followed by the user downloading the current version of the project plan, which is then discussed by the user and their associate for a half hour. At the end of the discussion, the user remains in the conference room and spends the next half hour making revisions to the project plan, after which it is uploaded to a datastore for access by others.

In this example, observables 906 '4' 928 may be associated with the user downloading and reviewing the project plan and observables 906 '5' 930 may be associated with the user making revisions to the project plan and then uploading the revised project plan to a datastore. Accordingly, behavior elements 906 '4' 928 and '5' 930 may be respectively used to generate security related activities 908 '4' 936 and '5' 938. In turn, the security related activities 908 '4' 936 and '5' 938 may then be used to generate session 910 'C.' 944, which may likewise be used in turn to generate its corresponding session-based fingerprint 912 'C.' 950.

To continue the example, the user may spend the next half hour discussing the revisions to the project plan with a co-worker. Thereafter, the user uses their security badge to exit the facility. In continuance of this example, observables 906 '6' 932 may be associated with the user using their security badge to leave the secure facility. Accordingly, observables 906 '6' 932 may be used to generate a corresponding security related activity 908 '6' 940, which in turn may be used to generate a corresponding session 910 'D' 946, which likewise may be used in turn to generate a corresponding session fingerprint 912 'D' 952.

In this example, the intervals of time 904 respectively associated with activity sessions 910 'B' 942, 'C' 944, and 'D' 946, and their corresponding session fingerprints 912 'B' 948, 'C' 950, and 'D' 952, are not contiguous. However they may be considered to be associated as their corresponding observables 906 '3' 926, '4' 928, '5' 930, and '6' 932 all have the common attribute of having been enacted within the secure facility. Furthermore, security related activities 908 '4' 936 and '5' 938 may be considered to be associated as their corresponding observables 906 have the common attribute of being associated with the project plan.

Accordingly, while the intervals of time 904 respectively associated with activity sessions 910 'B' 942, 'C' 944, and 'D' 946, and their corresponding session-based fingerprints 912 'B' 948, 'C' 950, and 'D' 952, may not be contiguous, they may be considered to be associated. Consequently, sessions 910 'B' 942, 'C' 944, and 'D' 946 may be considered to be a subset of session 910 'E' 954 and session-based fingerprints 912 'B' 948, 'C' 950, and 'D' 952 may be considered to be a subset of session-based fingerprint 912 'E' 956.

In certain embodiments, the interval of time 904 corresponding to a first activity session 910 may overlap an interval of time 904 corresponding to a second activity session 910. For example, observables 906 '7' 958 and '8' 960 may be respectively processed to generate security related activities 908 '7' 962 and '8' 964. In turn, the resulting security related activities 908 '7' 962 and '8' 964 are respectively processed to generate corresponding activity sessions 910 'F' 966 and 'G' 968. Sessions The resulting activity sessions 910 'F' 966 and 'G' 968 are then respectively processed to generate corresponding session-based fingerprints 912 'F' 970 and 'G' 972.

However, in this example activity sessions 910 'F' 966 and 'G' 968, and their corresponding session fingerprints 912 'F' 970 and 'G' 972, are not associated with the EBP 638. Instead, as shown in FIG. 9, activity sessions 910 'F' 966 and 'G' 968 are processed to generate activity session 910 'E' 954 and session fingerprints 912 'F' 970 and 'G' 972 are processed to generate session fingerprint 912 'H' 976. In certain embodiments, activity session 'H' 974 and its corresponding session fingerprint 'H' 976 may be used to generate a new EBP element 980 'H' 978. In certain embodiments, EBP element 980 'H' 978 generated from activity session 910 'E' 974 and its corresponding session fingerprint 912 'E' 976 may be associated with an existing EBP 638.

Accordingly, the time 904 interval associated with activity session 910 'F' 966 and its corresponding session fingerprint 912 'F' 970 overlaps with the time interval 904 associated with activity session 910 'G' 968 and its corresponding session fingerprint 912 'G' 972. As a result, activity sessions 910 'F' 966 and 'G' 968 are subsets of activity session 910 'H' 974. Consequently, while the intervals of time respectively associated with activity sessions 910 'F' 966 and 'G' 968, and their corresponding session fingerprints 912 'F' 970 and 'G' 972 may overlap, they are associated as they are respectively used to generate activity session 910 'H' 974 and its corresponding session fingerprint 912 'H' 976.

To provide an example, a user may decide to download various images for placement in an online publication. In this example, observables 906 '7' 958 may be associated with the user iteratively searching for, and downloading, the images they wish to use in the online publication. However, the user may not begin placing the images into the online publication until they have selected and downloaded the first few images they wish to use.

To continue the example, observables 906 '8' may be associated with the user placing the downloaded images in the online publication. Furthermore, the placement of the downloaded images into the online publication may begin a point in time 904 subsequent to when the user began to download the images. Moreover, the downloading of the images may end at a point in time 904 sooner than when the user completes the placement of the images in the online publication.

In continuance of the example, observables 906 '7' 958 and '8' 960 may be respectively processed to generate security related activities 908 '7' 962 and '8' 964, whose associated intervals of time 904 overlap one another. Accordingly, the intervals in time 904 associated with activity sessions 910 'F' 966 and 'G' 968 will likewise overlap one another as they are respectively generated from security related activities 908 '7' 962 and '8' 964.

Consequently, while the intervals of time 904 respectively associated with activity sessions 910 'F' 966 and 'G' 968, and their corresponding session fingerprints 912 'F' 970 and 'G' 972, may overlap, they may be considered to be associated as they both relate to the use of images for the online publication. Accordingly, activity sessions 910 'F' 1066 and 'G' 968 may be considered to be a subset of activity session 910 'H' 974 and session fingerprints 912 'F' 970 and 'G' 972 may be considered to be a subset of session fingerprint 912 'H' 976.

Figure 10:
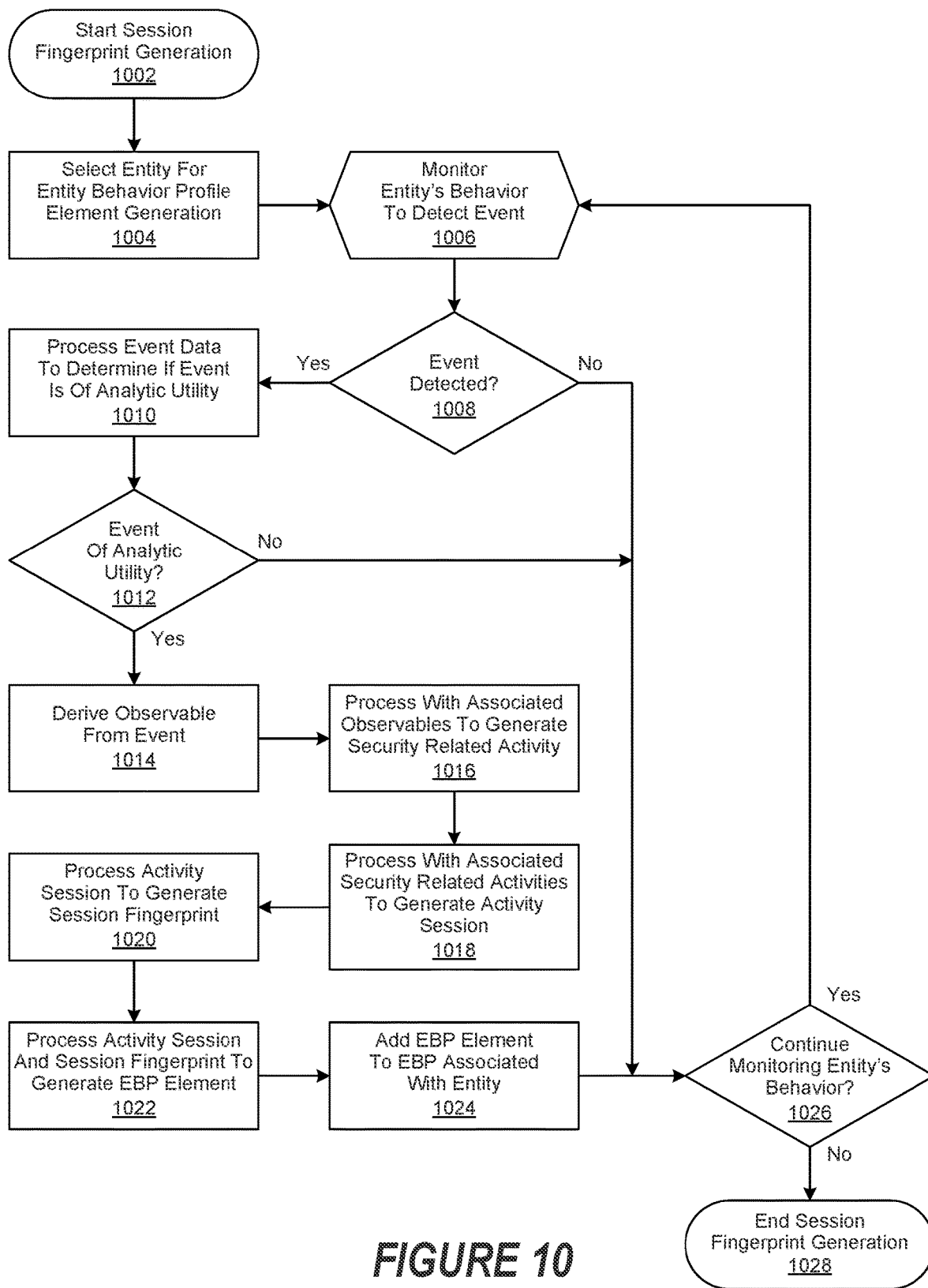
FIG. 10 is a generalized flowchart of the performance of session fingerprint generation operations.

FIG. 10 is a generalized flowchart of session fingerprint generation operations performed in accordance with an embodiment of the invention. In this embodiment, activity session fingerprint generation operations are begun in step 1002, followed by the selection of an entity in step 1004 for associated entity behavior profile (EBP) element generation. As used herein, an EBP element broadly refers to any data element stored in an EBP, as described in greater detail herein. In various embodiments, an EBP element may be used to describe a particular aspect of an EBP, such as certain entity behaviors enacted by an entity associated with the EBP. Ongoing monitoring operations are then performed in step 1006 to monitor the selected entity's behavior to detect the occurrence of an event, described in greater detail herein.

A determination is then made in step 1008 whether an event has been detected. If not, then a determination is made in step 1026 whether to continue monitoring the entity's behavior to detect an event. If so, then the process is continued, proceeding with step 1006. Otherwise, session fingerprint generation operations are ended in step 1028. However, if it was determined in step 1008 that an event was detected, then event data associated with the detected event is processed to determine whether the event is of analytic utility, as described in greater detail herein.

A determination is then made in step 1012 to determine whether the event is of analytic utility. If not, then the process is continued, proceeding with 1026. Otherwise, an observable, described in greater detail herein, is derived from the event in step 1014. The resulting observable is then processed with associated observables in step 1016, as likewise described in greater detail herein, to generate a security related activity. As likewise described in greater detail herein, the resulting security related activity is then processed in step 1018 with associated security related activities to generate an activity session.

In turn, the resulting activity session is then processed in step 1020 to generate a corresponding session fingerprint. The resulting session fingerprint is then processed with its corresponding activity session in step 1022 to generate an associated EBP element. The resulting EBP element is then added to an EPB associated with the entity in step 1024 and the process is then continued, proceeding with step 1026.

Figure 11:
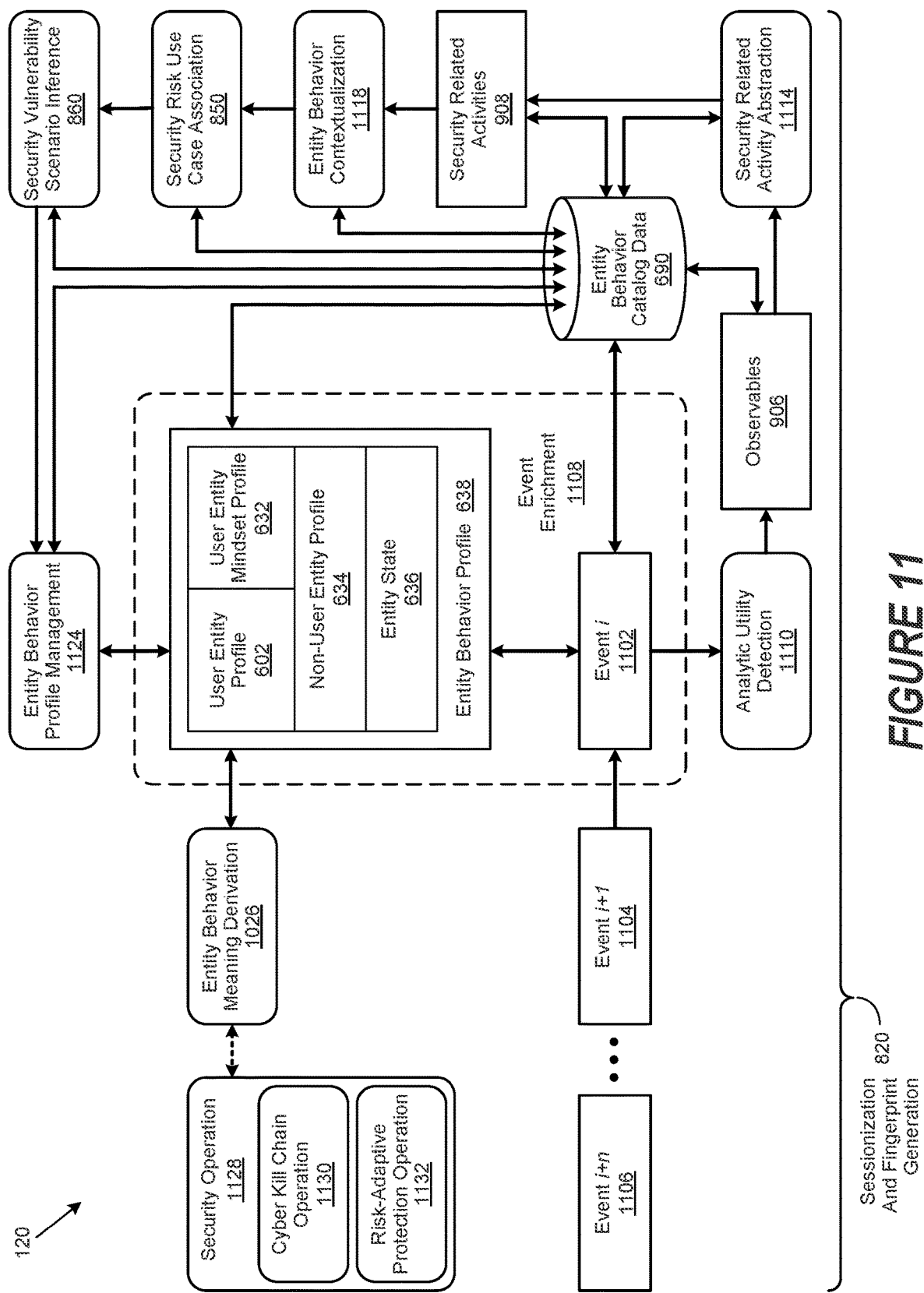
FIG. 11 is simplified block diagram of process flows associated with the operation of an entity behavior catalog (EBC) system.

FIG. 11 is simplified block diagram of process flows associated with the operation of an entity behavior catalog (EBC) system implemented in accordance with an embodiment of the invention. In certain embodiments, the EBC system 120 may be implemented to define and manage an entity behavior profile (EBP) 638, as described in greater detail herein. In certain embodiments, the EBP 638 may be implemented to include a user entity profile 602, a user entity mindset profile 632, a non-user entity profile 634, and an entity state 636, or a combination thereof, as likewise described in greater detail herein.

In certain embodiments, the EBC system 120 may be implemented use a particular user entity profile 602 in combination with a particular entity state 638 to generate an associated user entity mindset profile 632, likewise as described in greater detail herein. In certain embodiments, the EBC system 120 may be implemented to use the resulting user entity mindset profile 632 in combination with its associated user entity profile 602, non-user entity profile 634, and entity state 638, or a combination thereof, to detect entity behavior of analytic utility. In various embodiments, the EBC system 120 may be implemented to perform EBP management 1124 operations to process certain entity attribute and entity behavior information, described in greater detail herein, associated with defining and managing an EBP 638.

As used herein, entity attribute information broadly refers to information associated with a particular entity. In various embodiments, the entity attribute information may include certain types of content. In certain embodiments, such content may include text, unstructured data, structured data, graphical images, photographs, audio recordings, video recordings, biometric information, and so forth. In certain embodiments, the entity attribute information may include metadata. In certain embodiments, the metadata may include entity attributes, which in turn may include certain entity identifier types or classifications.

In certain embodiments, the entity attribute information may include entity identifier information. In various embodiments, the EBC system 120 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user entity 602 and non-user entity 634 profile attributes, user and non-user entity behavior factors, user entity mindset factors, information associated with various endpoint and edge devices, networks, and resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., two consecutive weekdays days, or between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the temporal event information may include metadata. In various embodiments, the metadata may include temporal event attributes, which in turn may include certain entity identifier types or classifications, described in greater detail herein.

In certain embodiments, the EBC system 120 may be implemented to use information associated with such temporal resolution of an entity's identity to assess the risk associated with a particular entity, at a particular point in time, and respond with a security operation 1128, described in greater detail herein. In certain embodiments, the EBC system 120 may be implemented to respond to such assessments in order to reduce operational overhead and improve system efficiency while maintaining associated security and integrity. In certain embodiments, the response to such assessments may be performed by a security administrator. Accordingly, certain embodiments of the invention may be directed towards assessing the risk associated with the affirmative resolution of the identity of an entity at a particular point in time in combination with its behavior and associated contextual information. Consequently, the EBC system 120 may be more oriented in various embodiments to risk adaptation than to security administration.

Referring now to FIG. 11, in certain embodiments, EBC system 120 operations are begun with the receipt of information associated with an initial event i 1102. In certain embodiments, information associated with an initial event i 1102 may include user entity profile 602 attributes, user behavior factors, user entity mindset factors, entity state information, contextual information, all described in greater detail herein, or a combination thereof. In various embodiments, certain user entity profile 602 data, user entity mindset profile 632 data, non-user entity profile 634 data, entity state 636 data, contextual information, and temporal information stored in a repository of EBC data 690 may be retrieved and then used to perform event enrichment 1108 operations to enrich the information associated with event i 1102.

Analytic utility detection 1112 operations are then performed on the resulting enriched event i 1102 to determine whether it is of analytic utility. If so, then it is derived as an observable 906, described in greater detail herein. In certain embodiments, event i+1 1104 through event i+n 1106, may in turn be received by the EBC system 120 and be enriched 1008. Analytic utility detection 1112 operations are then performed on the resulting enriched event i+1 1104 through event i+n 1106 to determine whether they are of analytic utility. Observables 906 are then derived from those that are.

In certain embodiments, security related activity abstraction 1114 operations may be performed on the resulting observables 906 corresponding to events i 1102, i+1 1104, i+n 1106 to generate an associated security related activity 908, described in greater detail herein. In various embodiments, a security related activity 908 may be expressed in a Subject Action Object format and associated with observables 906 resulting from event information provided by various received from certain EBC data sources, likewise described in greater detail herein. In certain embodiments, a security related activity abstraction 1114 operation may be performed to abstract away EBC data source-specific knowledge and details when expressing an entity behavior. For example, rather than providing the details associated with a "Windows: 4624" non-user entity event, its details may be abstracted to "User Login To Device" security related activity 908.

In various embodiments, sessionization and fingerprint 820 operations, described in greater detail herein, may be performed on event information corresponding to events i 1102, i+1 1104, i+n 1106, their corresponding observables 906, and their associated security related activities 908, or a combination thereof, to generate session information. In various embodiments, the resulting session information may be used to associate certain events i 1102, i+1 1104, i+n 1106, or their corresponding observables 906, or their corresponding security related activities 908, or a combination thereof, with a particular session.

In certain embodiments, as likewise described in greater detail herein, one or more security related activities 908 may in turn be associated with a corresponding EBP element. In various embodiments, the previously-generated session information may be used to associate the one or more security related activities 908 with a particular EBP element. In certain embodiments, the one or more security related activities 908 may be associated with its corresponding EBP element through the performance of an EBP management 1124 operation. Likewise, in certain embodiments, one or more EBP elements may in turn be associated with the EBP 638 through the performance of an EBP management 1124 operation.

In various embodiments, certain contextualization information stored in the repository of EBC data 690 may be retrieved and then used to perform entity behavior contextualization 1118 operations to provide entity behavior context, based upon the entity's user entity profile 602, or non-user entity profile 634, and its associated entity state 638. In various embodiments, security risk use case association 1118 operations may be performed to associate an EBP 638 with a particular security risk use case. In certain embodiments, the results of the previously-performed entity behavior contextualization 1118 operations may be used to perform the security risk use case association 850 operations.

In various embodiments, security vulnerability scenario inference 860 operations may be performed to associate a security risk use case with a particular security vulnerability scenario, described in greater detail herein. In various embodiments, certain observables 906 derived from events of analytical utility may be used to perform the security vulnerability scenario inference 860 operations. In various embodiments, certain entity behavior contexts resulting from the performance of the entity behavior contextualization 1118 operations may be used to perform the security vulnerability scenario inference 860 operations.

In certain embodiments, entity behavior meaning derivation 1126 operations may be performed on the security vulnerability behavior scenario selected as a result of the performance of the security vulnerability scenario inference 860 operations to derive meaning from the behavior of the entity. In certain embodiments, the entity behavior meaning derivation 1126 operations may be performed by analyzing the contents of the EBP 638 in the context of the security vulnerability behavior scenario selected as a result of the performance of the security vulnerability scenario inference 860 operations. In certain embodiments, the derivation of entity behavior meaning may include inferring the intent of an entity associated with event event i 1102 and event i+1 1104 through event i+n 1106.

In various embodiments, performance of the entity behavior meaning derivation 1126 operations may result in the performance of a security operation 1128, described in greater detail herein. In certain embodiments, the security operation 1128 may include a cyber kill chain 1130 operation, or a risk-adaptive protection 1132 operation, or both. In certain embodiments, the cyber kill chain 1130 operation may be performed to disrupt the execution of a cyber kill chain, described in greater detail herein. In certain embodiments, the risk-adaptive protection 1132 operation may include adaptively responding with an associated risk-adaptive response, as described in greater detail herein.

In various embodiments, the security operation 1128 may include certain risk mitigation operations being performed by a security administrator. As an example, performance of the security operation 1128 may result in a notification being sent to a security administrator alerting them to the possibility of suspicious behavior. In certain embodiments, the security operation 1128 may include certain risk mitigation operations being automatically performed by a security analytics system or service. As an example, performance of the security operation 1128 may result in a user's access to a particular system being disabled if an attempted access occurs at an unusual time or from an unknown device.

In certain embodiments, meaning derivation information associated with event i 1102 may be used to update the user entity profile 602 or non-user entity profile 634 corresponding to the entity associated with event event i 1102. In certain embodiments, the process is iteratively repeated, proceeding with meaning derivation information associated with event i+1 1104 through event i+n 1106. From the foregoing, skilled practitioners of the art will recognize that a user entity profile 602, or a non-user entity profile 634, or the two in combination, as implemented in certain embodiments, not only allows the identification of events associated with a particular entity that may be of analytic utility, but also provides higher-level data that allows for the contextualization of observed events. Accordingly, by viewing individual sets of events both in context and with a view to how they may be of analytic utility, it is possible to achieve a more nuanced and higher-level comprehension of an entity's intent.

Figure 12:
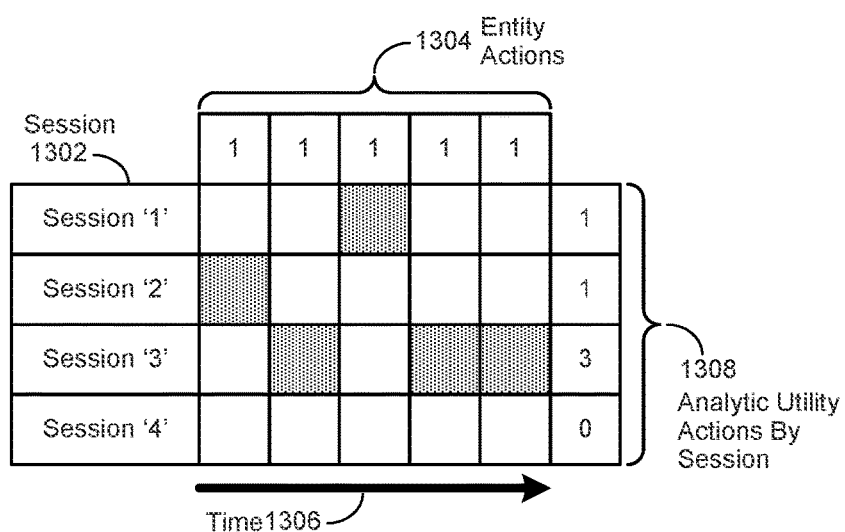
FIG. 12 is a table showing components of an EBP.

FIG. 12 is a table showing components of an entity behavior profile (EBP) implemented in accordance with an embodiment of the invention. In various embodiments, an EBP 638 may be implemented to certain include entity attributes 1204 behavioral models 1206, and inferences 1208, along with entity state 636. In certain embodiments, an EBP's 638 entity state 636 may be short-term, or reflect the state of an entity at a particular point or interval in time. In certain embodiments, an EBP's 638 entity state 636 may be long-term, or reflect the state of an entity at recurring points or intervals in time.

In certain embodiments, an EBP's 638 associated entity attributes 1204 may be long-lived. As an example, a particular user entity may have a name, an employee ID, an assigned office, and so forth, all of which are facts rather than insights. In certain embodiments, a particular entity state 636 may be sufficiently long-termed to be considered an entity attribute 1204. As an example, a first user and a second user may both have an entity state 636 of being irritable. However, the first user may have a short-term entity state 636 of being irritable on an infrequent basis, while the second user may have a long-term entity state 636 of be irritable on a recurring basis. In this example, the long-term entity state 636 of the second user being irritable may be considered to be an entity attribute 1204. In various embodiments, the determination of what constitutes an entity state 636 and an entity attribute 1204 is a matter of design choice. In certain embodiments, various knowledge representation approaches may be implemented in combination with an entity behavior catalog (EBC) system to understand the ontological interrelationship of entity attributes 1104 one or more EBP's 638 may contain. In these embodiments, the method by which certain entity attributes 1204 are selected to be tracked by an EBC system, and the method by which they are managed within a corresponding EBP 638, is a matter of design choice.

In certain embodiments, the ATP 638 evolves over time as new events and entity behavior is detected. In certain embodiments, an ATP's 638 associated behavioral models 1206, and thus the ATP 638 itself may evolve over time. In certain embodiments, an ATP's 638 behavioral models 1206 may be used by an ATP system to provide insight into how unexpected a set of events may be. As an example, a behavioral model 1206 may include information related to where a particular user entity works, which devices they may use and locations they may login from, who they may communicate with, and so forth. Certain embodiments of the invention reflect an appreciation that such behavioral models 1206 can be useful when comparing observed user and non-user entity behaviors to past observations in order to determine how unusual a particular entity behavior may be.

For example, a user may have more than one EBP 638 associated with a particular channel, which as used herein broadly refers to a medium capable of supporting the electronic observation of a user or non-user behavior, such as a keyboard, a network, a video stream, and so forth. To continue the example, the user may have a particular set of people he sends emails to from his desktop computer, and does so in an orderly and methodical manner, carefully choosing his words, and writing longer than average messages compared to his peers. Consequently, analysis of such an email message will likely indicate it was authored by the user and not someone else.

However, the same user may also send emails from a second channel, which is his mobile telephone. When using his mobile telephone, the user's emails are typically short, contains typos and emojis, and his writing style is primarily limited to simple confirmations or denials. Consequently, analysis of one such email would likely not reveal whether the user was the author or not, due to its brevity. Accordingly, the use of the same channel, which in this example is email, demonstrates the use of different devices will likely generate different behavioral models 1206, which in turn could affect the veracity of associated inferences 1208.

In certain embodiments, a behavioral model 1206 may be implemented as a session-based fingerprint. As used herein, a session-based fingerprint broadly refers to a unique identifier of an enactor of user or non-user behavior associated with a session. In certain embodiments, the session-based fingerprint may be implemented to determine how unexpected an event may be, based upon an entity's history as it relates to the respective history of their peer entities. In certain embodiments, the session-based fingerprint may be implemented to determine whether an entity associated with a particular session is truly who they or it claims to be or if they are being impersonated. In certain embodiments, the session-based fingerprint may be implemented to determine whether a particular event, or a combination thereof, may be of analytic utility. In certain embodiments, the session-based fingerprint may include a risk score, be used to generate a risk score, or a combination thereof.

As likewise used herein, a fingerprint, as it relates to a session, broadly refers to a collection of information providing one or more distinctive, characteristic indicators of the identity of an enactor of one or more corresponding user or non-user entity behaviors during the session. In certain embodiments, the collection of information may include one or more user or non-user profile elements. A user or non-user profile element, as used herein, broadly refers to a collection of user or non-user entity behavior elements, described in greater detail herein.

As used herein, inferences 1208 broadly refer to things that can be inferred about an entity based upon observations. In certain embodiments the observations may be based upon electronically-observable behavior, described in greater detail herein. In certain embodiments, the behavior may be enacted by a user entity, a non-user entity, or a combination thereof. In certain embodiments, inferences 1108 may be used to provide insight into a user entity's mindset or affective state.

As an example, an inference 1208 may be made that a user is unhappy in their job or that they are facing significant personal financial pressures. Likewise, based upon the user's observed behavior, an inference 1208 may be made that they are at a higher risk of being victimized by phishing schemes due to a propensity for clicking on random or risky website links. In certain embodiments, such inferences 1208 may be implemented to generate a predictive quantifier of risk associated with an entity's behavior.

In certain embodiments, entity state 636, described in greater detail herein, may be implemented such that changes in state can be accommodated quickly while reducing the overall volatility of a particular EBP 638. As an example, a user may be traveling by automobile. Accordingly, the user's location is changing quickly. Consequently, location data is short-lived. As a result, while the location of the user may not be updated within their associated EBP 638 as it changes, the fact their location is changing may prove to be useful in terms of interpreting other location-based data from other sessions. To continue the example, knowing the user is in the process of changing their location may assist in explaining why the user appears to be in two physical locations at once.

Figure 13:
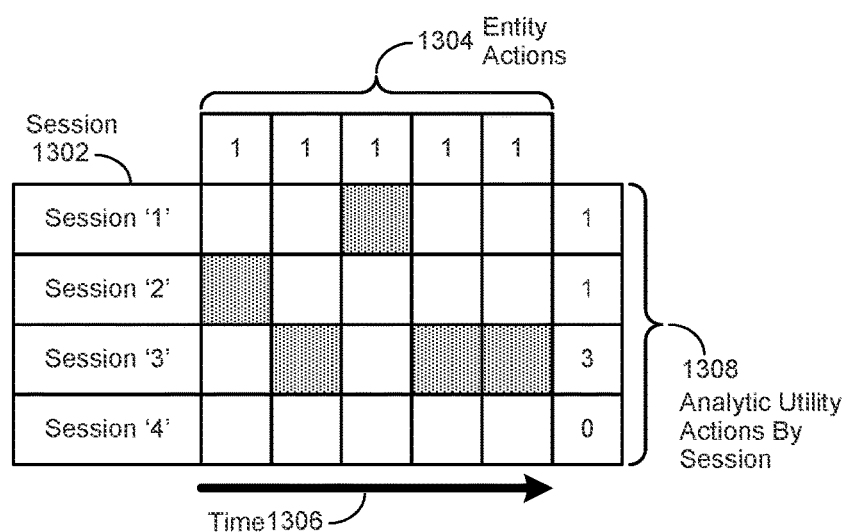
FIG. 13 is a activities table showing analytic utility actions occurring during a session.

FIG. 13 is a activities table showing analytic utility actions occurring during a session implemented in accordance with an embodiment of the invention. In certain embodiments, an entity behavior catalog (EBC) system, described in greater detail herein, may be implemented to capture and record various entity actions 1304 enacted by an entity during a session 1302, likewise described in greater detail herein. In certain embodiments, the actions, and their associated sessions, may be stored in an entity behavior profile (EBP) corresponding to a particular entity. In various embodiments, the EBC system may be implemented to process information stored in an EBP to determine, as described in greater detail herein, which actions 1304 enacted by a corresponding entity during a particular session 1302 may be of analytic utility 1308.

Certain embodiments of the invention reflect an appreciation that multiple sessions 1302, each of which may be respectively associated with a corresponding entity, may occur within the same interval of time 1306. Certain embodiments of the invention likewise reflect an appreciation that a single action of analytic utility 1308 enacted by an entity occurring during a particular interval of time 1306 may not appear to be suspicious behavior by an associated entity. Likewise, certain embodiments of the invention reflect an appreciation that the occurrence of multiple actions of analytic utility 1308 enacted by an entity during a particular session 1302 may be an indicator of suspicious behavior.

Certain embodiments reflect an appreciation that a particular entity may be associated with two or more sessions 1302 that occur concurrently over a period of time 1306. Certain embodiments of the invention likewise reflect an appreciation that a single action of analytic utility 1308 enacted by an entity occurring during a first session 1302 may not appear to be suspicious. Conversely, certain embodiments of the invention reflect an appreciation that multiple actions of analytic utility 1308 during a second session 1302 may.

As an example, a user may log into the same system from two different IP addresses, one associated with their laptop computer and the other their mobile phone. In this example, entity actions 1204 1304 enacted by the user using their laptop computer may be associated with a first session 1302 (e.g. session '2'), and entity actions 1304 enacted by the user using their mobile phone may be associated with a second session 1202 1302 (e.g., session '3'). To continue the example, only one action of analytic utility 1308 may be associated with the first session 1302, while three actions of analytic utility 1308 may be associated with the second session 1302. Accordingly, it may be inferred the preponderance of actions of analytic utility 1308 enacted by the user during the second session 1302 may indicate suspicious behavior being enacted with their mobile phone.

Figure 14A:
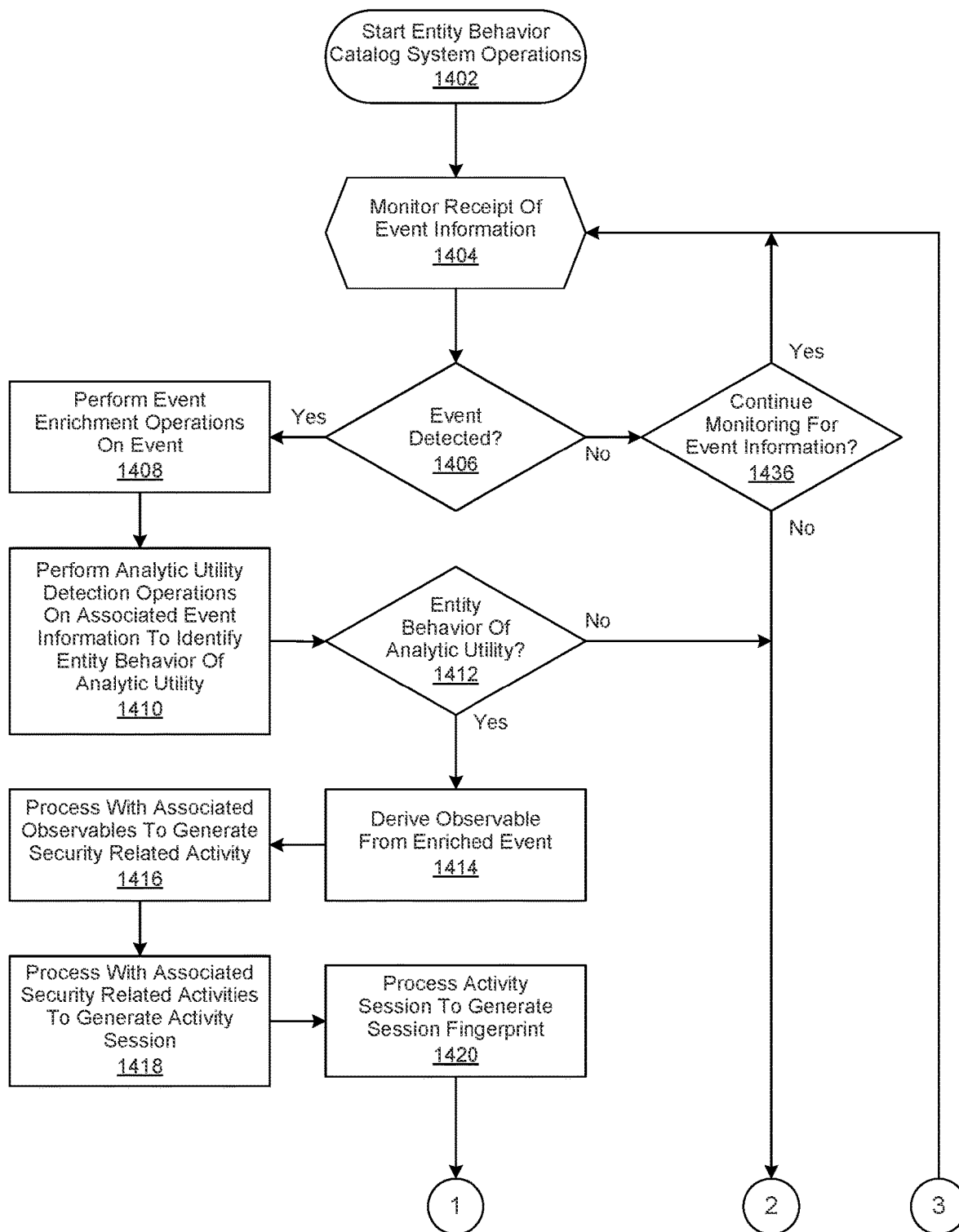
FIGS. 14a and 14b are a generalized flowchart of the performance of EBC operations.
Figure 14B:
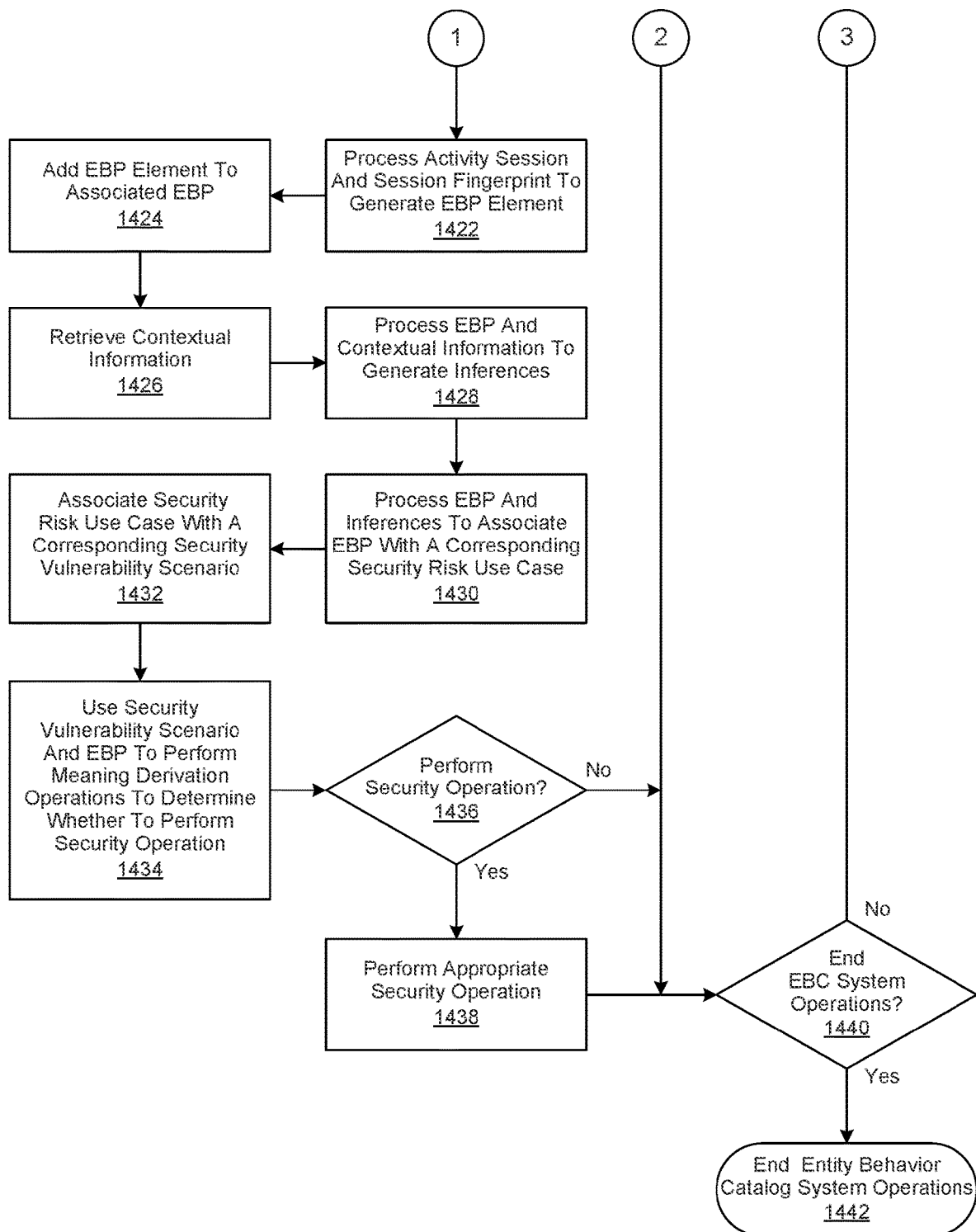

FIGS. 14a and 14b are a generalized flowchart of the performance of entity behavior catalog (EBC) system operations implemented in accordance with an embodiment of the invention. In this embodiment, EBC system operations are begun in step 1402, with ongoing operations being performed by the EBC system in step 1404 to monitor the receipt of event information to detect the occurrence of an event, described in greater detail herein.

A determination is then made in step 1406 to determine whether an event has been detected. If not, then a determination is made in step 1436 to determine whether to continue monitoring the receipt of event information. If so, then the process is continued, proceeding with step 1404. If not, then a determination is made in step 1440 whether to end EBC system operations. If not, then the process is continued, proceeding with step 1404. Otherwise EBC system operations are ended in step 1442.

However, if it was determined in step 1406 that an event was detected, then event enrichment operations, described in greater detail herein, are performed on the event in step 1408. Analytic utility detection operations are then performed on the resulting enriched event in step 1410 to identify entity behavior of analytic utility, as likewise described in greater detail herein. A determination is then made in step 1412 to determine whether the enriched event is associated with entity behavior of analytic utility. If not, then the process is continued, proceeding with step 1440. Otherwise, an observable is derived from the event in step 1414, as described in greater detail herein.

The resulting observable is then processed with associated observables in step 1416 to generate a security related activity, likewise described in greater detail herein. In turn, the resulting security related activity is processed with associated security related activities in step 1418 to generate an activity session, described in greater detail. Thereafter, as described in greater detail herein, the resulting activity session is processed in step 1420 to generate a corresponding activity session. In turn, the resulting activity session is processed with the activity session in step 1422 to generate an EBP element, which is then added to an associated EBP in step 1424.

Thereafter, in step 1426, certain contextualization information stored in a repository of EBC data may be retrieved and then used in step 1428 to perform entity behavior contextualization operations to generate inferences related to the entity's behavior. The EBP is then processed with resulting entity behavior inferences in step 1430 to associate the EBP with one or more corresponding risk use cases, as described in greater detail herein. In turn, the one or more risk use cases are then associated in step 1432 with one or more corresponding security vulnerability scenarios, as likewise described in greater detail herein.

Then, in step 1434, entity behavior meaning derivation operations are performed on the EBP and each security vulnerability behavior scenario selected in step 1432 to determine whether the entity's behavior warrants performance of a security operation. Once that determination is made, a subsequent determination is made in step 1436 whether to perform a security operation. If not, then the process is continued, proceeding with step 1440. Otherwise, the appropriate security operation, described in greater detail herein, is performed in step 1438 and the process is continued, proceeding with step 1440.

Figure 15:
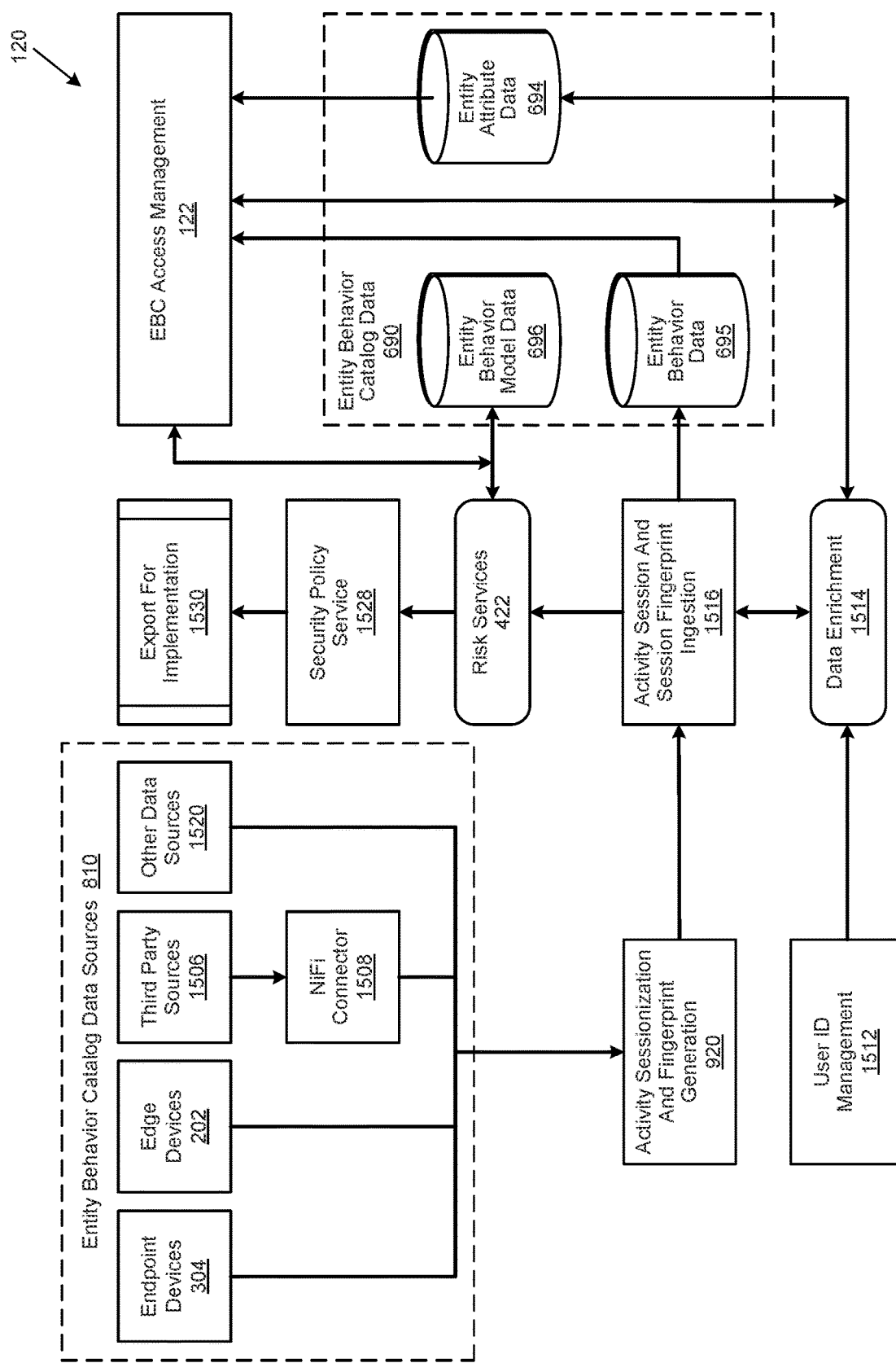
FIG. 15 shows a functional block diagram of the operation of an EBC system.

FIG. 15 shows a functional block diagram of the operation of an entity behavior catalog (EBC) system implemented in accordance with an embodiment of the invention. In various embodiments, certain EBC-related information, described in greater detail herein, may be provided by various EBC data sources 810, likewise described in greater detail herein. In certain embodiments, the EBC data sources 810 may include endpoint devices 304, edge devices 202, third party sources 1506, and other 1520 data sources. In certain embodiments, the receipt of EBC-related information provided by third party sources 1506 may be facilitated through the implementation of one or more Apache NiFi connectors 1508, familiar to skilled practitioners of the art.

In certain embodiments, activity sessionization and session fingerprint generation 1520 operations may be performed on the EBC-related information provided by the EBC data sources 810 to generate discrete sessions. As used herein, activity sessionization broadly refers to the act of turning event-based data into activity sessions, described in greater detail herein. In these embodiments, the method by which certain EBC-related information is selected to be used in the generation of a particular activity session, and the method by which the activity session is generated, is a matter of design choice. As likewise used herein, an activity session broadly refers to an interval of time during which one or more user or non-user behaviors are respectively enacted by a user or non-user entity.

In certain embodiments, the user or non-user behaviors enacted during an activity session may be respectively associated with one or more events, described in greater detail herein. In certain embodiments, an activity session may be implemented to determine whether or not user or non-user behaviors enacted during the session are of analytic utility. As an example, certain user or non-user behaviors enacted during a particular activity session may indicate the behaviors were enacted by an impostor. As another example, certain user or non-user behaviors enacted during a particular activity session may be performed by an authenticated entity, but the behaviors may be unexpected or out of the norm.

In certain embodiments, two or more activity sessions may be contiguous. In certain embodiments, two or more activity sessions may be noncontiguous, but associated. In certain embodiments, an activity session may be associated with two or more other activity sessions. In certain embodiments, an activity session may be a subset of another activity session. In certain embodiments, the interval of time corresponding to a first activity session may overlap an interval of time corresponding to a second activity session. In certain embodiments, an activity session may be associated with two or more other activity sessions whose associated intervals of time may overlap one another. Skilled practitioners of the art will recognize that many such embodiments are possible. Accordingly, the foregoing is not intended to limit the spirit, scope or intent of the invention.

The resulting activity sessions and session fingerprints are then ingested 1516, followed by the performance of data enrichment 1514 operations familiar to those of skill in the art. In certain embodiments, user identifier information (ID) information provided by a user ID management system 1512 may be used to perform the data enrichment 1514 operations. In various embodiments, certain contextual information related to a particular entity behavior or event may be used to perform the data enrichment 1514 operations. In various embodiments, certain temporal information, such as timestamp information, related to a particular entity behavior or event may be used to perform the data enrichment 1514 operations. In certain embodiments, a repository of EBC data 690 may be implemented to include repositories of entity attribute data 694, entity behavior data 695, and behavioral model data 696. In various embodiments, certain information stored in the repository of entity attribute data 694 may be used to perform the data enrichment operations 1514.

In certain embodiments, the resulting enriched sessions may be stored in the repository of entity behavior data 695. In certain embodiments, the resulting enriched sessions may be provided to a risk services 422 module, described in greater detail herein. In certain embodiments, as likewise described in greater detail herein, the risk services 422 module may be implemented to generate inferences, risk models, and risk scores, or a combination thereof. In certain embodiments, the resulting inferences, risk models, and risk scores, or a combination thereof, may then be stored in the repository of entity behavioral model data 696.

In certain embodiments, the risk services 422 module may be implemented to provide input data associated with the inferences, risk models, and risk scores it may generate to a security policy service 1528. In certain embodiments, the security policy service 1528 may be implemented to use the inferences, risk models, and risk scores to generate security policies. In turn, the security policy service 1528 may be implemented in certain embodiments to export 1530 the resulting security policies to endpoint agents or devices 304, edge devices 202, or other security mechanisms, where they may be used to limit risk, as described in greater detail herein. In certain embodiments, an EBC access module 122 may be implemented to provide administrative access to various components of the EBC system 120, as shown in FIG. 15. In certain embodiments, the EBC access management module 122 may include a user interface (UI), or a front-end, or both, familiar to skilled practitioners of the art.

Figure 16A:
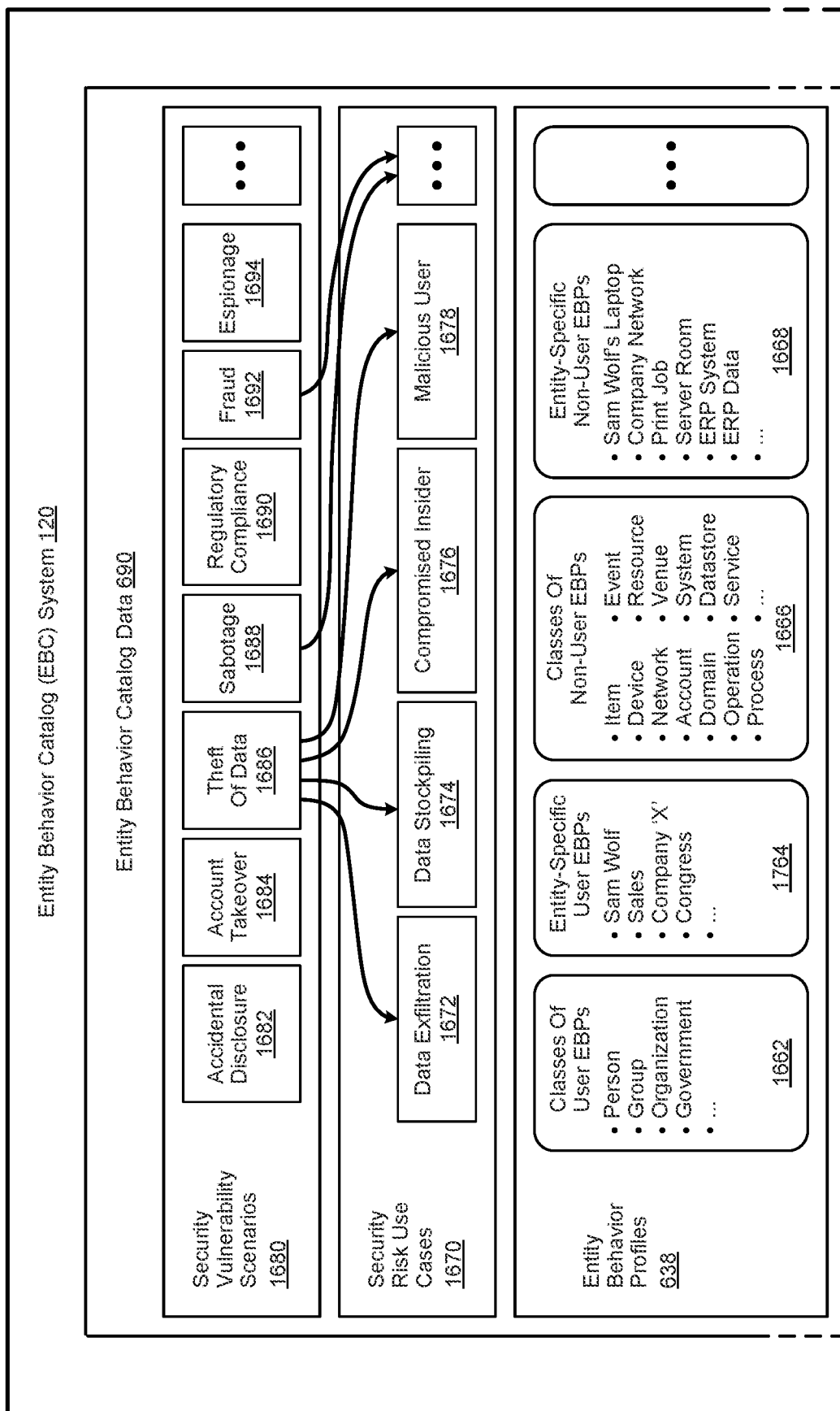
FIGS. 16a and 16b are a simplified block diagram showing reference architecture components of an EBC system.
Figure 16B:
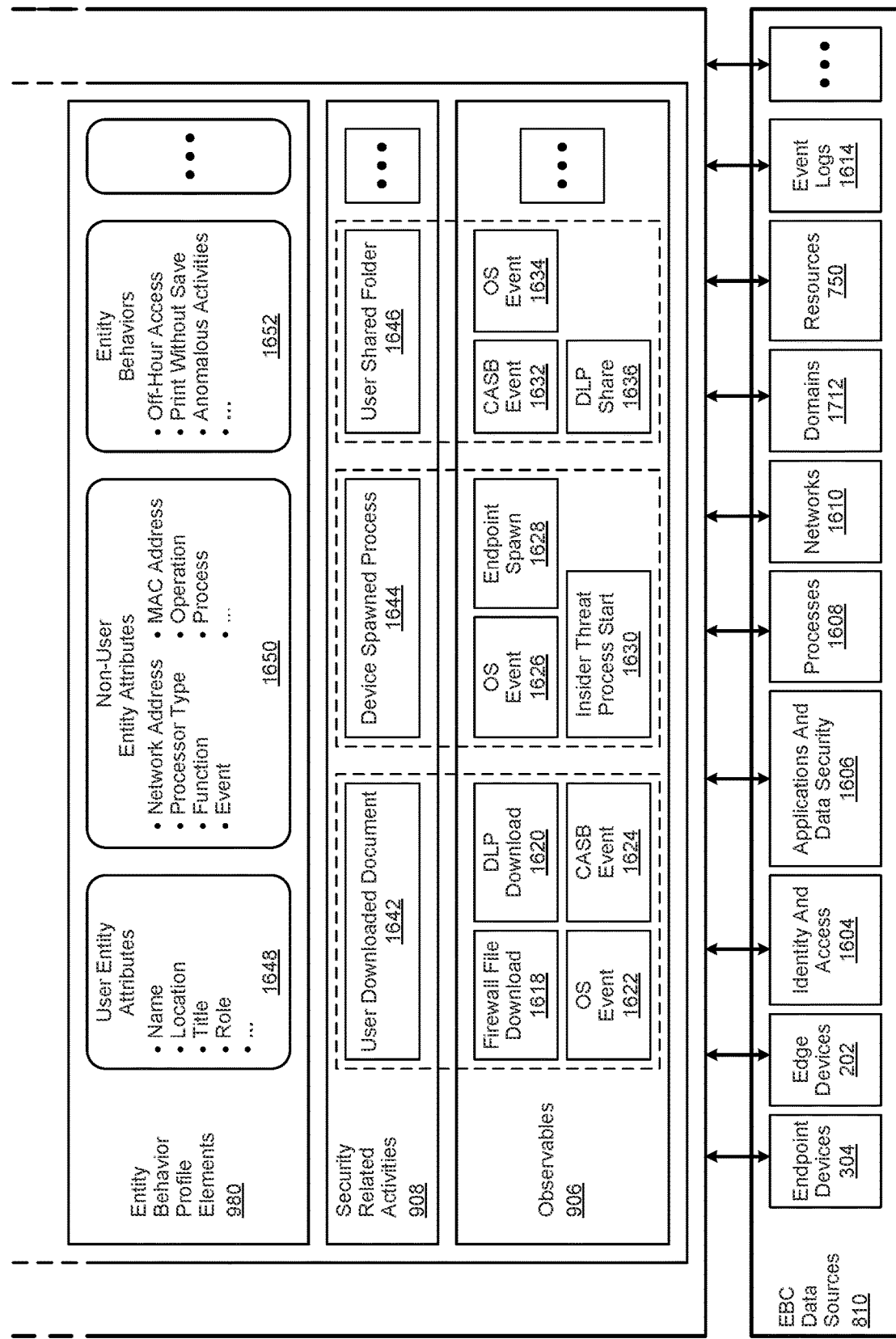

FIGS. 16a and 16b are a simplified block diagram showing reference architecture components of an entity behavior catalog (EBC) system implemented in accordance with an embodiment of the invention for performing certain EBC operations. In various embodiments, the EBC system 120 may be implemented to generate, manage, store, or some combination thereof, information related to the behavior of an associated entity. In certain embodiments, the EBC system 120 may be implemented to provide an inventory of entity behaviors for use when performing a security operation, described in greater detail herein.

In certain embodiments, an entity behavior catalog (EBC) system 120 may be implemented to identify a security related activity, described in greater detail herein. In certain embodiments, the security related activity may be based upon an observable, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the EBC data sources 810 shown in FIGS. 8, 15, 16b, and 17.

In certain embodiments, as likewise described in greater detail herein, the EBC system 120 may be implemented to identify a particular event of analytic utility by analyzing an observable associated with a particular security related activity. In certain embodiments, the EBC system 120 may be implemented to generate entity behavior catalog data based upon an identified event of analytic utility. In certain embodiments, an observable 906 may be derived, as described in greater detail herein, from an identified event of analytic utility. In various embodiments, the EBC system 120 may be implemented to associate certain entity behavior data it may generate with a predetermined abstraction level, described in greater detail herein.

In various embodiments, the EBC system 120 may be implemented to use certain entity behavior catalog data, and an associated abstraction level, to generate a hierarchical set of entity behaviors, described in greater detail herein. In certain embodiments, the hierarchical set of entity behaviors generated by the EBC system 120 may represent an associated security risk, likewise described in greater detail herein. Likewise, as described in greater detail herein, the EBC system 120 may be implemented in certain embodiments to store the hierarchical set of entity behaviors within a repository of EBC data 690.

In various embodiments, the EBC system 120 may be implemented to receive certain event information, described in greater detail herein, corresponding to an event associated with an entity interaction, likewise described in greater detail herein. In various embodiments, the event information may be generated by, received from, or a combination thereof, certain EBC data sources 810. In certain embodiments, such EBC data sources 810 may include endpoint devices 304, edge devices 202, identity and access 1604 systems familiar to those of skill in the art, as well as various software and data security 1606 applications. In various embodiments, EBC data sources 810 may likewise include output from certain processes 1608, network 1610 access and traffic logs, domain 1612 registrations and associated entities, certain resources 750, described in greater detail herein, event logs 1614 of all kinds, and so forth.

In certain embodiments, EBC system 120 operations are begun with the receipt of information associated with a particular event. In certain embodiments, information associated with the event may include user entity profile attributes, user behavior factors, user entity mindset factors, entity state information, and contextual information, described in greater detail herein, or a combination thereof. In certain embodiments, the event may be associated with a user/device, a user/network, a user/resource, or a user/user interaction, as described in greater detail herein. In various embodiments, certain user entity profile data, user entity mindset profile data, non-user entity profile data, entity state data, contextual information, and temporal information stored in the repository of EBC data 690 may be retrieved and then used to perform event enrichment operations to enrich the information associated with the event. In certain embodiments, the event enrichment operations may be performed by the event enrichment 680 module.

In various embodiments, an observable 906, described in greater detail herein, may be derived from the resulting enriched, contextualized event. As shown in FIG. 16b, examples of such observables may include firewall file download 1618, data loss protection (DLP) download 1620, and various operating system (OS) events 1622, 1626, and 1634. As likewise shown in FIG. 16b, other examples of such observables may include cloud access security broker (CASB) events 1624 and 1632, endpoint spawn 1628, insider threat process start 1630, DLP share 1636, and so forth. In certain embodiments, the resulting observables 906 may in turn be respectively associated with a corresponding observable abstraction level, described in greater detail herein.

In certain embodiments, security related activity abstraction operations, described in greater detail herein, may be performed on the resulting observables 906 to generate a corresponding security related activity 908. In various embodiments, a security related activity 908 may be expressed in a Subject Action Object format and associated with observables 906 resulting from event information received from certain EBC data sources 810. In certain embodiments, a security related activity abstraction operation, described in greater detail herein, may be performed to abstract away EBC data source-specific knowledge and details when expressing an entity behavior. For example, rather than providing the details associated with a "Windows: 4624" non-user entity event, the security related activity 908 is abstracted to a "User Login To Device" OS event 1622, 1626, 1634.

As shown in FIG. 16b, examples of security related activities 908 may include "user downloaded document" 1622, "device spawned process" 1644, "user shared folder" 1646, and so forth. To provide other examples, the security related activity 908 "user downloaded document" 1622 may be associated with observables 906 firewall file download 1618, DLP download 1620, OS event 1622, and CASB event 1624. Likewise, the security related activity 908 "device spawned process" 1644, may be associated with observables 906, OS event 1626, endpoint spawn 1628, and insider threat process start 1630. The security related activity 908 "user shared folder" 1646 may likewise be associated with observables 906 CASB event 1632, OS event 1634, and DLP share 1636.

In certain embodiments, security related activities 908 may in turn be respectively associated with a corresponding security related activity abstraction level, described in greater detail herein. In various embodiments, activity sessionization operations, likewise described in greater detail herein, may be performed to respectively associate certain events and security related activities 908 with corresponding activity sessions, likewise described in greater detail herein. Likewise, as described in greater detail herein, the resulting session information may be used in various embodiments to associate certain events of analytic utility, or their corresponding observables 906, or their corresponding security related activities 908, or a combination thereof, with a particular activity session.

In certain embodiments, the resulting security related activities 908 may be processed to generate an associated EBP element 980, as described in greater detail herein. In various embodiments, the EBP element 980 may include user entity attribute 1648 information, non-user entity attribute 1650 information, entity behavior 1652 information, and so forth. In certain of these embodiments, the actual information included in a particular EBP element 980, the method by which it is selected, and the method by which it is associated with the EBP element 980, is a matter of design choice. In certain embodiments, the EBP elements 980 may in turn be respectively associated with a corresponding EBP element abstraction level, described in greater detail herein.

In various embodiments, certain EBP elements 980 may in turn be associated with a particular EBP 638. In certain embodiments, the EBP 638 may be implemented as a class of user 1662 EBPs, an entity-specific user 1662 EBP, a class of non-user 1666 EBPs, an entity-specific non-user 1668 EBP, and so forth. In certain embodiments, classes of user 1662 and non-user 1666 EBPs may respectively be implemented as a prepopulated EBP, described in greater detail herein. In various embodiments, certain entity data associated with EBP elements 980 associated with the classes of user 1662 and non-user 1666 EBPs may be anonymized. In certain embodiments, the EBP 638 may in turn be associated with an EBP abstraction level, described in greater detail herein.

In certain embodiments, security risk use case association operations may be performed to associate an EBP 638 with a particular security risk use case 1670. As shown in FIG. 16a, examples of such security risk use cases 1670 include "data exfiltration" 1672, "data stockpiling" 1674, "compromised insider" 1676, "malicious user" 1678, and so forth. In various embodiments, entity behavior of analytic utility resulting from the performance of certain analytic utility detection operations may be used identify one or more security risk use cases 1670 associated with a particular EBP 638. In certain embodiments, identified security risk use cases may in turn be associated with a security risk use case abstraction level, described in greater detail herein.

In certain embodiments, the results of the security risk use case association operations may be used to perform security vulnerability scenario association operations to associate one or more security risk use cases 1670 to one or more security vulnerability scenarios 1680, described in greater detail herein. As shown in FIG. 16a, examples of security vulnerability scenarios 1680 include "accidental disclosure" 1682, "account takeover" 1684, "theft of data" 1686, "sabotage" 1688, "regulatory compliance" 1690, "fraud" 1692, "espionage" 1694, and so forth. To continue the example, the "theft of data" 1686 security vulnerability scenario may be associated with the "data exfiltration" 1672, "data stockpiling" 1674, "compromised insider" 1676, "malicious user" 1678 security risk use cases 1670. Likewise the "sabotage" 1688 and "fraud" 1692 security vulnerability scenarios may be respectively associated with some other security risk case 1670. In certain embodiments, the associated security vulnerability scenarios may in turn be associated with a security vulnerability scenario abstraction level, described in greater detail herein.

Figure 17:
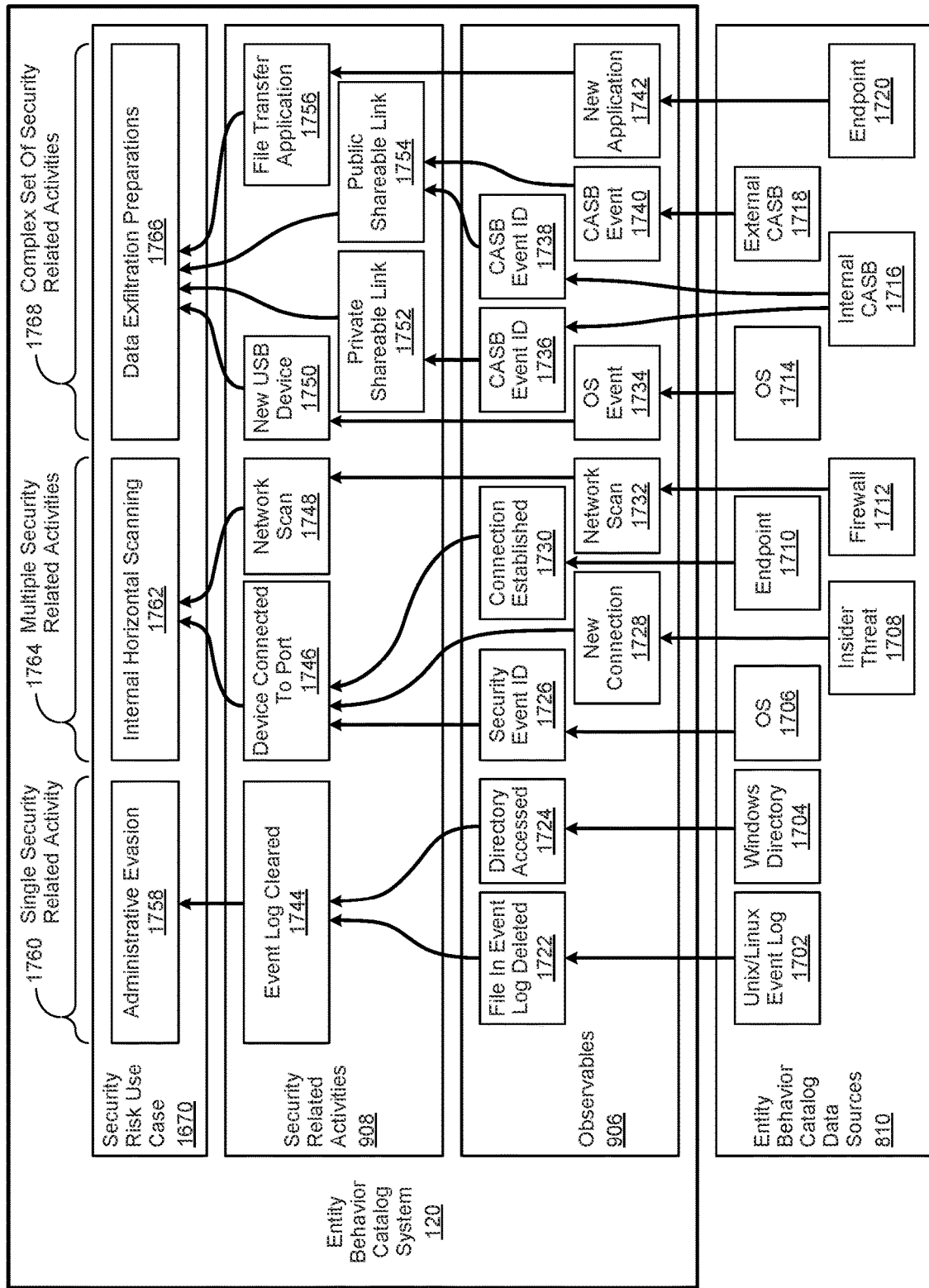
FIG. 17 is a simplified block diagram showing the mapping of entity behaviors to a risk use case scenario.

FIG. 17 is a simplified block diagram showing the mapping of entity behaviors to a risk use case scenario implemented in accordance with an embodiment of the invention. In certain embodiments, an entity behavior catalog (EBC) system 120 may be implemented, as described in greater detail herein, to receive event information from a plurality of EBC data sources 810, which is then processed to determine whether a particular event is of analytic utility. In certain embodiments, the EBC system 120 may be implemented to derive observables 906 from identified events of analytic utility, as likewise described in greater detail herein. In certain embodiments, the EBC system 120 may be implemented, as described in greater detail herein, to associate related observables 906 with a particular security related activity 908, which in turn is associated with a corresponding security risk use case 1670. In various embodiments, certain contextual information may be used, as described in greater detail herein, to determine which security related activities 908 may be associated with which security risk use cases 1670.

In certain embodiments, a single 1760 security related activity 908 may be associated with a particular security risk use case 1670. For example, as shown in FIG. 17, event data may be received from a Unix/Linux® event log 1712 and a Windows® directory 1704. In this example, certain event data respectively received from the Unix/Linux® event log 1712 and Windows® directory 1704 may be associated with an event of analytic utility, which results in the derivation of observables 906 "File In Log Deleted" 1722 and "Directory Accessed" 1724. To continue the example, the resulting observables 906 "File In Log Deleted" 1722 and "Directory Accessed" 1724 may then be associated with the security related activity 908 "Event Log Cleared" 1744. In turn, the security related activity 908 "Event Log Cleared" 1744 may be associated with security risk use case 1670 "Administrative Evasion" 1758.

In certain embodiments, two or more 1764 security related activities 908 may be associated with a particular security risk use case 1670. For example, as shown in FIG. 17, event data may be received from an operating system (OS) 1706, an insider threat 1708 detection system, an endpoint 1710 and a firewall 1712. In this example, certain event data respectively received from the operating system (OS) 1706, an insider threat 1708 detection system, an endpoint 1710 and a firewall 1712 may be associated with an event of analytic utility. Accordingly, observables 906 "Security Event ID" 1726, "New Connection" 1728, may be respectively derived from the event data of analytical utility received from the endpoint 1710 and the firewall 1712 EBC data sources 810. Likewise, observables 906 "Connection Established" 1730 and "Network Scan" 1732 may be respectively derived from the event data of analytical utility received from the OS 1706, the insider threat 1708 detection system, EBC data sources 810.

To continue the example, the resulting observables 906 "Security Event ID" 1726, "New Connection" 1728 and "Connection Established" 1730 may be associated with security related activity 908 "Device Connected To Port" 1746. Likewise, observable 906 "Network Scan" 1732 may be associated with security related activity 908 "Network Scan" 1748. In turn, the security related activities 908 "Device Connected To Port" 1746 and "Network Scan" 1732 may be associated with security risk use case 1670 "Internal Horizontal Scanning" 1762.

In certain embodiments, a complex set 1768 of security related activities 908 may be associated with a particular security risk use case 1670. For example, as shown in FIG. 17, event data may be received from an OS 1714, an internal cloud access security broker (CASB) 1716, an external CASB 1718, and an endpoint 1720. In this example, certain event data respectively received from the OS 1714, the internal cloud access security broker (CASB) 1716, the external CASB 1718, and the endpoint 1720 may be associated with an event of analytic utility.

Accordingly, observables 906 "OS Event" 1734, "CASB Event" 1740, and "New Application" 1742 may be respectively derived from the event data of analytical utility provided by the OS 1714, the external CASB 1718, and the endpoint 1720 EBC data sources 810. Likewise, a first "CASB Event ID" 1736 observable 906 and a second "CASB Event ID" 1738 observable 906 may both be derived from the event data of analytical utility received from the internal CASB 1716 EBC data source 810.

To continue the example, the "OS Event" 1734, the first "CASB Event ID" 1736, and "New Application" 1742 observables 906 may then be respectively associated with security related activities 908 "New USB Device" 1750, "Private Shareable Link" 1752, and "File Transfer Application" 1756. Likewise, second "CASB Event ID" 1738 observable 906 and the "CASB Event" 1740 observable 906 may then be associated with security related activity 908 "Public Shareable Link" 1754. In turn, the security related activities 908 "New USB Device" 1750, "Private Shareable Link" 1752, "Public Shareable Link" 1754, and "File Transfer Application" 1756 may be associated with security risk use case 1670 "Data Exfiltration Preparations" 1766.

Figure 18:
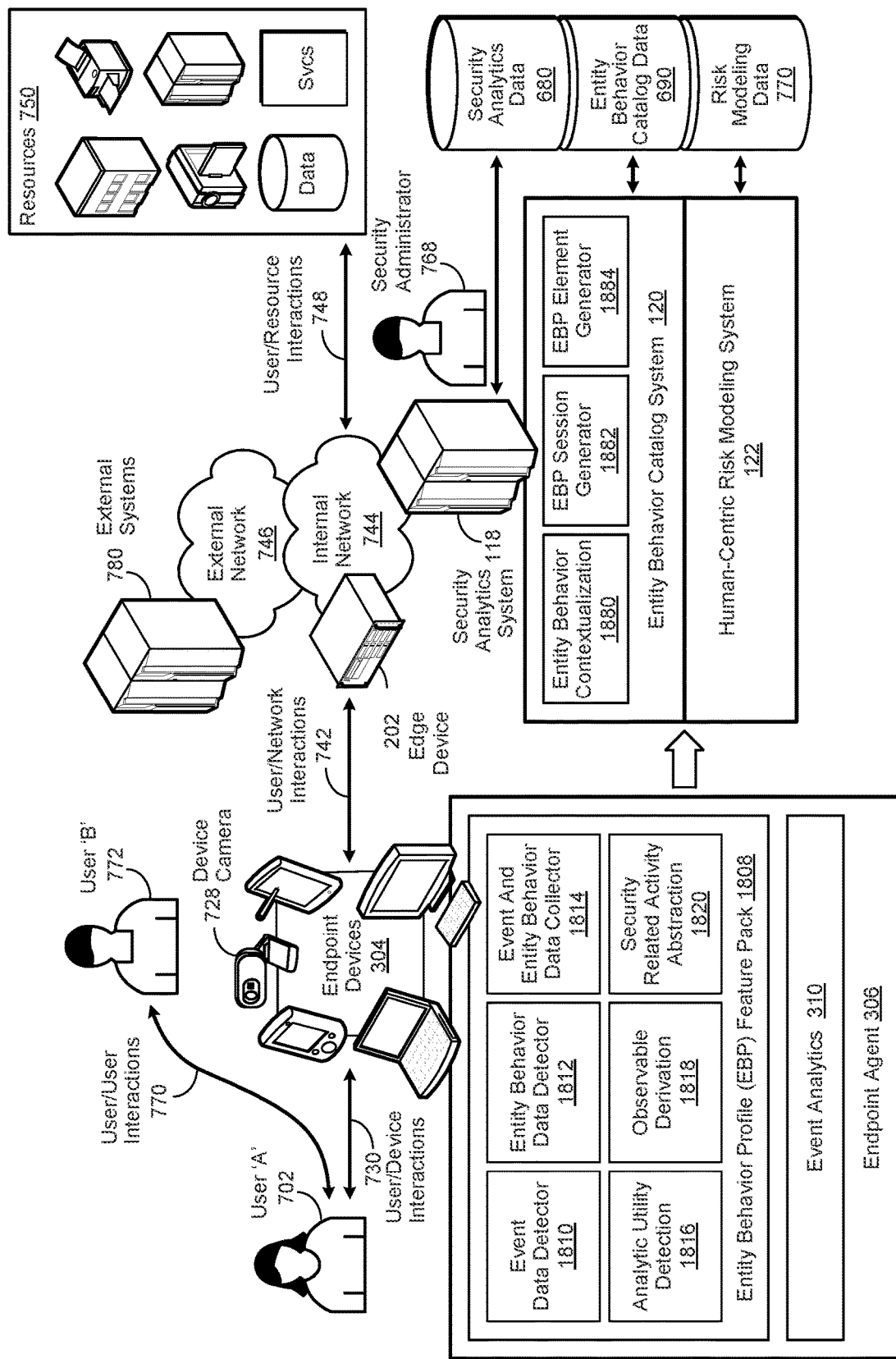
FIG. 18 is a simplified block diagram of an EBC system environment.

FIG. 18 is a simplified block diagram of an entity behavior catalog (EBC) system environment implemented in accordance with an embodiment of the invention. In certain embodiments, the EBC system environment may be implemented to detect user or non-user entity behavior of analytic utility and respond to mitigate risk, as described in greater detail herein. In certain embodiments, the EBC system environment may be implemented to include a security analytics system 118, likewise described in greater detail herein. In certain embodiments, the security analytics system 118 may be implemented to include an EBC system 120.

In certain embodiments, the EBC system 120, as described in greater detail herein, may be implemented to use entity behavior information to generate an entity behavior profile (EBP), likewise as described in greater detail herein. In certain embodiments, the security analytics system 118 may be implemented to use one or more session-based fingerprints to perform security analytics operations to detect such user or non-user entity behavior. In certain embodiments, the security analytics system 118 may be implemented to monitor entity behavior associated with a user entity, such as a user 'A' 702 or user 'B' 772. In certain embodiments, the user or non-user entity behavior may be monitored during user/device 730, user/network 742, user/resource 748, and user/user 770 interactions. In certain embodiments, the user/user 770 interactions may occur between a first user, such as user 'A' 702 and user 'B' 772.

In certain embodiments, as described in greater detail herein, an endpoint agent 306 may be implemented on an endpoint device 304 to perform user or non-user entity behavior monitoring. In certain embodiments, the user or non-user entity behavior may be monitored by the endpoint agent 306 during user/device 730 interactions between a user entity, such as user 'A' 702, and an endpoint device 304. In certain embodiments, the user or non-user entity behavior may be monitored by the endpoint agent 306 during user/network 742 interactions between user 'A' 702 and a network, such as an internal 744 or external 746 network. In certain embodiments, the user or non-user entity behavior may be monitored by the endpoint agent 306 during user/resource 748 interactions between user 'A' 702 and a resource 750, such as a facility, printer, surveillance camera, system, datastore, service, and so forth. In certain embodiments, the monitoring of user or non-user entity behavior by the endpoint agent 306 may include the monitoring of electronically-observable actions respectively enacted by a particular user or non-user entity. In certain embodiments, the endpoint agent 306 may be implemented in combination with the security analytics system 118 and the EBC system 120 to detect entity behavior of analytic utility and perform a security operation to mitigate risk.

In certain embodiments, the endpoint agent 306 may be implemented to include an event analytics 310 module and an EBP feature pack 1808. In certain embodiments, the EBP feature pack 1808 may be further implemented to include an event data detector 1810 module, an entity behavior data detector 1812 module, an event and entity behavior data collection 1814 module, an analytic utility detection 1816 module, an observable derivation 1818 module, and a security related activity abstraction 1820 module, or a combination thereof. In certain embodiments, the event data detector 1810 module may be implemented to detect event data, described in greater detail herein, resulting from user/device 730, user/network 742, user/resource 748, and user/user 770 interactions. In various embodiments, the entity behavior detector 1812 module may be implemented to detect certain user and non-user entity behaviors, described in greater detail herein, resulting from user/device 730, user/network 742, user/resource 748, and user/user 770 interactions.

In various embodiments, the event and entity behavior data collection 1814 module may be implemented to collect certain event and entity behavior data associated with the user/device 730, user/network 742, user/resource 748, and user/user 770 interactions. In certain embodiments, the analytic utility detection 1816 may be implemented to detect entity behavior of analytic utility associated with events corresponding to the user/device 730, user/network 742, user/resource 748, and user/user 770 interactions. In various embodiments, the observable derivation 1818 module may be implemented to derive observables, described in greater detail herein, associated with events of analytical utility corresponding to the user/device 730, user/network 742, user/resource 748, and user/user 770 interactions. In various embodiments, the security related activity abstraction 1820 module may be implemented to generate a security related activity, likewise described in greater detail herein, from the observables derived by the observable derivation 1816 module.

In certain embodiments, the endpoint agent 306 may be implemented to communicate the event and entity behavior collected by the event and entity behavior data collector 1814 module, the observables derived by the observable derivation 1816 module, and the security related activities generated by the security related activity abstraction 1818, or a combination thereof, to the security analytics 118 system. In certain embodiments, the security analytics system 118 may be implemented to receive the event and entity behavior data, the observables, and the security related activities provided by the endpoint agent 306. In certain embodiments, the endpoint agent 306 may be implemented to provide the event and entity behavior data, the observables, and the security related activities, or a combination thereof, to the security analytics system 118. In turn, in certain embodiments, the security analytics system 118 may be implemented in certain embodiments to provide the event and entity behavior data, the observables, and the security related activities, or a combination thereof, to the EBC system 120 for processing.

In certain embodiment, the EBC system 120 may be implemented to include an entity behavior contextualization 1880 module, an EBP session generator 1882 module, an EBP element generator 1884, or a combination thereof. In certain embodiments, the EBP element generator 1882 module may be implemented to process the event and entity behavior data, the observables, and the security related activities provided by the endpoint agent 306 to generate EBP elements, described in greater detail herein. In certain embodiments, the EBP session generator 1884 may be implemented to use the event and entity behavior data, the observables, and the security related activities provided by the endpoint agent 306, to generate session information. In certain embodiments, the EBP session generator 1884 may be implemented to use the resulting session information to generate an activity session, described in greater detail herein. In various embodiments, as likewise described in greater detail herein, certain EBP management operations may be performed to associate EBP elements generated by the EBP element generator 1882 module with a corresponding EBP. Likewise, certain EBP management operations may be performed to use the session information generated by the EBP session generator 1884 module to associate a particular EBP element with a particular EBP In certain embodiments, the EBC system 120 may be implemented as a distributed system. Accordingly, various embodiments of the invention reflect an appreciation that certain modules, or associated functionalities, may be implemented either within the EBC system 120 itself, the EBP feature pack 1808, an edge device 202, an internal 744 or external 746 network, an external system 780, or some combination thereof. As an example, the functionality provided, and operations performed, by the analytic utility detection 1816, observable derivation 1818 and security related activity abstraction 1820 modules may be implemented within the EBC system 120 in certain embodiments. Likewise, the functionality provided, and operations performed, by the entity behavior contextualization 1880, EBP session generator 1882, and EBP element generator 1884 may be implemented within the EBP feature pack 1808. Those of skill in the art will recognize that many such implementations are possible. Accordingly, the foregoing is not intended to limit the spirit, scope, or intent of the invention.

Figure 19:
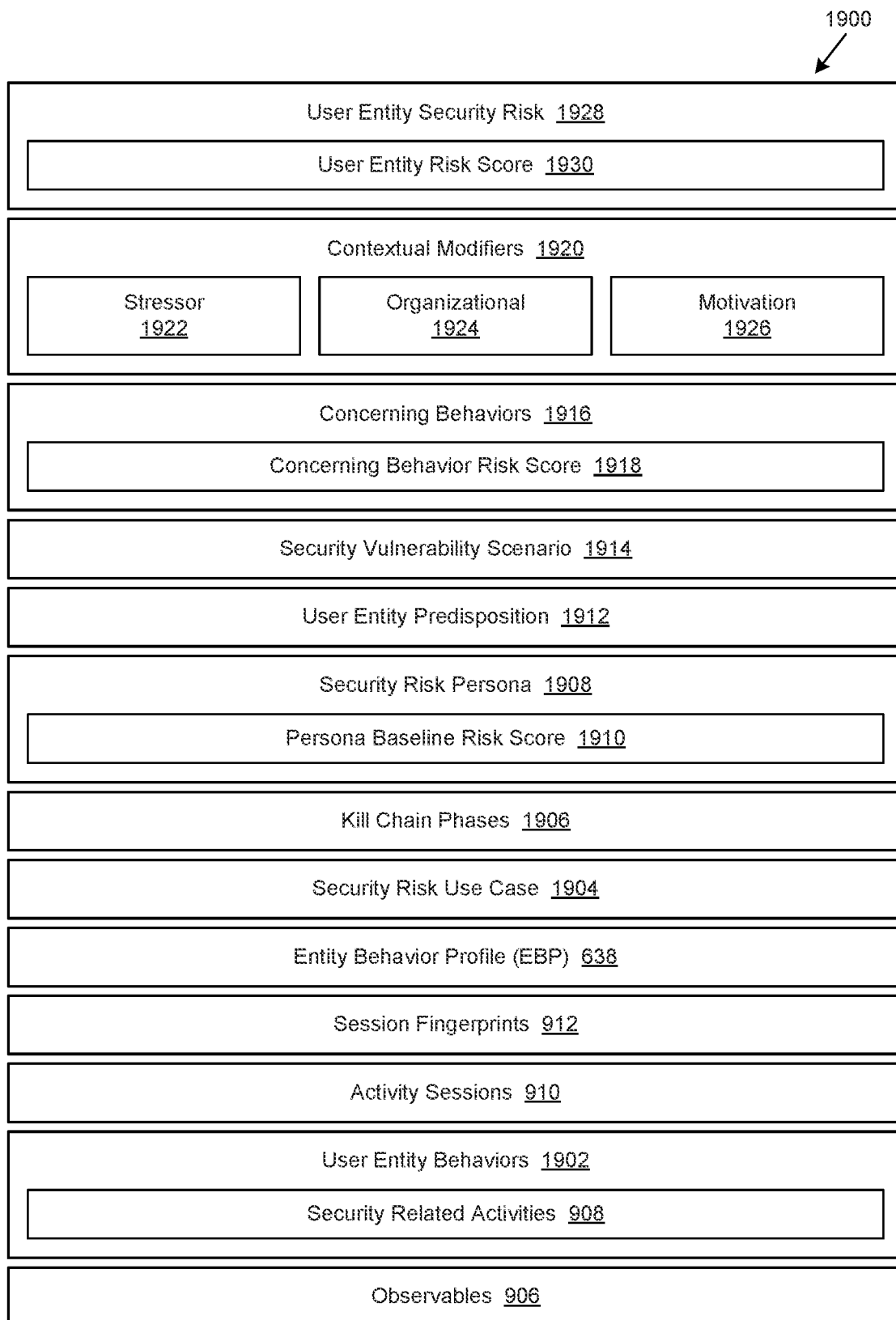
FIG. 19 shows a human-centric risk modeling framework.

FIG. 19 shows a human-centric risk modeling framework implemented in accordance with an embodiment of the invention. As used herein, human-centric risk broadly refers to any risk associated with the enactment of a behavior by a user entity, as described in greater detail herein. In certain embodiments, the human-centric risk modeling framework 1900 shown in FIG. 19 may be used by a human-centric risk modeling system, described in greater detail herein, to perform a security analytics operation, likewise described in greater detail herein. In certain embodiments, the security analytics operation may be performed independently by the human-centric risk modeling system or in combination with a security analytics system. Various embodiments of the invention reflect an appreciation that known approaches to human-centric risk modeling have certain limitations that often pose challenges for security-related implementation. Likewise, various embodiments of the invention reflect an appreciation that implementation of the behavior-based risk modeling framework 1900 may assist in addressing certain of these limitations.

In certain embodiments, behavior enacted by a user entity may be of analytic utility, likewise described in greater detail herein. In certain embodiments, such entity behavior of analytic utility may be determined to be anomalous, abnormal, unexpected, malicious, or some combination thereof, as described in greater detail herein. In certain embodiments, the human-centric risk modeling framework 1900 may be implemented as a reference model for assessing the risk associated with a user entity enacting anomalous, abnormal, unexpected, or malicious behavior, or some combination thereof. In certain embodiments, the assessment of such risk may be qualitative, quantitative, or a combination of the two. In certain embodiments, the risk assessment may be quantitatively expressed in the form of a user entity risk score 1930, described in greater detail herein.

In certain embodiments, an observable 906, described in greater detail herein, may be derived from an associated event, as likewise described in greater detail herein. In certain embodiments, one or more observables 906 may be processed to generate a corresponding security related activity 908. In various embodiments, the security related activities 908 may be associated with the enactment of certain user entity behaviors 1902, described in greater detail herein. In various embodiments, as described in greater detail herein, certain user entity behaviors 1902 may be enacted during one or more activity sessions 910, likewise described in greater detail herein. In certain embodiments, one or more security related activities 908 may be processed to generate a corresponding activity session 910. In certain embodiments, the activity session 910 may be processed, as described in greater detail herein, to generate a corresponding session fingerprint 912.

In certain embodiments, as described in greater detail herein, the resulting session fingerprints 912 may be associated with a corresponding entity behavior profile (EBP) 638, which in turn may be associated with a particular security risk use case 1904. In certain embodiments, the security risk use case 1904 may in turn be associated with a particular phase 1906 of an outcome-oriented kill chain, described in the descriptive text associated with FIG. 23. In certain embodiments, as likewise described in the descriptive text associated with FIG. 23, a different security risk persona 1908 may be associated with each phase 1906 of an outcome-oriented kill chain. In certain embodiments, the security risk use case 1904 may be associated a single-phase kill chain, as described in the descriptive text associated with FIG. 24.

Figure 23:
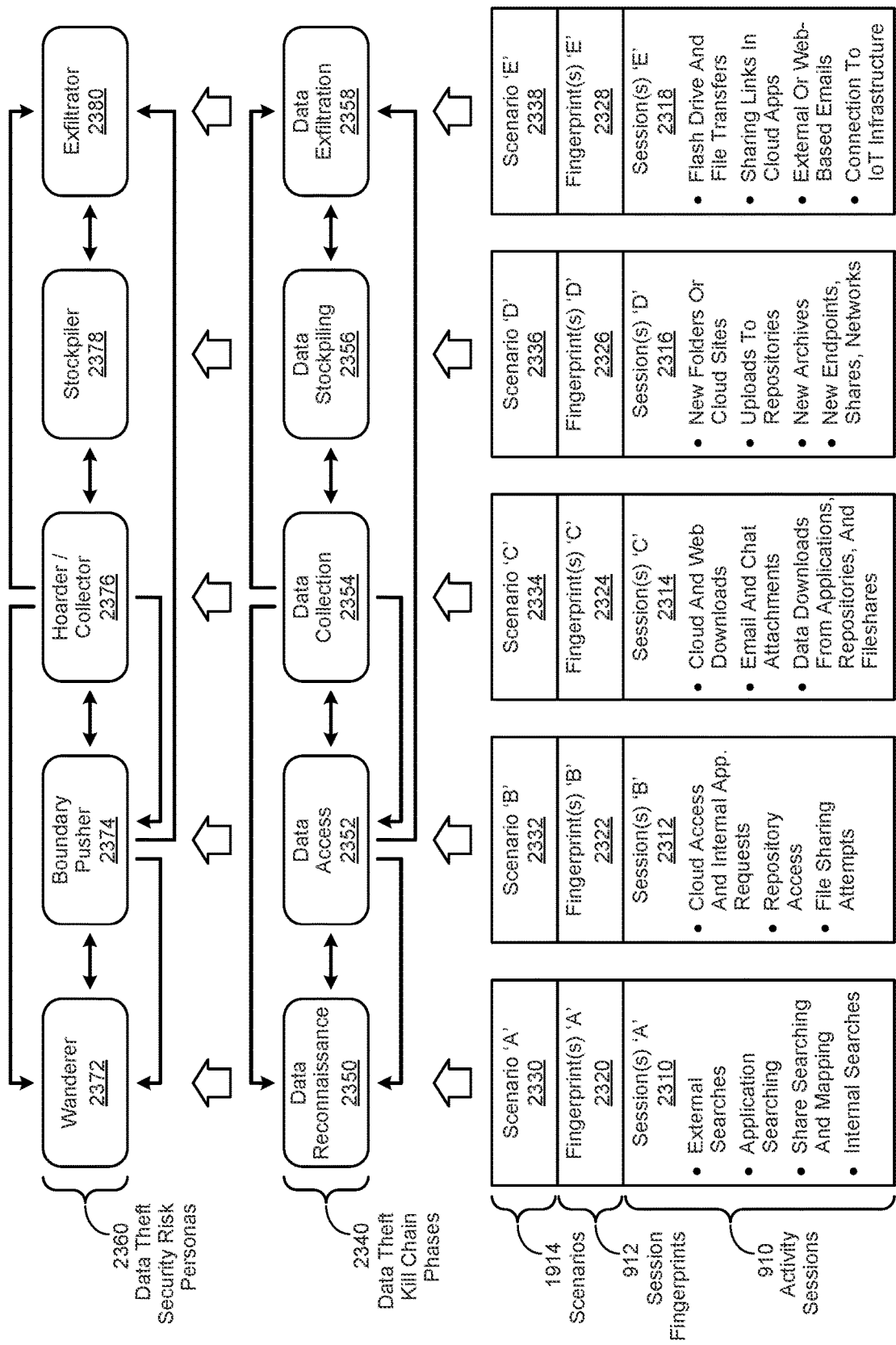
FIG. 23 shows security risk persona transitions associated with a corresponding outcome-oriented kill chain.

In certain embodiments, as described in the descriptive text associated with FIG. 23, each phase 1906 of an outcome-oriented kill chain may be implemented to have a corresponding security risk persona 1908. As used herein, a security risk persona 1908 broadly refers to a descriptor characterizing the behavioral pattern exhibited by a user entity during the enactment of certain user entity behaviors 1902 associated with a particular phase 1906 of a kill chain. In certain embodiments, the security risk persona 1908 may directly or indirectly characterize, or otherwise reference, one or more user entity behaviors 1902. As an example, a user entity may exhibit user entity behaviors 1902 typically associated with data stockpiling. In this example, the security risk persona 1908 for the user entity might be "Data Stockpiler," or "Stockpiler." In certain embodiments, as described in the descriptive text associated with FIG. 24, a security risk persona 1908 may be implemented as a contextual risk persona 2412, such as "Leaver."

In various embodiments, certain user entity behaviors 1902 associated with a security risk use case 1904 may be used to define, or otherwise describe or characterize, a particular security risk persona 1908. In these embodiments, the user entity behaviors 1902 selected for use, and the method by which the security risk persona 1908 is defined, or otherwise described or characterized, is a matter of design choice. In these embodiments, the descriptor selected to characterize a particular behavioral pattern exhibited by a user entity is likewise a matter of design choice. In certain embodiments, a security risk persona 1908 may have a corresponding persona baseline risk score 1910. In certain embodiments, the persona baseline risk score 1910 may be implemented to reflect a quantitative assessment of the risk corresponding to the user entity behaviors 1902 referenced by its associated security risk persona 1908.

In various embodiments, as described in greater detail herein, certain security risk personas 1908 may be implemented to track dynamic changes in user entity behaviors 1902. In various embodiments, the ability to track dynamic changes in user entity behaviors 1902 may facilitate the identification and management of rapidly developing threats. Accordingly, certain embodiments of the invention reflect an appreciation that such tracking may be indicative of dynamic behavioral change associated with a particular user entity. Likewise, certain embodiments of the invention reflect an appreciation that security risk personas 1908 may shift, or transition, from one to another, and in doing so, reflect important shifts in behavior that are relevant to understanding an entity's traversal of kill chains.

In certain embodiments, a security risk persona 1908 may be used to determine a particular user entity's predisposition 1912. As used herein, a user entity predisposition 1912 broadly refers to an end user's enduring behavioral trends. In various embodiments, a user entity predisposition 1912 may be implemented to represent a user entity's dominant or enduring security risk persona 1908 over a particular period of time. In certain of these embodiments, establishing a user entity's predisposition 1912 may require tracking their associated security risk personas 1908 over such a period of time. In certain embodiments, a user entity's predisposition 1908 may be established over a plurality of activity sessions 910.

In certain embodiments, a user entity's predisposition 1912 may include one or more characteristics historically or otherwise linked to a propensity to exhibit malicious behavior (e.g., low honesty-humility, manipulative, narcissism, etc.). Certain embodiments of the invention reflect an appreciation that a user entity's predisposition 1912 may prove useful for identifying and managing slower moving or ongoing threats, such as low and slow data exfiltration or espionage. Accordingly, certain embodiments of the invention reflect an appreciation that user entity's predispositions 1912, as typically implemented, may create an avenue for understanding a user entity's behaviors 1902 within the context of certain kill chain phases 1906 in a longer-term capacity.

Likewise, certain embodiments of the invention reflect an appreciation that understanding user entity predispositions 1912 may assist in determining a user entity's potential alignment with kill chain phases 1906 and associated security vulnerability scenarios 1914, described in greater detail herein. Certain embodiments of the invention likewise reflect an appreciation that user entity predispositions 1912 may be used to create meaningful profiles of a user entity's behavior 1902 patterns, such as an EBP 638. Accordingly, certain embodiments of the invention reflect an appreciation that user entity predispositions 1912 may likewise be used to decrease false positives, maintain a meaningful risk score for the user entity during periods of absence, and to identify subtle yet dangerous changes in behavior over a longer timeline.

In various embodiments, the human-centric risk model 1900 may be referenced, or otherwise used, in the performance of security risk calculation operations to provide qualitative and quantitative assessments of security risk associated with certain user entity behaviors 1902. In certain of these embodiments, these security risk calculation operations may be based upon concerning behaviors 1916 associated with a particular user entity. As used herein, a concerning behavior 1916 broadly refers to a user entity behavior 1902 of analytic utility, described in greater detail herein, that may be considered a potential security risk. In certain embodiments, as likewise described in greater detail herein, such entity behavior 1902 of analytic utility may be determined to be anomalous, abnormal, unexpected, malicious, or some combination thereof. In these embodiments, the user entity behaviors 1902 determined to be a concerning behavior 1916, and the method by which the determination is performed, is a matter of design choice.

In certain embodiments, a particular concerning behavior 1916 may have a corresponding concerning behavior risk score 1918. In certain embodiments, the concerning behavior risk score 1918 may be implemented as a numeric value. In certain embodiments, the numeric value of the concerning behavior risk score 1918 may be implemented to quantitatively reflect the security risk associated with a particular concerning behavior 1916.

In various embodiments, the concerning behavior risk score 1918 may be implemented to be within a certain range of numeric values. In certain embodiments, the range of numeric values may be implemented to have a lower and upper bound. As an example, the concerning behavior risk score 1918 for a particular concerning behavior 1916 may be implemented to have a lower bound of '0,' indicating extremely low risk, and an upper bound '100,' indicating extremely high risk. To illustrate the example, a user entity may exhibit a concerning behavior 1916 by accessing a corporate server containing sales data, which in turn may result in the generation of an associated concerning behavior risk score 1918 of '50.' In this example, the concerning behavior risk score 1918 of '50' may indicate moderate risk. However, downloading the same sales data to a laptop computer may result in the generation of a concerning behavior risk score of '75,' indicating high risk. To further illustrate the example, downloading the same sales data to a laptop computer, and then storing the sales data on a flash drive, may result in the generation of a concerning behavior risk score of '90,' indicating very high risk.

In certain embodiments, the numeric value of a concerning behavior risk score 1918, or the upper and lower bounds of its associated range of numeric values, or both, may be implemented to be configurable. In certain embodiments, the selection of a numeric value for a particular concerning behavior risk score 1918, or the selection of the upper and lower bounds of its associated range of numeric values, or both, may be performed manually, automatically, or a combination thereof. In these embodiments, the numeric value selected for a particular concerning behavior risk score 1918, or the upper and lower bounds selected for its associated range of numeric values, or both, is a matter of design choice.

Certain embodiments of the invention reflect an appreciation that not all user entity behaviors 1902 are concerning behaviors 1916. As an example, a user entity behavior 1902 such as uploading a file to a cloud application is something many users do over the course of a day and may not expose an organization to additional risk or indicate that the user is engaging in particularly risky behavior. However, uploading a file to a cloud application may be considered a concerning behavior 1916, dependent upon the presence of certain user entity attributes (e.g., job title, physical location, working hours, etc.), and the behavioral context associated with the user entity.

As another example, two user entities may be observed to be performing the user entity behavior 1902 of logging into a software code repository. In this example, the first user has the job title of Senior Engineering Director, they are accessing the repository during normal working hours from their assigned corporate laptop, and have accessed this particular repository multiple times before. Accordingly, all associated user entity behaviors 1902 appear normal. However, the second user entity, has the job title of Junior Marketing Administrator, they are accessing the repository during a weekend from their corporate laptop machine, but from a public Internet Protocol (IP) address, and have never attempted to access this particular repository before. Furthermore, they have attempted to access the repository eleven times within a thirty minute time interval.

Consequently, while the user entity behavior 1902 of logging into the code repository may be the same for both user entities, the user entity behavior 1902 of the second user entity is considered a concerning behavior 1916 due to the additional context of their associated user entity attributes. As a result, the user entity risk score 1930 associated with the second user entity may be adjusted accordingly. Various embodiments of the invention reflect an appreciation that certain user entity behaviors 1902 may be considered so high-risk that no associated user entity attributes are necessary to establish them as concerning behaviors 1916. Certain embodiments of the invention further reflect an appreciation that such user entity behaviors 1902 may typically be associated with traditional threat-centric cybersecurity attacks where the severity of associated security related activities is well-defined.

Certain embodiments of the invention reflect an appreciation that concerning behaviors 1916 are primarily oriented towards current, or short-term, user entity behaviors 1902. Accordingly, concerning behaviors 1916 may be used in certain embodiments to more fully understand user entity behaviors 1902 in the context of each phase 1906 of an outcome-oriented kill chain, or to identify user entity behavior 1902 patterns of interest in a single-phase 1906 kill chain. Certain embodiments of the invention likewise reflect an appreciation that such context can be used advantageously to decrease false positives and improve the accuracy of user entity risk scores 1930.

In certain embodiments, a contextual modifier 1920 may be implemented to adjust the value of a concerning risk score 1918 for an associated concerning behavior 1916. As used herein, a contextual modifier 1920 broadly refers to a circumstance, aspect, dynamic, attribute, or other consideration used to clarify, mitigate, exacerbate, or otherwise affect the perception, meaning, understanding, or assessment of a security risk associated with a particular concerning behavior 1916. In certain embodiments, a contextual modifier 1920 may be implemented as a numeric value.

In certain embodiments, the numeric value of a contextual modifier 1920 may be implemented to quantitatively reflect its effect on an associated concerning behavior risk score 1918. In certain embodiments, the numeric value of a contextual modifier 1920 may be implemented to adjust the numeric value of an associated concerning risk score 1918 to contextually quantify the security risk associated with a particular concerning behavior 1916. In certain embodiments the numeric value of a particular contextual modifier 1920, individually or in combination with another contextual modifier 1920, may be implemented as a security risk weighting factor. In certain embodiments, the weighting factor may be applied to a concerning behavior risk score 1918 to contextually reflect the security risk associated with an associated concerning behavior 1916.

In certain embodiments, the numeric value of a particular contextual modifier 1920 may be implemented to be configurable. In various embodiments, the numeric value of a contextual modifier 1920 may be implemented to be within a certain range of numeric values. In certain embodiments, the range of numeric values may be implemented to have a lower and upper bound. In certain embodiments, the selection of a numeric value for a particular contextual modifier 1920, or the selection of the upper and lower bounds of its associated range of numeric values, or both, may be performed manually, automatically, or a combination thereof. In these embodiments, the numeric value selected for a particular contextual modifier 1920, or the upper and lower bounds selected for its associated range of numeric values, or both, is a matter of design choice.

In certain embodiments, the numeric value of one or more contextual modifiers 1920 may be applied as a weighting factor to a concerning behavior risk score 1918 associated with a particular concerning behavior 1916 to generate a user entity risk score 1930, as described in greater detail herein. In various embodiments, the resulting user entity risk score 1930 may be used to contextually quantify the security risk 1928 associated with a particular user entity exhibiting one or more concerning behaviors 1916.

In certain embodiments, a contextual modifier 1920 may be categorized as being a stressor 1922, organizational 1924, or motivation 1926 contextual modifier 1920. As used herein, a stressor 1922 contextual modifier 1920 broadly refers to any issue that may influence or otherwise affect a user entity's behavior 1902. In certain embodiments, a particular stressor 1922 contextual modifier 1920 may be classified as personal, professional, financial, legal, and so forth. In certain embodiments, one or more stressor 1922 contextual modifier 1920 classes may be associated with a particular security risk use case 1904 or concerning behavior 1916. In certain embodiments, stressor 1922 contextual modifiers 1920 are not used in isolation. Instead they are linked to an associated concerning behavior.

As used herein, an organizational stressor 1924 contextual modifier 1920 broadly refers to any event that occurs within an organization, or large group, that may influence or otherwise affect a user entity's behavior 1902 during a particular interval of time. For example, organizational stressor 1924 contextual modifiers 1920 may include organizational restructuring, layoffs, and geographical shifts, all of which can create a sense of uncertainty within an organization. To continue the example, certain of these organizational stressor 1924 contextual modifiers 1920 may prompt an employee to seek other employment opportunities. Furthermore, it is common for employees to feel they have personal ownership of their work. As a result, it is common for an employee to collect and exfiltrate intellectual property when changing jobs. Accordingly, certain embodiments of the invention reflect an appreciation that the use of organizational stressor 1924 contextual modifiers 1920 may assist in identifying concerning behaviors 1916 associated with high employee turnover, loss of intellectual property, and other organization vulnerabilities.

As used herein, a motivation 1926 contextual modifier 1920 broadly refers to one or more user entity behaviors 1902 that may provide an indication of a user entity's motivation for enacting that user behavior 1902. In certain embodiments, a motivation 1926 contextual modifier 1920 may be associated with a particular phase 1906 of an outcome-oriented kill chain, such as a data theft kill chain. In certain embodiments, concerning behaviors 1916 may be used, with or without contextual modifiers 1920, individually or in combination, with security risk personas 1908 and user entity predispositions 1912 to enable risk-adaptive enforcement of security policies.

As described in greater detail herein, an EBP 638 may be implemented in various embodiments to collect certain user entity behavior 1902 and other information associated with a particular user entity. Examples of such information may include user entity attributes, such as their name, position, tenure, office location, working hours, and so forth. In certain embodiments, the EBP 638 may likewise be implemented to collect additional behavioral information associated with the human-centric risk model 1900. Examples of such additional information may include certain historical information associated with kill chain phases 1906, associated security risk personas 1908, user entity predisposition 1912, security vulnerability scenarios 1914, concerning behaviors 1916, and user entity risk scores 1930.

As an example, an EBP 638 may contain the following user entity information:

| | |
|---|---|
| Entity Name: | John Smith |
| Entity Risk Score: | 50% |
| Current Security Risk Persona: | Wanderer |
| Security Vulnerability Scenarios: | Data Theft (Medium Confidence) |
| | Fraud (Low Confidence) |
| Leave Risk Score | 55% |

Figure 20:
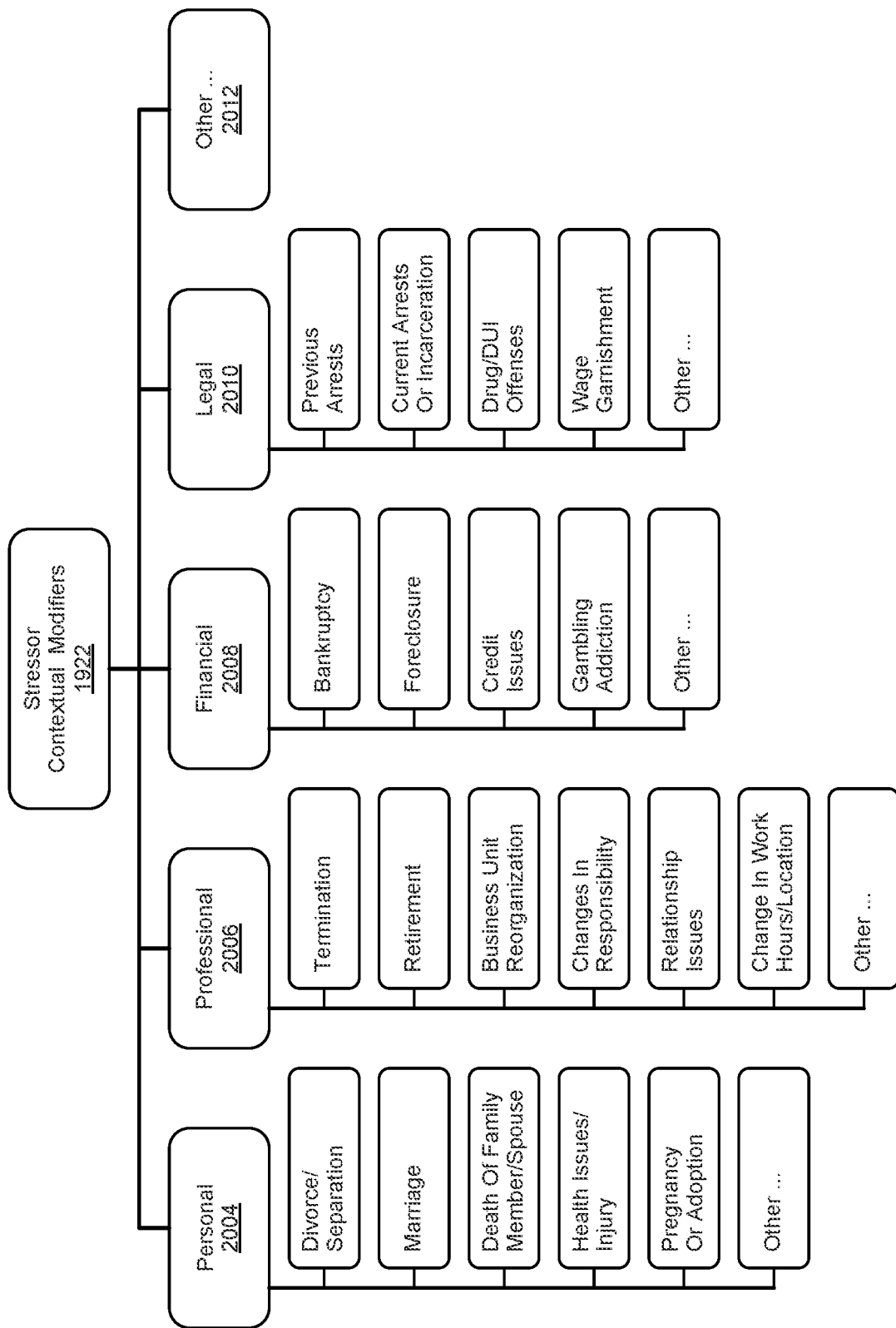
FIG. 20 is a graphical representation of an ontology showing example stressor contextual modifiers.

FIG. 20 is a graphical representation of an ontology showing example stressor contextual modifiers implemented in accordance with an embodiment of the invention. As described in greater detail herein, a stressor 1922 contextual modifier may trigger a concerning behavior. As likewise described in greater detail herein, stressor 1922 contextual modifiers may be implemented in certain embodiments to provide meaningful context for interpreting or influencing concerning behavior risk scores. In certain embodiments, classes of stressor 1922 contextual modifiers may include personal 2004, 2006, financial 2008, and legal 2010.

Certain embodiments of the invention reflect an appreciation that the presence of one or more stressor 1922 contextual modifiers will necessarily trigger a concerning behaviors or other negative activities. However, certain embodiments of the invention likewise reflect an appreciation that user entities engaging in both intentionally malicious and accidentally risky behaviors are frequently enduring personal 2004, 2006, financial 2008, and legal 2010 stress.

As shown in FIG. 20, examples of personal 2004 stressor 1922 contextual modifiers may include certain life changes, such as separation or divorce, marriage, the birth, death, or sickness of a family member or friend, health issues or injuries, pregnancy or adoption, and so forth. Likewise, examples of professional 2006 stressor 1922 contextual modifiers may include termination or unsatisfactory performance reviews, retirement, business unit reorganization, changes in responsibility or compensation, co-worker friction, changes in work hours or location, and so forth.

Examples of financial 2008 stressor 1922 contextual modifiers may likewise include bankruptcy, foreclosure, credit issues, gambling addition, and so forth. Likewise, examples of legal 2010 stressor 1922 contextual modifiers may include previous arrests, current arrests or incarceration, drug or driving under the influence (DUI) offenses, wage garnishment, and so forth. Skilled practitioners of the art will recognize that other 2012 classes of stressor 1922 contextual modifiers are possible. Accordingly, the foregoing is not intended to limit the spirit, scope, or intent of the invention.

Figure 21:
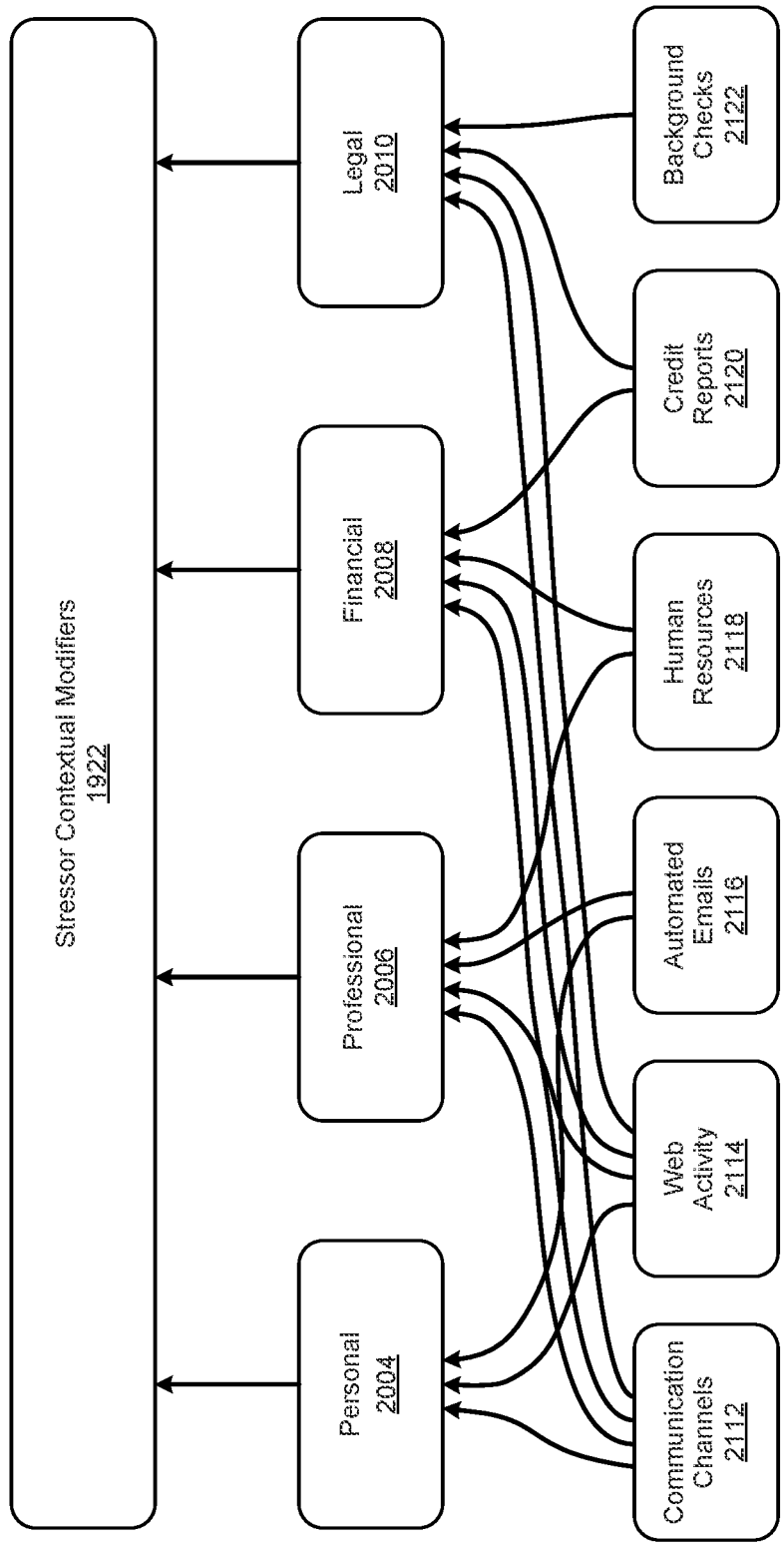
FIG. 21 shows a mapping of data sources to stressor contextual modifiers.

FIG. 21 shows a mapping of data sources to stressor contextual modifiers implemented in accordance with an embodiment of the invention. In various embodiments, individual stressor 1922 contextual modifiers may be implemented to receive input data from certain data sources. In certain embodiments, these data sources may include communication channels 2112 of various kinds, web activity 2114, automated emails 2116, human resources 2118 communications, credit reports 2120, and background checks 2122. Skilled practitioners of the art will recognize that individual stressor 1922 contextual modifiers may be implemented to receive input data from other data sources as well. Accordingly, the foregoing is not intended to limit the spirit, scope, or intent of the invention.

In certain embodiments, communication channels 2112 may include emails, chat (e.g., Slack®), phone conversations (e.g., telephone, Skype®, etc.), and so forth. In various embodiments, natural language processing (NLP) approaches familiar to those of skill in the art may be implemented to identify certain stressors within a particular communication channel 2112 exchange. In various embodiments, web activity 2114 may be monitored and processed to identify certain stressors. In various embodiments, web activity 2114 may likewise be monitored and processed to identify certain web-related data fields, such as search terms, time stamps, domain classification, and domain risk class. In certain embodiments, auto-generated emails, especially from Human Capital Management (HCM) or Human Resource (HR) systems may be implemented to assist organization identify and understand stressors related to a user entity's professional and life events. Likewise, data received for human resources 2118, credit reports 2120, and background checks 2122 may be implemented in certain embodiments, to assist in identifying and understanding additional stressors related to a particular user entity.

In certain embodiments, more than one data source may provide input data to a particular stressor 1922 contextual modifier. For example, as shown in FIG. 21, a professional 2006 stressor 1922 contextual modifier may be implemented to receive input data from certain communication channels 2112, web activity 2114, automated emails 2116, and human resources 2118 communications. Those of skill in the art will recognize that many such embodiments and examples are possible. Accordingly, the foregoing is not intended to limit the spirit, scope or intent of the invention.

Figure 22:
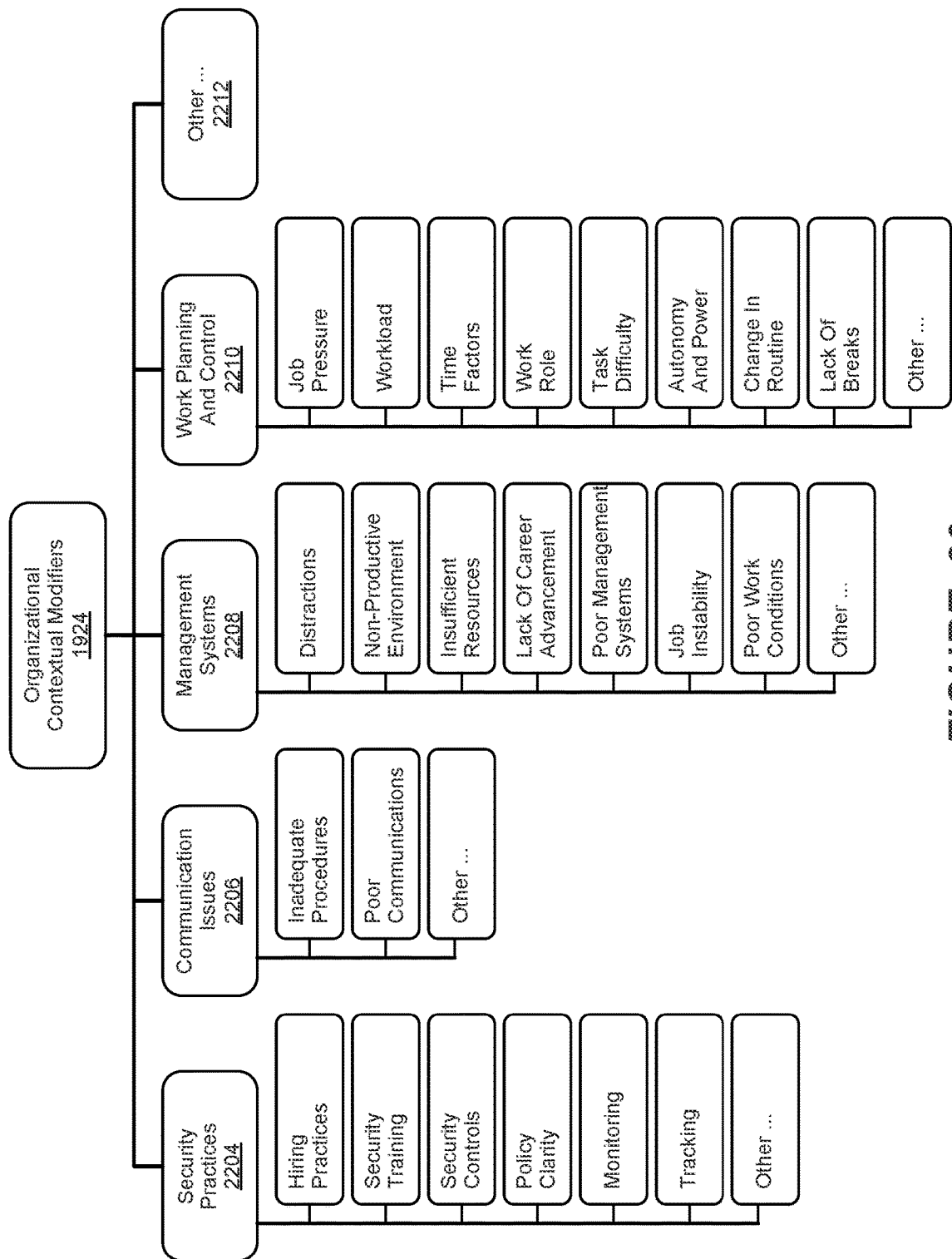
FIG. 22 is a graphical representation of an ontology showing example organizational contextual modifiers.

FIG. 22 is a graphical representation of an ontology showing example organizational contextual modifiers implemented in accordance with an embodiment of the invention. As described in greater detail herein, an organizational 1924 contextual modifier may trigger a concerning behavior. As likewise described in greater detail herein, organizational 1924 contextual modifiers may be implemented in certain embodiments to provide meaningful context for interpreting or influencing concerning behavior risk scores. In certain embodiments, classes of organizational 1924 contextual modifiers may include security practices 2204, communication issues 2206, management systems 2208, and work planning and control 2210.

As shown in FIG. 22, examples of security practices 2204 organizational 1924 contextual modifiers include hiring practices, security training and controls, policy clarity, monitoring and tracking practices, and so forth. Likewise, examples of communication issues 2206 organizational 1924 contextual modifiers include inadequate procedures, poor communications, and so forth. Examples of management systems 2208 organizational 1924 contextual modifiers may likewise include distractions of various kinds, a non-productive environment, insufficient resources, and lack of career advancement. Other examples of management systems 2208 organizational 1924 contextual modifiers may include poor management systems, job instability, poor work conditions, and so forth.

Likewise, examples of work planning and control 2210 organizational 1924 contextual modifiers include job pressures of different sorts, workload, time factors, work role, task difficulty, lack of autonomy and power, change in routine, lack of breaks, and so forth. Skilled practitioners of the art will recognize that other 2212 classes of organizational 1924 contextual modifiers are possible. Accordingly, the foregoing is not intended to limit the spirit, scope, or intent of the invention.

FIG. 23 shows security risk persona transitions associated with a corresponding outcome-oriented kill chain implemented in accordance with an embodiment of the invention. In certain embodiments, a security analytics system, an entity behavior catalog (EBC) system, or a human-centric risk modeling system, or a combination thereof, may be implemented to monitor the behavior of a particular user entity, as described in greater detail herein. In certain embodiments, such monitoring may include observing an electronically-observable data source, such as the EBC data sources shown in FIGS. 6, 8, 15, 16*b* and 17.

In certain embodiments, an observable, described in greater detail herein, may be derived from the electronically-observable data source. In certain embodiments, the observable is associated with an event of analytic utility, likewise described in greater detail herein. In certain embodiments, one or more derived observables may then be associated with a security related activity, as described in greater detail herein. In various embodiments, a particular security activity may be associated with a component of a cyber kill chain.

Skilled practitioners of the art will be familiar with a kill chain, which was originally used as a military concept related to the structure of an attack. In general, the phases of a military kill chain consisted of target identification, force dispatch to target, decision and order to attack the target, and destruction of the target. Conversely, breaking or disrupting an opponent's kill chain is a method of defense or preemptive action. Those of skill in the art will likewise be familiar with a cyber kill chain, developed by the Lockheed Martin company of Bethesda, Maryland, which is an adaptation of the military kill chain concept that is commonly used to trace the phases of a cyberattack.

In certain embodiments, a cyber kill chain may be implemented to represent multi-stage, outcome-oriented user entity behaviors. In general, such outcome-oriented cyber kill chains will have at least two defined phases. However, a single-phase cyber kill chain may be implemented in certain embodiments, as described in greater detail herein, to represent context-oriented security vulnerability scenarios 1914. In certain embodiments, the phases of an outcome-oriented cyber kill chain may be adapted, or otherwise implemented, for a particular type of cyberattack, such as data theft. For example, as shown in FIG. 23, the phases of a data theft kill chain 2340 may include data reconnaissance 2350, data access 2352, data collection 2354, data stockpiling 2356, and data exfiltration 2358.

However, the cyber kill chain concept is not limited to data theft, which relates to theft of an organization's intellectual property. It can also be implemented to facilitate the anticipation and recognition of insider threats, such as insider sabotage, which includes any act by an insider to direct any kind of harm to an organization or its assets. Other insider threats include insider fraud, which relates to modification, deletion, or theft of an organization's data for personal gain, typically associated with the perpetration of an identity crime (e.g., identity theft, credit card fraud, etc.).

Yet other insider threats include unintentional insider threat, which includes any act, or failure to act, by an insider without malicious intent, that causes harm or substantially increases the probability of future harm to an organization or its assets. The cyber kill chain concept can likewise be implemented to address the occurrence, or possibility thereof, of workplace violence, which relates to any threat of physical violence, harassment, intimidation, or other threatening disruptive behavior in the workplace. Likewise, the cyber kill chain concept can be applied to social engineering, advanced ransomware, and innovative cyberattacks as they evolve.

In certain embodiments, a cyber kill chain may be implemented to anticipate, recognize, and respond to entity behavior of analytic utility that may be determined to be anomalous, abnormal, unexpected, malicious, or some combination thereof, as described in greater detail herein. In certain embodiments, the response to recognition of a kill chain may be to perform an associated security operation, likewise described in greater detail herein. In certain embodiments, the performance of the security operation may result in disrupting or otherwise interfering with the performance, or execution, of one or more components, steps, or phases of a cyber kill chain by affecting the performance, or enactment, of the security related activity by its associated entity.

In certain embodiments, a cyber kill chain may consist of more components, steps, or phases of the data theft kill chain 2340 shown in FIG. 23. For example, in certain embodiments, the cyber kill chain may likewise include intrusion, exploitation, privilege escalation, lateral movement, obfuscation/anti-forensics, and denial of service (DoS). In such embodiments, the data reconnaissance component 2350 may be executed as an observation stage to identify targets, as well as possible tactics for the attack. In certain embodiments, the data reconnaissance component 2350 may not be limited to data exfiltration. For example, it may be related to other anomalous, abnormal, unexpected, malicious activity, such as identity theft.

In certain embodiments, the data access 2352 component may not be limited to gaining access to data. In certain embodiments, the data access 2352 component of a cyber kill chain may be executed as an intrusion phase. In such embodiments, the attacker may use what was learned in execution of the data reconnaissance 2350 component to determine how to gain access to certain systems, possibly through the use of malware or exploitation of various security vulnerabilities. In certain embodiments, a cyber kill chain may likewise include an exploitation component, which may include various actions and efforts to deliver malicious code and exploit vulnerabilities in order to gain a better foothold with a system, network, or other environment.

In certain embodiments, a cyber kill chain may likewise include a privilege escalation component, which may include various actions and efforts to escalate the attacker's privileges in order to gain access to more data and yet more permissions. In various embodiments, a cyber kill chain may likewise include a lateral movement component, which may include moving laterally to other systems and accounts to gain greater leverage. In certain of these embodiments, the leverage may include gaining access to higher-level permissions, additional data, or broader access to other systems.

In certain embodiments, a cyber kill chain may likewise include an obfuscation/anti-forensics component, which may include various actions and efforts used by the attacker to hide or disguise their activities. Known obfuscation/anti-forensics approaches include laying false trails, compromising data, and clearing logs to confuse or slow down security forensics teams. In certain embodiments, the data collection 2254 of a cyber kill chain may the collection of data with the intent of eventually being able to exfiltrate it. In certain embodiments, collected data may be accumulated during a data stockpiling 2356 component of a cyber kill chain.

In certain embodiments, a cyber kill chain may likewise include a denial of service (DoS) component, which may include various actions and efforts on the part of an attacker to disrupt normal access for users and systems. In certain embodiments, such disruption may be performed to stop a cyberattack from being detected, monitored, tracked, or blocked. In certain embodiments, the data exfiltration 2358 component of a cyber kill chain may include various actions and efforts to get data out of a compromised system.

In certain embodiments, information associated with the execution of a particular phase of a cyber kill chain may be associated with a corresponding security vulnerability scenario 1914, described in greater detail herein. In certain embodiments, one of more components of a particular cyber kill chain may be associated with one or more corresponding security related use cases, likewise described in greater detail herein. In certain embodiments, performance or execution of a component or phase of a cyber kill chain may be disrupted by affecting completion of the security related risk use case. Those of skill in the art will recognize that many such embodiments are possible. Accordingly, the foregoing is not intended to limit the spirit, scope, or intent of the invention.

In various embodiments, certain user entity behaviors may be observed as the result of security related activities being enacted during an associated activity session 910. In various embodiments, certain of these user entity behaviors may be considered to be concerning behaviors, described in greater detail herein. In various embodiments, as described in greater detail herein, certain security related activities associated with each activity session 910 may be processed to generate a corresponding session fingerprint 912. As likewise described in greater detail herein, each resulting session fingerprint 912 may then be associated in certain embodiments with a corresponding security vulnerability scenario 1914. In certain embodiments, as described in greater detail herein, individual security vulnerability scenarios 1914 may in turn be associated with a particular phase of a cyber kill chain, such as the data theft kill chain phases 2340 shown in FIG. 23.

As an example, as shown in FIG. 23, security related activities enacted by a user entity during activity session(s) 'A' 2310 may be processed to generate session fingerprint(s) 'A' 2320, which may then be associated with security vulnerability scenario 'A' 2330. In turn, security vulnerability scenario 'A' 2330 may in turn be associated with the data reconnaissance 2350 phase of the data theft kill chain 2340. In this example, the security related activities may include external searches, application searching, share searching and mapping, internal searches, and so forth.

As another example, security related activities enacted by a user entity during activity session(s) 'B' 2312 may be processed to generate session fingerprint(s) 'B' 2322, which may then be associated with security vulnerability scenario 'B' 2332. In turn, security vulnerability scenario 'B' 2332 may in turn be associated with the data access 2352 phase of the data theft kill chain 2340. In this example, the security related activities may include cloud access and internal application requests, data repository access, file sharing attempts, and so forth.

As yet another example, security related activities enacted by a user entity during activity session(s) 'C' 2314 may be processed to generate session fingerprint(s) 'C' 2324, which may then be associated with security vulnerability scenario 'C' 2334. In turn, security vulnerability scenario 'C' 2334 may in turn be associated with the data collection 2354 phase of the data theft kill chain 2340. In this example, the security related activities may include cloud and web downloads, email and chat attachments, data downloads from applications, data repositories, and file shares, and so forth.

As yet still another example, security related activities enacted by a user entity during activity session(s) 'D' 2316 may be processed to generate session fingerprint(s) 'D' 2326, which may then be associated with security vulnerability scenario 'D' 2336. In turn, security vulnerability scenario 'D' 2336 may in turn be associated with the data stockpiling 2356 phase of the data theft kill chain 2340. In this example, the security related activities may include creation of new folders or cloud sites, uploads to data repositories, creation of new archives, endpoints, file shares, or network connections, and so forth.

As an additional example, security related activities enacted by a user entity during activity session(s) 'E' 2318 may be processed to generate session fingerprint(s) 'E' 2328, which may then be associated with security vulnerability scenario 'E' 2338. In turn, security vulnerability scenario 'E' 2338 may in turn be associated with the data exfiltration 2358 phase of the data theft kill chain 2340. In this example, the security related activities may include flash drive and file transfers, sharing links in cloud applications, external or web-based email communication, connection to Internet of Things (IoT) infrastructures, and so forth.

In various embodiments, certain phases of a cyber kill chain, such as the phase of the data theft kill chain 2340 shown in FIG. 3, may be associated with a corresponding security risk persona, such as the data theft security risk personas 2360, likewise shown in FIG. 23. For example, the data reconnaissance 2350, data access 2352, data collection 2354, data stockpiling 2356, and data exfiltration 2358 phases of the data theft kill chain 2340 may respectively be associated with the wanderer 2372, boundary pusher 2374, hoarder/collector 2376, stockpile 2378, and exfiltrator 2380 data theft security risk personas 2360. Accordingly, a security risk persona may be implemented in certain embodiments to align with a corresponding cyber kill chain phase. As an example, the data theft security risk persona 2360 of wanderer 2372 may be aligned with the data theft kill chain phase 2340 of data reconnaissance 2350.

In certain embodiments, a security risk persona may be named, stylized, or otherwise implemented, to convey a sense of the general behavioral theme of an associated user entity. As an example, the data theft security risk persona 2360 of boundary pusher 2374 may convey, characterize, or otherwise represent a concerning behavioral pattern of a particular user entity attempting to access certain proprietary data. Accordingly, the data theft security risk persona 2360 of boundary pusher 2374 may implemented to align with the data theft kill chain 2340 phase of data access 2352.

In certain embodiments, a security risk persona may be implemented to describe, or otherwise indicate, an associated user entity's behavior at a particular point in time, and by extension, provide an indication of their motivation, or intent, or both. Accordingly, a security risk persona may be implemented in certain embodiments to provide an indication of a user entity's current phase in a particular cyber kill chain, or possibly multiple cyber kill chains. In certain embodiments, the alignment of a security risk persona to a corresponding phase of a cyber kill chain may be used to accurately map a particular security risk persona to concerning behaviors in a way that clarifies cyber kill chain phases and associated security vulnerability scenarios 1914. In certain embodiments, a user entity may exhibit multiple types, or categorizations, of concerning behaviors, such that they behaviorally and historically align with multiple security risk personas over the same interval of time.

In certain embodiments, the ordering of security risk personas may indicate a progression of the severity of the concerning behaviors associated with each phase of a cyber kill chain. In certain embodiments, a user entity's associated security risk persona may traverse a particular cyber kill chain over time. In certain embodiments, such traversal of a cyber kill chain may be non-linear, or bi-directional, or both. In certain embodiments, tracking the transition of a user entity's associated security risk persona over time may provide an indication of their motivation, or intent, or both.

As an example, as shown in FIG. 23, the data theft security persona 2360 of a user entity may initially be that of a hoarder/collector 2376. In this example, the user entity's data theft security persona 2360 may transition to boundary pusher 2374 and wanderer 2372. Alternatively, the user entity's data theft security persona 2360 may transition directly to wanderer 2372, and from there, to boundary pusher 2374. As yet another alternative, the user entity's data theft security persona 2360 may transition directly to exfiltrator 2380, and so forth. Skilled practitioners of the art will recognize that many such possibilities of a security risk persona traversing a cyber kill chain are possible. Accordingly, the foregoing is not intended to limit the spirit, scope, or intent of the invention.

Figure 24:
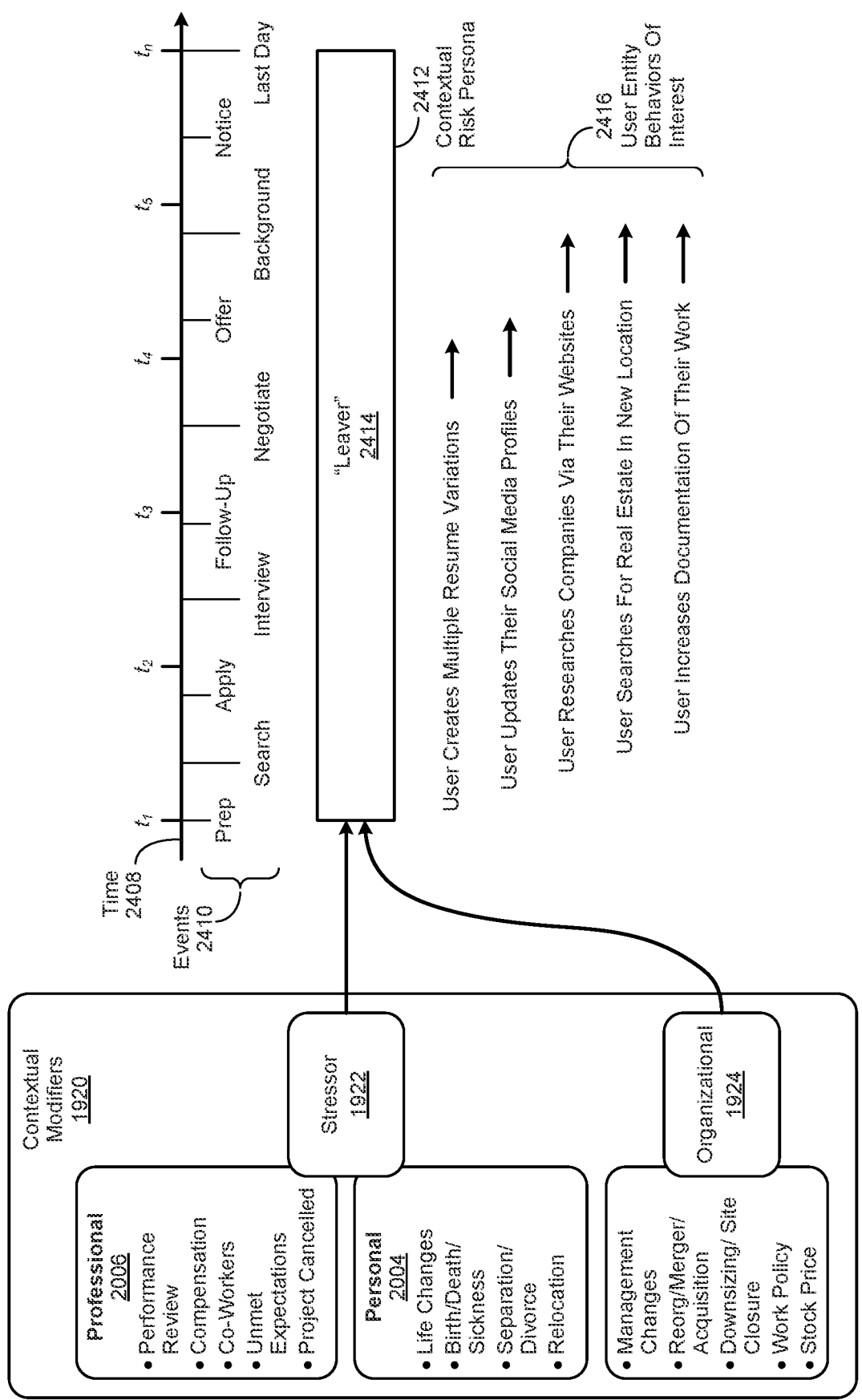
FIG. 24 shows concerning behaviors related to a contextual risk persona associated with a corresponding single-phase kill chain.

FIG. 24 shows concerning behaviors related to a contextual risk persona associated with a corresponding single-phase kill chain implemented in accordance with an embodiment of the invention. As used herein, a contextual risk persona 2412 broadly refers to a group of user entity behaviors of interest 2416, associated with a common theme, whose enactment is not explicitly related to a malicious objective. In various embodiments, user entity behaviors of interest 2416 associated with a contextual risk persona may not be outcome-oriented. Accordingly, in certain of these embodiments, a contextual risk persona 2412 may be implemented as a single-phase cyber kill chain.

In certain embodiments, a contextual risk persona 2412 may be typified by a descriptor characterizing its associated user entity behaviors of interest 2416 In various embodiments, user entity behaviors of interest 2416 associated with a particular contextual risk persona 2412 may occur during a certain period of time 2408. In various embodiments, a contextual risk persona's 2412 associated user entity behaviors of interest 2416 may correspond to the occurrence of certain events 2410 at certain points of time 2408.

As an example, as shown in FIG. 24, a user entity may exhibit a group of user entity behaviors of interest 2416 typically associated with the contextual risk persona 2412 of "Leaver" 2414. To continue the example, the group of user entity behaviors of interest 2416 may include the creation of multiple resume variations, updating of social media profiles, researching companies via their websites, searching for real estate in a new location, increased documentation of work product, and so forth. Likewise, associated events 2410 may include preparing for a job search, searching, applying, and interviewing for a new job, following up with a potential employer, negotiating compensation, reviewing an offer, completing a background check, tendering notice, and leaving the organization.

Accordingly, certain embodiments of the invention reflect an appreciation that not all user entity behaviors of interest 2416 are concerning behaviors, described in greater detail herein. Furthermore, certain embodiments reflect an appreciation that such user entity behaviors may include simple mistakes or inadvertently risky activities, and as such, are not explicitly linked to a malicious objective. Various embodiments of the invention likewise reflect an appreciation that while certain user entity behaviors of interest 2416 not explicitly be concerning behaviors, they may represent some degree of security risk.

In various embodiments, certain contextual modifiers 1920 may be implemented to act as security risk "force multipliers," by encouraging or accelerating the formation of a particular contextual risk persona 2412. In various embodiments, as described in greater detail herein, such contextual modifiers 1920 may include certain stressor 1922 and organizational 1924 contextual modifiers 1920. For example, as shown in FIG. 24, professional 2006 stressor 1922 contextual modifiers 1920 may include an unsatisfactory performance reviews or compensation, co-worker friction, unmet expectations, cancelled projects, and so forth. Personal 2004 stressor 1922 contextual modifiers 1920 may likewise include certain life changes, such as health issues, the birth, death, or sickness of a family member or friend, separation or divorce, relocation to a new locale, and so forth. Likewise, organizational 1924 contextual modifiers 1920 may include changes in management, reorganizations, mergers, acquisitions, downsizing, site closures, changes in work policies, declines in stock prices, and so forth. Those of skill in the art will recognize that many such examples are possible. Accordingly, the foregoing is not intended to limit the spirit, scope, or intent of the invention.

FIGS. 25a and 25b show tables containing human-centric risk model data used to generate a user entity risk score associated with a security vulnerability scenario implemented in accordance with an embodiment of the invention for an example data theft scenario. In certain embodiments, as described in greater detail herein, security risk personas 1908 associated with a particular security vulnerability scenario 1914 may be assigned a median risk score 1910. For example, as shown in FIGS. 25a and 25b, a security risk persona 1908 of "Boundary Pusher" may be assigned a median risk score 1910 of '20' for the security vulnerability scenario 1914 of "Data Theft."

In certain embodiments, a concerning behavior risk score 1918 may be generated for a particular user entity exhibiting concerning behaviors typically associated with a corresponding security risk persona 1908 during a calendar interval 2520 of time. In certain embodiments, the concerning behavior risk score 1918 may be adjusted according to the user entity's predisposition 1912 and the median risk score 1910 corresponding to security risk persona 1908 currently associated with the user entity. In certain embodiments, certain contextual modifiers 1920 may be applied to the concerning behavior risk score 1918 to generate an associated user entity risk score 1930.

For example, as shown in FIG. 25b, a user entity may be exhibiting concerning behaviors associated with a security risk persona 1908 of "Hoarder/Collector" associated with a security vulnerability scenario 1914 of "Data Theft" during the calendar interval 2520 of the second half of July. In this example, the user entity's predisposition 1912 is "Hoarder/Collector," signifying that the user entity's long-term predisposition is to collect and hoard information. Accordingly, the median risk score 1910 of '20' associated with the security risk persona 1908 of "Hoarder/Collector" may be used to generate a concerning behavior risk score 1918 of '30'. To continue the example, the resulting concerning behavior risk score 1918 of '30' is then respectively adjusted by stressor 1922, organizational 1924, and motivation 1926 contextual modifiers 1920 to yield a user entity risk score 1930 of '49'.

Figure 26:
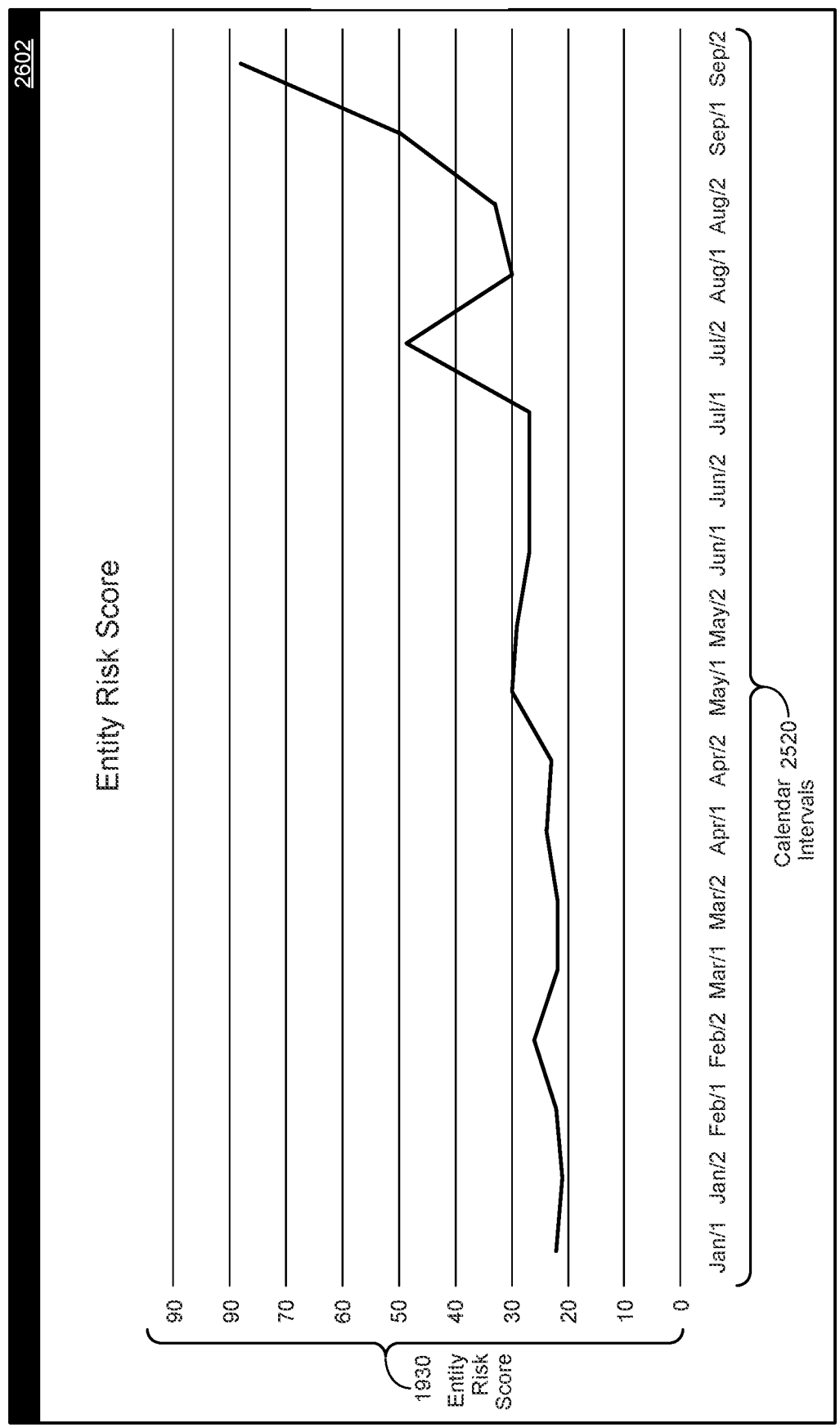
FIG. 26 shows a user interface (UI) window implemented to graphically display a user entity risk score as it changes over time.

FIG. 26 shows a user interface (UI) window implemented in accordance with an embodiment of the invention to graphically display an entity risk score as it changes over time. In certain embodiments, changes in a user entity's entity risk score 1930 over an interval of time, such as calendar intervals 2520, may be displayed within a window of a graphical user interface (GUI) 2602, such as that shown in FIG. 26.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a security operation, comprising:
   monitoring an entity, the monitoring observing an electronically-observable data source;
   deriving an observable based upon the monitoring of the electronically-observable data source;
   identifying a security related activity, the security related activity being based upon the observable from the electronic data source;
   analyzing the security related activity, the analyzing the security related activity using a security risk persona and a human-centric factor associated with the entity;
   associating the security risk persona with a phase of a cyber kill chain; and,
   performing a security operation on the security related activity via a security system, the security operation disrupting performance of the phase of the cyber kill chain, the security operation being performed by at least one of an endpoint device and a security analytics system, the endpoint device executing the security operation on a hardware processor associated with the endpoint device, the security analytics system executing the security operation on a hardware processor associated with the security analytics system; and wherein
   the security risk persona is included within a human-centric risk modeling framework, the human-centric risk modeling framework enabling quantification of the human-centric factor associated with the entity, the human-centric factor comprising a motivation factor, a stressor factor and an organizational dynamics stressor factor, the human-centric factor having an associated effect on the entity, the motivation factor representing a user entity behavior that provides an indication of a motivation for enacting the user entity behavior, the stressor factor representing an issue influencing the user entity behavior, the organizational stressor factor representing an event occurring within an organization affecting the user entity behavior.

2. The method of claim 1, further comprising:
   using the security risk persona to characterize an entity behavior.

3. The method of claim 1, wherein:
   the security risk persona has a corresponding persona baseline risk score; and,
   the persona baseline risk score is used to generate a user entity risk score.

4. The method of claim 3, wherein:
   the human-centric risk modeling framework further comprises at least one of a security risk use case, a user entity predisposition, a security vulnerability scenario, a concerning behavior and a contextual modifier.

5. The method of claim 4, wherein:
   the concerning behavior comprises an associated concerning behavior score and the user entity behavior comprises the security related activity.

6. The method of claim 4, wherein:
   the contextual modifier comprises a stressor modifier, an organizational modifier and a motivation modifier.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   monitoring an entity, the monitoring observing an electronically-observable data source;
   deriving an observable based upon the monitoring of the electronically-observable data source;
   identifying a security related activity, the security related activity being based upon the observable from the electronic data source;
   analyzing the security related activity, the analyzing the security related activity using a security risk persona and a human-centric factor associated with the entity;
   associating the security risk persona with a phase of a cyber kill chain; and,
   performing a security operation on the security related activity via a security system, the security operation disrupting performance of the phase of the cyber kill chain, the security operation being performed by at least one of an endpoint device and a security analytics system, the endpoint device executing the security operation on a hardware processor associated with the endpoint device, the security analytics system executing the security operation on a hardware processor associated with the security analytics system; and wherein
   the security risk persona is included within a human-centric risk modeling framework, the human-centric risk modeling framework enabling quantification of the human-centric factor associated with the entity, the human-centric factor comprising a motivation factor, a stressor factor and an organizational dynamics stressor factor, the human-centric factor having an associated effect on the entity, the motivation factor representing a user entity behavior that provides an indication of a motivation for enacting the user entity behavior, the stressor factor representing an issue influencing the user entity behavior, the organizational stressor factor representing an event occurring within an organization affecting the user entity behavior.

8. The system of claim 7, wherein the instructions are further configured for:
using the security risk persona to characterize an entity behavior.

9. The system of claim 7, wherein:
the security risk persona has a corresponding persona baseline risk score; and,
the persona baseline risk score is used to generate a user entity risk score.

10. The system of claim 9, wherein:
the human-centric risk modeling framework further comprises at least one of a security risk use case, a user entity predisposition, a security vulnerability scenario, a concerning behavior and a contextual modifier.

11. The system of claim 10, wherein:
the concerning behavior comprises an associated concerning behavior score and the user entity behavior comprises the security related activity.

12. The system of claim 10, wherein:
the contextual modifier comprises a stressor modifier, an organizational modifier and a motivation modifier.

13. A non-transitory, computer-readable storage medium embodying computer program code, the computer program code comprising computer executable instructions configured for:
monitoring an entity, the monitoring observing an electronically-observable data source;
deriving an observable based upon the monitoring of the electronically-observable data source;
identifying a security related activity, the security related activity being based upon the observable from the electronic data source;
analyzing the security related activity, the analyzing the security related activity using a security risk persona and a human-centric factor associated with the entity;
associating the security risk persona with a phase of a cyber kill chain; and,
performing a security operation on the security related activity via a security system, the security operation disrupting performance of the phase of the cyber kill chain, the security operation being performed by at least one of an endpoint device and a security analytics system, the endpoint device executing the security operation on a hardware processor associated with the endpoint device, the security analytics system executing the security operation on a hardware processor associated with the security analytics system; and wherein
the security risk persona is included within a human-centric risk modeling framework, the human-centric risk modeling framework enabling quantification of the human-centric factor associated with the entity, the human-centric factor comprising a motivation factor, a stressor factor and an organizational dynamics stressor factor, the human-centric factor having an associated effect on the entity, the motivation factor representing a user entity behavior that provides an indication of a motivation for enacting the user entity behavior, the stressor factor representing an issue influencing the user entity behavior, the organizational stressor factor representing an event occurring within an organization affecting the user entity behavior.

14. The non-transitory, computer-readable storage medium of claim 13, wherein the computer executable instructions are further configured for:
using the security risk persona to characterize an entity behavior.

15. The non-transitory, computer-readable storage medium of claim 13, wherein:
the security risk persona has a corresponding persona baseline risk score; and,
the persona baseline risk score is used to generate a user entity risk score.

16. The non-transitory, computer-readable storage medium of claim 15, wherein:
the human-centric risk modeling framework further comprises at least one of a security risk use case, a user entity predisposition, a security vulnerability scenario, a concerning behavior and a contextual modifier.

17. The non-transitory, computer-readable storage medium of claim 16, wherein:
the concerning behavior comprises an associated concerning behavior score and the user entity behavior comprises the security related activity.

18. The non-transitory, computer-readable storage medium of claim 16, wherein:
the contextual modifier comprises a stressor modifier, an organizational modifier and a motivation modifier.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *